US008600857B2

(12) United States Patent
Satyavolu et al.

(10) Patent No.: US 8,600,857 B2
(45) Date of Patent: Dec. 3, 2013

(54) SYSTEM AND METHOD FOR PROVIDING A SAVINGS OPPORTUNITY IN ASSOCIATION WITH A FINANCIAL ACCOUNT

(75) Inventors: Ramakrishna V. Satyavolu, Fremont, CA (US); Samir Kothari, Menlo Park, CA (US); Shehzad Daredia, San Francisco, CA (US)

(73) Assignee: Truaxis, Inc., Redwood City, CA (US)

( * ) Notice: Subject to any disclaimer, the term of this patent is extended or adjusted under 35 U.S.C. 154(b) by 0 days.

(21) Appl. No.: 13/082,591

(22) Filed: Apr. 8, 2011

(65) Prior Publication Data
US 2011/0246280 A1 Oct. 6, 2011

Related U.S. Application Data

(63) Continuation-in-part of application No. 12/501,572, filed on Jul. 13, 2009.

(60) Provisional application No. 61/388,680, filed on Oct. 1, 2010, provisional application No. 61/146,120, filed on Jan. 21, 2009.

(51) Int. Cl.
*G06Q 30/00* (2012.01)
*G06Q 40/00* (2012.01)
(52) U.S. Cl.
USPC .............................. 705/35; 705/14.1; 705/40
(58) Field of Classification Search
USPC ................................................. 705/39–40, 14
See application file for complete search history.

(56) References Cited

U.S. PATENT DOCUMENTS

| | | |
|---|---|---|
| 4,965,763 A | 10/1990 | Zamora |
| 5,027,388 A | 6/1991 | Bradshaw et al. |
| 5,339,392 A | 8/1994 | Risberg et al. |
| 5,513,102 A | 4/1996 | Auriemma |
| 5,659,601 A | 8/1997 | Cheslog |

(Continued)

FOREIGN PATENT DOCUMENTS

| | | |
|---|---|---|
| KR | 10-2009-0003416 A | 1/2009 |
| KR | 10-2010-0052896 A | 5/2010 |

(Continued)

OTHER PUBLICATIONS

Gifts that keep on giving ... ad dollars Strupp, Joe. Editor & Publisher 141. 8 (Aug. 2008): 9-10.*

(Continued)

*Primary Examiner* — William Rankins
(74) *Attorney, Agent, or Firm* — GTC Law Group LLP & Affiliates

(57) ABSTRACT

The present disclosure relates to comparison shopping and usage based service analysis for consumers, primarily for financial products. A consumer may not be aware of a provider's services, options, terms, conditions, costs, or how the service options change based on the consumer's particular usage characteristics. The disclosed comparison shopping method uses the consumer's actual or predicted service usage data. Service provider information is used to present the consumer with relevant alternative service offering options. Transaction data is gathered from a user's financial account and is analyzed for a savings opportunity indication. The analysis is used to match a savings opportunity from a database of savings opportunities, and the savings opportunity may be displayed in a statement of a user's financial account. Past responses to a savings opportunity indication may be gathered and analyzed. In one example, a savings opportunity is presented with a statement of the consumer's financial account.

16 Claims, 47 Drawing Sheets

(56) References Cited

U.S. PATENT DOCUMENTS

| | | |
|---|---|---|
| 5,774,870 A | 6/1998 | Storey |
| 5,794,207 A | 8/1998 | Walker et al. |
| 5,832,457 A | 11/1998 | O'brien et al. |
| 5,905,246 A | 5/1999 | Fajkowski |
| 5,945,653 A | 8/1999 | Walker et al. |
| 6,018,718 A | 1/2000 | Walker et al. |
| 6,049,599 A | 4/2000 | McCausland et al. |
| 6,070,149 A | 5/2000 | Tavor et al. |
| 6,085,169 A | 7/2000 | Walker et al. |
| 6,282,520 B1 | 8/2001 | Schirripa |
| 6,327,573 B1 | 12/2001 | Walker et al. |
| 6,351,735 B1 | 2/2002 | Deaton et al. |
| 6,466,919 B1 | 10/2002 | Walker et al. |
| 6,571,279 B1 | 5/2003 | Herz et al. |
| 6,587,995 B1 | 7/2003 | Duboc et al. |
| 6,601,761 B1 | 8/2003 | Katis |
| 6,631,007 B1 * | 10/2003 | Buis et al. ............... 358/1.13 |
| 6,631,185 B1 | 10/2003 | Fleming, III |
| 6,710,815 B1 | 3/2004 | Billmaier et al. |
| 6,792,422 B1 | 9/2004 | Stride et al. |
| D501,281 S | 1/2005 | Kole |
| 6,839,682 B1 | 1/2005 | Blume et al. |
| D501,957 S | 2/2005 | Jagger |
| 6,848,542 B2 | 2/2005 | Gailey et al. |
| 6,885,997 B1 | 4/2005 | Roberts |
| 6,898,762 B2 | 5/2005 | Ellis et al. |
| 6,915,254 B1 | 7/2005 | Heinze et al. |
| 6,920,611 B1 | 7/2005 | Spaeth et al. |
| 6,932,268 B1 | 8/2005 | McCoy et al. |
| 6,970,871 B1 | 11/2005 | Rayburn |
| 6,990,635 B2 | 1/2006 | Kurapati et al. |
| 7,021,531 B2 | 4/2006 | Myttenaere |
| 7,043,457 B1 | 5/2006 | Hansen |
| 7,051,925 B2 | 5/2006 | Schwarz |
| 7,072,864 B2 | 7/2006 | Brake et al. |
| 7,085,731 B1 | 8/2006 | Powell et al. |
| 7,086,586 B1 | 8/2006 | Sullivan |
| 7,130,828 B2 | 10/2006 | Phillips et al. |
| 7,130,901 B2 | 10/2006 | Roach |
| 7,165,049 B2 | 1/2007 | Slater |
| 7,187,947 B1 | 3/2007 | White et al. |
| 7,227,475 B1 | 6/2007 | Provenzano et al. |
| 7,254,367 B2 | 8/2007 | Helden et al. |
| 7,283,803 B2 | 10/2007 | Karaoguz et al. |
| 7,343,317 B2 | 3/2008 | Jokinen et al. |
| 7,343,334 B1 | 3/2008 | Adduci et al. |
| 7,366,493 B2 | 4/2008 | Marsh et al. |
| 7,482,925 B2 | 1/2009 | Hammad et al. |
| 7,512,558 B1 | 3/2009 | Elad et al. |
| 7,516,103 B1 | 4/2009 | Peitrucha, Jr. et al. |
| 7,640,200 B2 | 12/2009 | Gardner et al. |
| D611,200 S | 3/2010 | Packard |
| 7,698,170 B1 | 4/2010 | Darr et al. |
| 7,702,543 B2 | 4/2010 | Mackay et al. |
| 7,707,090 B2 | 4/2010 | Snyder |
| 7,711,606 B2 | 5/2010 | Snyder |
| 7,720,720 B1 | 5/2010 | Sharma et al. |
| 7,742,966 B2 | 6/2010 | Erlanger |
| 7,760,861 B1 | 7/2010 | Croak et al. |
| 7,778,907 B1 | 8/2010 | Haskins et al. |
| 7,797,453 B2 | 9/2010 | Meijer et al. |
| 7,801,783 B2 | 9/2010 | Kende et al. |
| 7,827,086 B1 | 11/2010 | Ellenberg et al. |
| 7,857,212 B1 | 12/2010 | Matthews |
| 7,870,025 B2 | 1/2011 | English |
| 7,904,332 B1 | 3/2011 | Merkley, Jr. et al. |
| 7,904,358 B2 | 3/2011 | Brittingham et al. |
| 7,986,935 B1 | 7/2011 | D'Souza |
| 8,005,726 B1 | 8/2011 | Bao |
| 8,108,406 B2 | 1/2012 | Kenedy et al. |
| 8,112,287 B1 | 2/2012 | Paul et al. |
| 8,160,938 B2 | 4/2012 | Allen et al. |
| 8,177,121 B2 | 5/2012 | Zimmerman et al. |
| 8,195,507 B2 | 6/2012 | Postrel |
| 8,209,198 B2 | 6/2012 | Harkensee et al. |
| 8,265,952 B1 | 9/2012 | Smith |
| 8,489,452 B1 | 7/2013 | Warner et al. |
| 2001/0007978 A1 | 7/2001 | Marsh et al. |
| 2001/0032207 A1 | 10/2001 | Hartley et al. |
| 2001/0034704 A1 | 10/2001 | Farhat et al. |
| 2001/0037236 A1 | 11/2001 | Dixon et al. |
| 2001/0044762 A1 | 11/2001 | Nault |
| 2001/0051920 A1 | 12/2001 | Joao et al. |
| 2002/0008626 A1 | 1/2002 | Waters et al. |
| 2002/0010598 A1 | 1/2002 | Johnson et al. |
| 2002/0040359 A1 | 4/2002 | Green et al. |
| 2002/0055924 A1 | 5/2002 | Liming |
| 2002/0065713 A1 | 5/2002 | Awada et al. |
| 2002/0086660 A1 | 7/2002 | Sullivan et al. |
| 2002/0087682 A1 | 7/2002 | Roach |
| 2002/0091650 A1 | 7/2002 | Ellis |
| 2002/0104087 A1 | 8/2002 | Schaffer et al. |
| 2002/0120540 A1 | 8/2002 | Kende et al. |
| 2002/0123919 A1 | 9/2002 | Brockman et al. |
| 2002/0138848 A1 | 9/2002 | Alao et al. |
| 2002/0154751 A1 | 10/2002 | Thompson et al. |
| 2002/0169658 A1 | 11/2002 | Adler |
| 2002/0169668 A1 | 11/2002 | Bank et al. |
| 2002/0198775 A1 | 12/2002 | Ryan |
| 2002/0198803 A1 | 12/2002 | Rowe |
| 2003/0009401 A1 | 1/2003 | Ellis |
| 2003/0014307 A1 | 1/2003 | Heng |
| 2003/0032409 A1 | 2/2003 | Hutcheson et al. |
| 2003/0040964 A1 | 2/2003 | Lacek |
| 2003/0046155 A1 | 3/2003 | Himmel et al. |
| 2003/0055723 A1 | 3/2003 | English |
| 2003/0061132 A1 | 3/2003 | Yu et al. |
| 2003/0078800 A1 | 4/2003 | Salle et al. |
| 2003/0149596 A1 | 8/2003 | Bost |
| 2003/0154123 A1 | 8/2003 | Subbloie et al. |
| 2003/0158800 A1 | 8/2003 | Pisello et al. |
| 2003/0158818 A1 | 8/2003 | George et al. |
| 2003/0158844 A1 | 8/2003 | Kramer et al. |
| 2003/0191832 A1 | 10/2003 | Satyavolu et al. |
| 2003/0208754 A1 | 11/2003 | Sridhar et al. |
| 2003/0212598 A1 | 11/2003 | Raman |
| 2003/0233276 A1 | 12/2003 | Pearlman et al. |
| 2003/0233278 A1 | 12/2003 | Marshall |
| 2004/0005900 A1 | 1/2004 | Zilliacus |
| 2004/0006608 A1 | 1/2004 | Swarna et al. |
| 2004/0054610 A1 | 3/2004 | Amstutz et al. |
| 2004/0067747 A1 | 4/2004 | Carpenter et al. |
| 2004/0083183 A1 | 4/2004 | Hardesty et al. |
| 2004/0093324 A1 | 5/2004 | Marappan |
| 2004/0209595 A1 | 10/2004 | Bekanich |
| 2004/0210524 A1 | 10/2004 | Benenati et al. |
| 2004/0217585 A1 | 11/2004 | Mitchell |
| 2004/0243468 A1 | 12/2004 | Cohagan et al. |
| 2005/0030291 A1 | 2/2005 | Yanagisawa |
| 2005/0037755 A1 | 2/2005 | Hind et al. |
| 2005/0059397 A1 | 3/2005 | Zhao |
| 2005/0065981 A1 | 3/2005 | Blinn et al. |
| 2005/0080665 A1 | 4/2005 | Bowman-Amuah |
| 2005/0120389 A1 | 6/2005 | Boss et al. |
| 2005/0125343 A1 | 6/2005 | Mendelovich |
| 2005/0209921 A1 | 9/2005 | Roberts et al. |
| 2005/0213511 A1 | 9/2005 | Reece et al. |
| 2005/0220280 A1 | 10/2005 | Steinberg |
| 2005/0278716 A1 | 12/2005 | Koppen et al. |
| 2006/0022048 A1 | 2/2006 | Johnson |
| 2006/0111967 A1 * | 5/2006 | Forbes ............... 705/14 |
| 2006/0143027 A1 | 6/2006 | Jagnnathan et al. |
| 2006/0143072 A1 | 6/2006 | Herman et al. |
| 2006/0149648 A1 | 7/2006 | Brown |
| 2006/0161599 A1 | 7/2006 | Rosen |
| 2006/0165060 A1 | 7/2006 | Dua |
| 2006/0173767 A1 | 8/2006 | Hansen |
| 2006/0173974 A1 | 8/2006 | Tang |
| 2006/0178868 A1 | 8/2006 | Billerey-Mosier |
| 2006/0206376 A1 | 9/2006 | Gibbs et al. |
| 2006/0229996 A1 | 10/2006 | Keithly et al. |
| 2006/0259364 A1 | 11/2006 | Strock et al. |
| 2006/0271997 A1 | 11/2006 | Jacoby et al. |
| 2006/0287950 A1 | 12/2006 | Steinberg et al. |

(56) References Cited

U.S. PATENT DOCUMENTS

| | | |
|---|---|---|
| 2007/0011044 A1 | 1/2007 | Hansen |
| 2007/0043608 A1 | 2/2007 | May et al. |
| 2007/0078719 A1 | 4/2007 | Schmitt et al. |
| 2007/0084917 A1 | 4/2007 | Fajkowski |
| 2007/0150352 A1 | 6/2007 | Kelly-frank et al. |
| 2007/0156530 A1* | 7/2007 | Schmitt et al. ............... 705/14 |
| 2007/0168267 A1 | 7/2007 | Zimmerman et al. |
| 2007/0181674 A1 | 8/2007 | Taylor et al. |
| 2007/0185756 A1 | 8/2007 | Ahn |
| 2007/0201376 A1 | 8/2007 | Marshall-Wilson |
| 2007/0203880 A1 | 8/2007 | Kumar et al. |
| 2007/0263069 A1 | 11/2007 | Jendbro |
| 2007/0298766 A1 | 12/2007 | Fan et al. |
| 2008/0010099 A1 | 1/2008 | Walker et al. |
| 2008/0082373 A1 | 4/2008 | Durocher et al. |
| 2008/0085707 A1 | 4/2008 | Fadell |
| 2008/0086365 A1 | 4/2008 | Zollino et al. |
| 2008/0086474 A1 | 4/2008 | Haycraft et al. |
| 2008/0091539 A1 | 4/2008 | Ruckart |
| 2008/0103968 A1 | 5/2008 | Bies et al. |
| 2008/0108308 A1 | 5/2008 | Ullah |
| 2008/0109304 A1 | 5/2008 | Sarelson et al. |
| 2008/0109888 A1 | 5/2008 | Ullah |
| 2008/0133327 A1 | 6/2008 | Ullah |
| 2008/0141281 A1 | 6/2008 | Ramsey et al. |
| 2008/0155453 A1 | 6/2008 | Othmer |
| 2008/0162258 A1 | 7/2008 | Kala et al. |
| 2008/0187118 A1 | 8/2008 | Short |
| 2008/0220760 A1 | 9/2008 | Ullah |
| 2008/0228566 A1 | 9/2008 | Williams et al. |
| 2008/0277465 A1 | 11/2008 | Pletz et al. |
| 2009/0012844 A1 | 1/2009 | Ohlsen et al. |
| 2009/0027223 A1 | 1/2009 | Hill |
| 2009/0037268 A1 | 2/2009 | Zaid et al. |
| 2009/0112639 A1 | 4/2009 | Robinson Beaver |
| 2009/0150211 A1 | 6/2009 | Bayne |
| 2009/0156190 A1 | 6/2009 | Fisher |
| 2009/0182597 A1* | 7/2009 | Bull et al. ................ 705/7 |
| 2009/0234742 A1 | 9/2009 | Hart |
| 2009/0313106 A1 | 12/2009 | Taylor et al. |
| 2010/0106577 A1* | 4/2010 | Grimes ............... 705/14.15 |
| 2010/0112990 A1 | 5/2010 | Dingler et al. |
| 2010/0138344 A1 | 6/2010 | Wong et al. |
| 2010/0153242 A1 | 6/2010 | Preston et al. |
| 2010/0183132 A1 | 7/2010 | Satyavolu et al. |
| 2010/0185452 A1 | 7/2010 | Satyavolu et al. |
| 2010/0185453 A1 | 7/2010 | Satyavolu et al. |
| 2010/0185454 A1 | 7/2010 | Satyavolu et al. |
| 2010/0185489 A1 | 7/2010 | Satyavolu et al. |
| 2010/0185490 A1 | 7/2010 | Satyavolu et al. |
| 2010/0185491 A1 | 7/2010 | Satyavolu et al. |
| 2010/0185492 A1 | 7/2010 | Satyavolu et al. |
| 2010/0185534 A1 | 7/2010 | Satyavolu et al. |
| 2010/0331016 A1 | 12/2010 | Dutton et al. |
| 2011/0022540 A1 | 1/2011 | Stern et al. |
| 2011/0035288 A1 | 2/2011 | Clyne |
| 2011/0047016 A1* | 2/2011 | Cook ................ 705/14.13 |
| 2011/0087546 A1 | 4/2011 | Fordyce, III et al. |
| 2011/0125565 A1 | 5/2011 | MacIlwaine et al. |
| 2011/0153402 A1 | 6/2011 | Craig |
| 2011/0216292 A1 | 9/2011 | LaFarre et al. |
| 2011/0225033 A1 | 9/2011 | Schmeyer et al. |
| 2011/0238476 A1 | 9/2011 | Carr et al. |
| 2011/0246268 A1 | 10/2011 | Satyavolu et al. |
| 2011/0246281 A1 | 10/2011 | Satyavolu et al. |
| 2011/0246284 A1 | 10/2011 | Chaikin et al. |
| 2011/0246292 A1 | 10/2011 | Satyavolu et al. |
| 2011/0246299 A1 | 10/2011 | Satyavolu et al. |
| 2011/0246346 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0258028 A1 | 10/2011 | Satyavolu et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010936 A1 | 1/2012 | Satyavolu et al. |
| 2012/0053987 A1 | 3/2012 | Satyavolu et al. |
| 2012/0066046 A1 | 3/2012 | Satyavolu et al. |
| 2012/0066050 A1 | 3/2012 | Satyavolu et al. |
| 2012/0101896 A1* | 4/2012 | Veeneman et al. ......... 705/14.49 |

FOREIGN PATENT DOCUMENTS

| | | |
|---|---|---|
| WO | 02/41556 A2 | 5/2002 |
| WO | 2010085445 A1 | 7/2010 |
| WO | 2012044692 A2 | 4/2012 |
| WO | 2012044692 A3 | 6/2012 |
| WO | 2012044692 A8 | 11/2012 |

OTHER PUBLICATIONS

CheckFree and Netonomy Sign Strategic Reseller Agreement PR Newswire (US) Dec. 15, 2004.*
Powering Down; It's never too late to trim dollars off your energy bill Vestal, Shawn. Spokesman Review [Spokane, Wash] Jan. 12, 2009: A.5.*
Rochester, N.Y.-Based Firm Lures Big Indiana Customers from Telecom Giants Chakrabarty, Gargi. Knight Ridder Tribune Business News [Washington] Apr. 19, 2002: 1.*
Int. Appl. PCT/US10/21371, Int. Search Report mailed May 3, 2010, 2 pages.
Int. Appl. PCT/US10/21371, Written Opinion mailed May 3, 2010, 5 pages.
OneSimCard, "Mobile Miles Reward Program," Jan. 2007, published at <http://web.archive.org/web/2007101706928/http://www.onesimcard.com/?idmenu=22> 1 page.
WhiteFence "Purchase your Bundles and Save," May 2008, 2 pages http://web.archive.org/web/20080505084851/www.whitefence.com/bundled-services.html.
BundleMyServices. "Bundle Your Internet, Phone and TV to Save." Jul. 2008, 3 pages http://web.archive.org/web/20080711052327/http://www.bundlemyservices.com/.
Written Opinion and Int'l Search Report for PCT/US11/53696, mailed May 4, 2012 (10 pages).
CheckFree and Netonomy Sign Strategic Reseller Agreement PR Newswire (US) Dec. 15, 2004, 3 pages.
U.S. Appl. No. 12/533,447, Non-Final Office Action mailed Oct. 27, 2010, 7 pages.
U.S. Appl. No. 12/533,517, Non-Final Office Action mailed Mar. 17, 2010, 3 pages.
U.S. Appl. No. 12/533,517, Final Office Action mailed Oct. 13, 2010, 9 pages.
Balasubramanian, Dushyanth , "QoS in Cellular Networks", http://www.cse.wustl.edu/-jain/cse574-06/ftp/cellular_qos.pdf, Washington University in Saint Louis, May 2006, 24 pages.
City-Data.Com, "Best savings account rate?", http://www.city-data.com/forum/personal-finance/533408-best-savings-account-rate.html (accessed online Apr. 12, 2012), Jan. 9, 2009, 6 pages.
Cotter, James F. et al., "The Limits of Reverse Auction Pricing Strategy and Priceline.Com", Journal of Business and Entrepreneurship, suppl. Special Issue 13: 23-0_11, Oct. 2001, 5 pages.
Lieber, Ron , "Your Money, Where's It All Going? Find Out Online", http://www.nytimes.com/2008/10/04/business/yourmoney/04money.html?_r=1&pagewanted=all, Sep. 10, 2012 12:39:08 AM, Oct. 3, 2008,, 4 pages.
mint.com "Mint Refreshing Money Management", Mint Software, Inc., http://web.archive.org/web/20071 029162033/http://www.mint.com/features.html., 2007, 2 pages.
mint.com "MintLife Blog Track Spending Online and Compare", Mint.com , http://www.mint.com/blog/updates/trackspending-online-compare-your-spending, Sep. 10, 2012 12:41 :18 AM], Jan. 16, 2008, 2 pages.

(56) References Cited

OTHER PUBLICATIONS mint.com "Mint™ refreshing money management", Mint.com, http://web.archive.org/web/20080701 042934/http://www.mint.com/features.html, 12:35:17 AM, Sep. 10, 2012, 3 pages.

money-rates.com, "Highest Rates and Yields on bank savings accounts updated daily", http://web.archive.org/web/20071226132433/http:www.money-rats.com/savings.html (accessed online Apr. 12, 2012), Dec. 19, 2007, 3 pages.

PCT/US2007/018960, "International Application Serial No. PCT/US2007/018960, Search Report and Written Opinion mailedMay 3, 2010", 11 pages.

Chakrabarty, Gargi "Rochester, N.Y. Based Firm Lures Big Indiana Customers from Telecom Giants", The Indianapolis Star (Indianapolis, IN), www.highbeam.com/doc/1G1-120488613.html, Apr. 19, 2002, 1 page.

Mint.com, "Free Money Management, Manage Your Finances, Expense Management, Budget and Money Software—Mint.com", http://web.archive.org/web/20080315110811/http://www.mint.com/features.html, Mar. 15, 2008, 2 pages.

Mint.com, "Personal Finance Software from Mint-Personal Finance Management and Financial Calculator Online—Mint.com,", http://web.archive.org/web/20080604065549/http://www.mint.com/personal-finance.html, Jun. 4, 2008, 2 pages.

\* cited by examiner

|  | Weekday, 7 am – 8am | Weekday, 1 pm – 2 pm | Weekday, 11 pm – 12 am | Saturday, 7 am – 8am | Message Rate | Roaming Rate | Data Rate |
|---|---|---|---|---|---|---|---|
| Provider A | $0.05/min | $0.05/min | $0/min | $0min | $0.15/msg | $0.05/min | $0.05/Kb |
| Provider B | $0.06/min | $0.06/min | $0.06/min | $0min | $0.05/msg | $0.10/min | $0.05/Kb |
| Provider C | $0.05/min | $0.05/min | $0.01/min | $0/min | $0.05/msg | $0.05/min | $0.06/Kb |
| Provider D | $0.07/min | $0.07/min | $0/min | $0/min | $0.05/msg | $0.15/min | $0.06/Kb |
| Provider E | $0.05/min | $0.05/min | $0.05/min | $0min | $0.05/msg | $0.05/min | $0.06/Kb |

Fig. 3

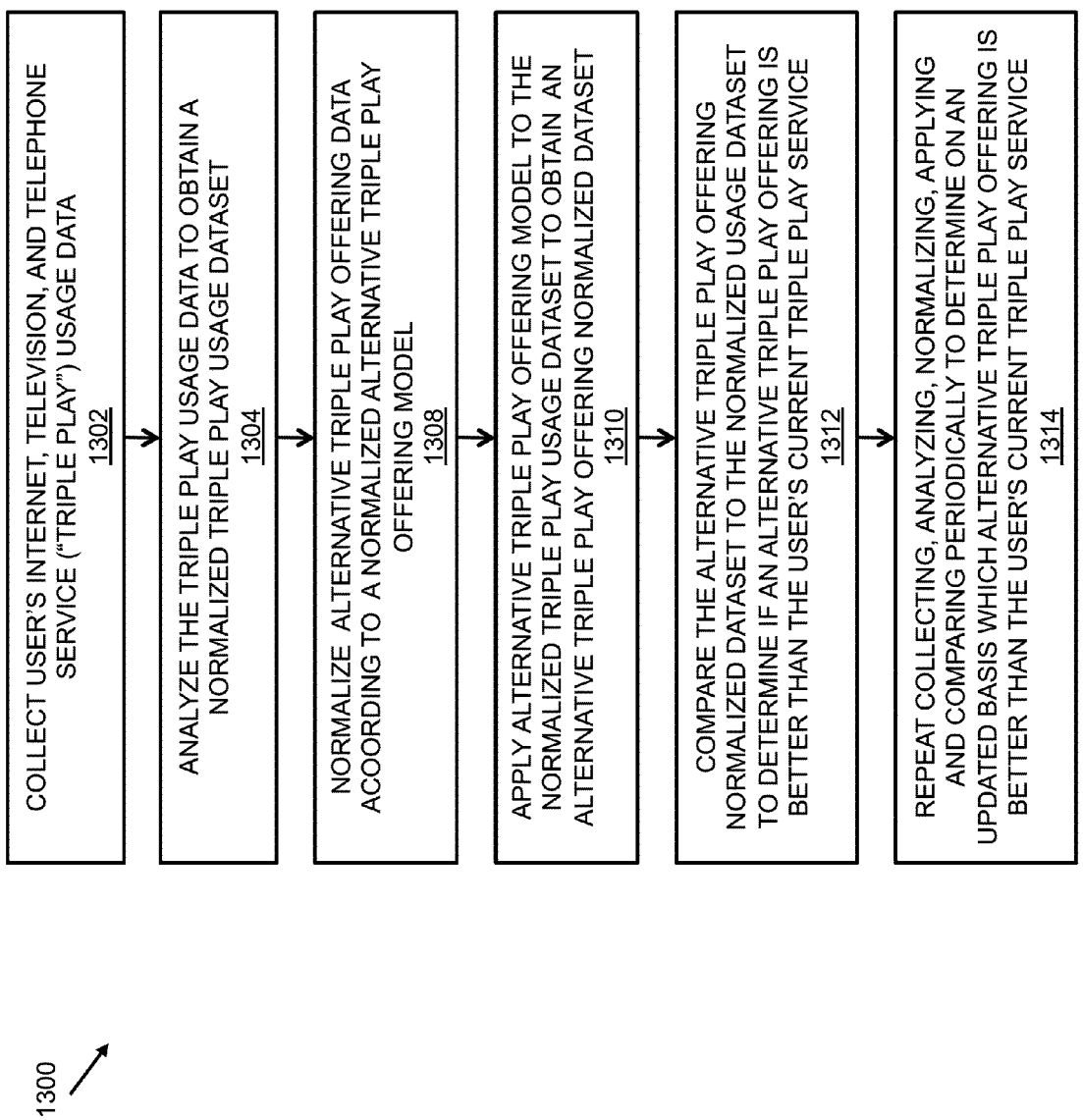

VIEW ALL ACCOUNT ACTIVITY

CREATE A REPORT [?]
DOWNLOAD YOUR STATEMENT

SELECT TIME PERIOD: [SINCE LAST STATEMENT ▼]   TRANSACTION TYPE: [ALL TRANSACTIONS ▼] [VIEW]

TRANSACTION DETAILS AS OF 08/11/2010

| SALE DATE ▼ | DESCRIPTION ▽ | AMOUNT ▽ |
|---|---|---|
| 08/09/2010 | ATTM *4360565794340 8003310500 GA | $49.74 |
| 08/09/2010 | ST OF CALIF DMV-INTERN 916-6578943 CA | $154.00 |
| 08/08/2010 | SHELL OIL 57444213706 MOUNTAIN VIEW CA | $15.68 |
| 08/08/2010 | STRAITS SANTANA ROW SAN JOSE CA | $31.00 |
| 08/07/2010 | LOWES #02211* SUNNYVALE CA | $33.18 |
| ☐ 08/05/2010 | ATT*BILL PAYMENT 800-288-2020 TX | $83.24 |
| | [B ▶] SAVINGS: SPEND $20 LESS PER MONTH ON THIS BILL | |
| | OTHER AT&T USERS IN CA THAT SPEND $80 OR MORE ON THEIR WIRELESS BILL, FOUND THEY WERE OVER SPENDING BY AT LEAST $240 PER YEAR | |
| | ANALYZE MY BILL TO SEE IF I AM OVER PAYING | |
| 08/03/2010 | INDIA FRESH MOUNTAIN VIEW CA | $5.49 |
| 08/02/2010 | ATT*BILL PAYMENT 800-288-2020 TX | $61.03 |

*FIG. 14*

VIEW ALL ACCOUNT ACTIVITY

SELECT TIME PERIOD:     TRANSACTION TYPE:

SINC

CREATE A REPORT [?]
DOWNLOAD YOUR STATEMENT

| TRANS SALE D | | OUNT ▽△ |
|---|---|---|
| 08/09/2 | | $49.74 |
| 08/09/2 | | $154.00 |
| 08/08/2 | | $15.68 |
| 08/08/2 | | $31.00 |
| 08/07/2 | | $33.18 |
| ☐ 08/05/2 | | $13.99 |
| 08/03/2010 | INDIA FRESH MOUNTAIN VIEW CA | $5.49 |
| 08/02/2010 | ATT*BILL PAYMENT 800-288-2020 TX | $61.03 |

LOG IN TO YOUR T-MOBILE ACCOUNT TO ANALYZE YOUR WIRELESS USAGE

T-MOBILE PHONE NUMBER: [____]
T-MOBILE ACCOUNT PASSWORD: [____]

☐ I AUTHORIZE BILLSHRINK TO USE MY ACCOUNT CREDENTIALS TO ACCESS AND OBTAIN MY CARRIER BILLING INFORMATION SUBJECT TO BILLSHRINK'S TERMS OF USE AND PRIVACY POLICY TO WHICH I AGREE ( FINISH AND FIND SAVINGS )

GET THIS DEAL TODAY

VIEW ALL ACCOUNT ACTIVITY

CREATE A REPORT [?]
DOWNLOAD YOUR STATEMENT

| SELECT TIME PERIOD: | TRANSACTION TYPE: | |
|---|---|---|
| SINCE LAST STATEMENT ▽ | ALL TRANSACTIONS ▽ | VIEW |

TRANSACTION DETAILS AS OF 08/11/2010

| SALE DATE ▽ | DESCRIPTION ▽ | AMOUNT ▽ |
|---|---|---|
| 08/09/2010 | ATTM *4360565794434 08003310500 GA | $49.74 |
| 08/09/2010 | ST OF CALIF DMV-INTERN 916-6578943 CA | $154.00 |
| 08/08/2010 | SHELL OIL 5744421370 6 MOUNTAIN VIEW CA | $15.68 |
| 08/08/2010 | STRAITS SANTANA ROW SAN JOSE CA | $31.00 |
| 08/07/2010 | LOWES #02211* SUNNYVALE CA | $33.18 |
| ☐ 08/05/2010 | SHELL OIL 5744421370 6 MOUNTAIN VIEW CA | $45.34 |
| | ⚑ SAVINGS: GO TO CHEAPER GAS STATION | |
| | YOU COULD HAVE SAVED $12.13 ON THIS PURCHASE IF YOU HAD GONE TO: | |
| | » CHEVRON<br>2216 El CAMINO REAL,<br>REDWOOD CITY, CA | |
| | FIND THE CHEAPEST GAS STATION ON YOUR COMMUTE | |
| 08/03/2010 | INDIA FRESH MOUNTAIN VIEW CA | $5.49 |
| 08/02/2010 | ATT*BILL PAYMENT 800-288-2020 TX | $61.03 |

*FIG. 18*

VIEW ALL ACCOUNT ACTIVITY

CREATE A REPORT [?]
DOWNLOAD YOUR STATEMENT

SELECT TIME PERIOD:     TRANSACTION TYPE:

[ SINCE LAST STATEMENT ▷ ]    [ ALL TRANSACTIONS ▷ ] [ VIEW ]

| TRANSACTION SALE DATE | | AMOUNT ▽ |
|---|---|---|
| 08/09/2010 | FIND THE CHEAPEST GAS STATION ON YOUR COMMUTE | $49.74 |
| 08/09/2010 | | $154.00 |
| 08/08/2010 | WHAT ARE YOUR MOST FREQUENT DESTINATIONS? | $15.68 |
| 08/08/2010 | HOME ADDRESS [ 90 QUEENS CT, 94027 ] | $31.00 |
| 08/07/2010 | OTHER (i.e. WORK) [ ] | $33.18 |
| ☐ 08/05/2010 | | $45.34 |
| | CONTINUE >> | |
| | REDWOOD CITY, CA | |
| | FIND THE CHEAPEST GAS STATION ON YOUR COMMUTE | |
| 08/03/2010 | INDIA FRESH MOUNTAIN VIEW CA | $5.49 |
| 08/02/2010 | ATT*BILL PAYMENT 800-288-2020 TX | $61.03 |

VIEW ALL ACCOUNT ACTIVITY

| SELECT TIME PERIOD: | TRANSACTION TYPE: | | CREATE A REPORT ⓘ |
|---|---|---|---|
| SINCE LAST STATEMENT ▽ | ALL TRANSACTIONS ▽ | VIEW | DOWNLOAD YOUR STATEMENT |

TRANSACTION DETAILS AS OF 08/11/2010

| SALE DATE ▽ | DESCRIPTION ▽ | AMOUNT ▽ |
|---|---|---|
| 08/09/2010 | ATTM *4360565794340 8003310500 GA | $49.74 |
| 08/09/2010 | ST OF CALIF DMV-INTERN 916-6578943 CA | $154.00 |
| 08/08/2010 | SHELL OIL 57444213706 MOUNTAIN VIEW CA | $15.68 |
| 08/08/2010 | STRAITS SANTANA ROW SAN JOSE CA | $31.00 |
| 08/07/2010 | LOWES #02211* SUNNYVALE CA | $33.18 |
| ☐ 08/05/2010 | STARBUCKS #04576 SAN FRANCISCO CA | $3.35 |
| | Ⓑ SAVINGS: 30% OFF YOUR NEXT COFFEE PURCHASE | |
| | ◯ IN THE LAST 2 MONTHS YOU HAVE SPENT $62.45 AT STARBUCKS. GET $50 WORTH OF STARBUCKS COFFEE FOR $35 | |
| | GET THIS DEAL TODAY | |
| 08/03/2010 | INDIA FRESH MOUNTAIN VIEW CA | $5.49 |
| 08/02/2010 | ATT*BILL PAYMENT 800-288-2020 TX | $61.03 |

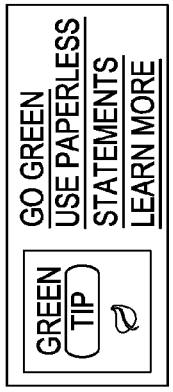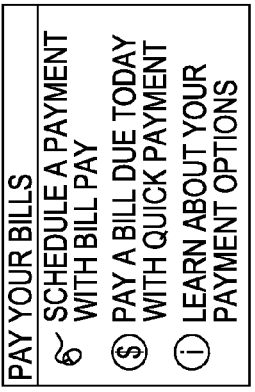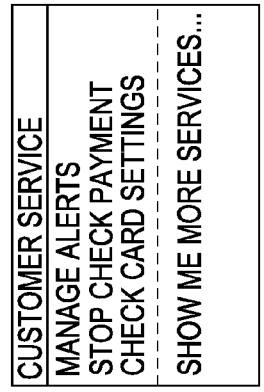
FIG. 31

BANK DASHBOARD

WELCOME TO THE REWARDS PLATFORM!

PLEASE LOG IN BELOW

EMAIL:
PASSWORD:
☑ REMEMBER ME
LOG IN

THROUGH STATEMENTREWARDS, FINANCIAL INSTITUTIONS HAVE AN UNPRECEDENTED ABILITY TO DELIVER IN-STATEMENT, MONEY-SAVING RECOMMENDATIONS AND LOYALTY MERCHANT REWARDS TO THEIR CUSTOMERS

THE ROBUST TRANSACTION IDENTIFICATION ENGINE CLASSIFIES PURCHASES INTO SPECIFIC MERCHANTS AND CATEGORIES AND THEN ACCURATELY DETERMINES WHAT CONTENT TO DISPLAY

THE STATEMENTREWARDS<sup>SM</sup> PATENT-PENDING MATCHING TECHNOLOGY LEVERAGES KNOWLEDGE OF BOTH HISTORICAL AND CURRENT TRANSACTIONS TO PRESENT CONSUMERS WITH THE MOST RELEVANT SAVINGS AVAILABLE

*FIG. 33*

BANK DASHBOARD

| ADMIN | FI MANAGEMENT | REPORTING | CUSTOMER SERVICE |

ADMIN SETTINGS
REWARD CONTROLS
USER INTERFACE SETTINGS
PAYMENT CONTROLS

YOU ARE EDITING THE PLATFORM MASTER SETTINGS. TO SWITCH TO A SPECIFIC FI, PLEASE RETURN <u>HERE</u>

REWARD CONTROLS
LOYALTY MODE SETTINGS ⓘ

RESTRICTED TO LOYALTY REWARDS:  ⦿ ON   ○ OFF

BILLSHRINK ANALYZER APPLICATIONS ⓘ

☑ WIRELESS APPLICATION   ☑ GAS APPLICATION   ☑ TV APPLICATION

REWARD DENSITY ⓘ

MAXIMUM REWARDS PER STATEMENT
⦿ NO MAXIMUM; AUTO-OPTIMIZED
○ MAXIMUM NUMBER OF REWARDS PER STATEMENT
○ MAXIMUM PERCENTAGE OF TRANSACTIONS MATCHED TO A REWARD

SAVINGS THRESHOLDS ⓘ

MINIMUM DOLLAR SAVINGS OF EACH   ⦿ NO MINIMUM; AUTO-OPTIMIZED
REWARD:                           ○ MINIMUM DOLLAR SAVINGS
                                  [ 0.0 ]

BLACKLIST MERCHANTS ⓘ

*FIG. 35*

BANK DASHBOARD

| ADMIN | FI MANAGEMENT | REPORTING | CUSTOMER SERVICE |

FI MANAGEMENT                                    PENDING: 1 | ACTIVE: 4 | DENIED: 2

PENDING REGISTRATIONS (1)

| FINANCIAL INSTITUTION | ID | REGISTRATION PROFILE | ACTIONS |
|---|---|---|---|
| SAMPLE | TEST | CLICK TO VIEW | APPROVE  DENY |

ACTIVE REGISTRATIONS (4)

| FINANCIAL INSTITUTION | ID | REGISTRATION PROFILE |
|---|---|---|
| FI | ICICI | CLICK TO VIEW |
| ICICI | AXIS BANK | CLICK TO VIEW |
| AXIS | JHBJLHBLK | CLICK TO VIEW |
| jkbJHBJKHB | | CLICK TO VIEW |

DENIED REGISTRATIONS (2)

| FINANCIAL INSTITUTION | ID | REGISTRATION PROFILE |
|---|---|---|
| SBI | ^%^()_+_+*/*(T$%#$# | CLICK TO VIEW |
| UYGU*&^(*&YU(U){ | | CLICK TO VIEW |

*FIG. 38*

BANK DASHBOARD

| ADMIN | FI MANAGEMENT | REPORTING | CUSTOMER SERVICE |

FI MANAGEMENT ( PENDING: 1 | ACTIVE: 4 | DENIED: 2 )

PENDING REGISTRATIONS (1)

| FINANCIAL INSTITUTION | SAMPLE |
|---|---|
| SAMPLE | |

| FI ID | TEST |
|---|---|
| SUBMITTER | JHBKL, BKLJ |
| E-MAIL | ADMIN1@TEST.COM |
| PHONE | 3516546546 |
| ADDRESS | |

( APPROVE )  ( DENY )

ACTIVE REGISTRATION

| FINANCIAL INSTITUTION | ID | REGISTRATION PROFILE |
|---|---|---|
| FI | | |
| ICICI | | |
| AXIS | | |
| jkbJHBJKHB | JHBJLHBLK | CLICK TO VIEW |

DENIED REGISTRATIONS (2)

| FINANCIAL INSTITUTION | ID | |
|---|---|---|
| SBI | SBI | CLICK TO VIEW |
| UYGU*&^(*&YU(U)( | ^%^()_+_+*'*('(T$%#$# | CLICK TO VIEW |

( DENY )

*FIG. 39*

MERCHANT DASHBOARD

| CAMPAIGNS | REPORTING | MY ACCOUNT |

HELP
- HELP QUESTION 1
- HELP QUESTION 2
- HELP QUESTION 3
- HELP QUESTION 4
- HELP QUESTION 5
- HELP QUESTION 6
- HELP QUESTION 7

SELECT CAMPAIGN SETTINGS > CREATE REWARD > TARGETING

○ CHOOSE A SAVED REWARD
  USE A SAVED REWARD: [▼]  [NEXT]

- OR -

◉ CREATE A REWARD

CHOOSE REWARD TYPE:

◉ PREPAID VOUCHER ⊙   ○ DISCOUNT UPON PURCHASE (COUPON) ⊙

NAME THIS REWARD: [       ]
MERCHANT NAME: [       ]
REWARD VALUE: [       ]
OFFER PRICE: [       ]
HEADLINE: [       ]
SHORT DESCRIPTION: [       ]
REWARD CALL TO ACTION: [       ]
SMALL LOGO: [UPLOAD FILE]
LARGE LOGO: [UPLOAD FILE]
TERMS & CONDITIONS: [       ]
REDEMPTION TYPE: ○ DIGITAL FULFILLMENT
                 ◉ PHYSICAL FULFILLMENT
REDEMPTION TEXT: [       ]
EXPIRATION DATE: [       ]
EXCLUSIVE: ☐

[+] PURCHASE LIMITS

MAX NUMBER PER USER: [       ]
TOTAL OFFERS AVAILABLE: [       ]

*FIG. 43*

MERCHANT DASHBOARD

| CAMPAIGNS | REPORTING | MY ACCOUNT |

SELECT CAMPAIGN SETTINGS > CREATE REWARD > TARGETING

HELP

- HELP QUESTION 1
- HELP QUESTION 2
- HELP QUESTION 3
- HELP QUESTION 4
- HELP QUESTION 5
- HELP QUESTION 6
- HELP QUESTION 7

[ ] TARGET MERCHANTS OR CATEGORIES

◉ TARGET REWARD BY MERCHANT

STARBUCKS    DELETE
        PEETS    DELETE
        + ADD A TARGET MERCHANT ▽
        + ADD A BLACKLIST MERCHANT ▽

○ TARGET REWARD BY CATEGORY

NONE SELECTED
        + ADD A TARGET CATEGORY ▽

[ ] TARGET GEOGRAPHIES

ALL UNITED STATES    DELETE
    NONE SELECTED
    + ADD A TARGET GEOGRAPHY ▽
    + ADD A BLACKLIST GEOGRAPHY ▽

[−] TRANSACTION DATE RANGE

TRANSACTION DATE RANGE  [IN THE LAST ▽]  [90 DAYS ▽]  30, 60, 90 YEAR
    BETWEEN  DATE 1 & DATE 2
    BEFORE  DATE
    AFTER  DATE

[ ] ADVANCED TARGETING CRITERIA (SELECT ALL THAT APPLY)

[ ] SINGLE TRANSACTION VALUE:  [BETWEEN ▽]  [  ] & [  ]
  [ ] MERCHANT SPEND TOTAL:  [BETWEEN ▽]  [  ] & [  ]

*FIG. 44*

SYSTEM AND METHOD FOR PROVIDING A SAVINGS OPPORTUNITY IN ASSOCIATION WITH A FINANCIAL ACCOUNT

CROSS-REFERENCE TO RELATED APPLICATIONS

This application is a non-provisional of and claims the benefit of the filing date of Provisional Application 61/388,680, filed on Oct. 1, 2010; this application is also a continuation-in-part of, and claims the benefit of the filing date of U.S. patent application Ser. No. 12/501,572, filed on Jul. 13, 2009; U.S. patent application Ser. No. 12/501,572 is a non-provisional of, and claims the benefit of the filing date of, Provisional Appl. 61/146,120, filed on Jan. 21, 2009.

Each of which the above applications is hereby incorporated by reference in its entirety.

BACKGROUND

1. Field

The present invention is generally related to consumer comparison shopping and usage based service analysis.

2. Description of the Related Art

While consumer comparison shopping for products is known, an unbiased way of comparison shopping for competing services is unavailable. Often a consumer may only be aware of some of the information related to a service provider's services, options, terms, conditions, costs, and the like. Also, the consumer may not be aware of how the service options change based on their particular usage characteristics. Thus, there remains a need for a consumer comparison shopping method that obtains actual or predicted service usage data from the consumer and service provider information in order to present the consumer with relevant alternative service offering options.

SUMMARY

In embodiments, methods and systems may comprise gathering transaction data from a user's financial account, analyzing the transaction data for a savings opportunity indication, matching a savings opportunity from a database of savings opportunities to the user based on the savings opportunity indication, and displaying the savings opportunity in association with a statement of a user's financial account. Further, a past response may be gathered to a savings opportunity indication and analyzing it, wherein the savings opportunity is based on both the analyzed transaction data and past response data. The statement may be an online statement, an online graphical user interface associated with the user's financial account, an online bill pay area, a dialog box associated with the user's financial account, an ATM receipt, a teller receipt, a mobile statement, a paper statement, and the like. The step of analyzing may comprise extracting at least one of a merchant name, a merchant category, a merchant location, a store number, a transaction amount, a transaction frequency, a zip code, a store category, a transaction description, and a total spending amount. The step of analyzing may comprise analyzing the transaction data for a savings opportunity indication relating to a merchant. The step of analyzing may comprise analyzing the transaction data for a savings opportunity indication relating to a market segment. The step of displaying the savings opportunity may comprise displaying the savings opportunity within a field of the statement where prior transaction data may be presented. The savings opportunity may be presented interweaved within the presented prior transaction data. The step of displaying the savings opportunity may comprise displaying the savings opportunity within a field of the statement not where prior transaction data may be presented. The user's financial account may be a credit card account, a bank account, a checking account, a savings account, a personal finance program account, a loan account, and the like. The step of analyzing may comprise anonymizing the transaction data. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction. The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program. The merchant loyalty program may be implemented through the use of a transaction card associated with the financial account. The merchant loyalty program may be implemented by providing the user with a printed coupon, a bar code coupon presented on a mobile device, a credit on a merchant loyalty card, and the like. Wherein analyzing the transaction data may comprise analyzing market segment information. The step of matching may be limited to savings opportunities near a user's identified location. The user's location may be identified manually by the user. The user's location may be identified automatically from a mobile device implementing the method.

In embodiments, methods and systems may comprise following a secure user login procedure, presenting a graphical user interface where a user's financial transaction data are presented, wherein the financial transaction data were obtained from a financial institution that maintains a financial account on behalf of the user, and presenting a savings opportunity, in proximity to the financial transaction data, wherein the savings opportunity relates to the financial transaction data. The sales offer may be presented in an interweaved fashion amongst more than one financial transaction of the financial transaction data. The financial account may be a credit card account, a bank account, a checking account, a savings account, a personal finance program account, a loan account, and the like. A past response may be gathered to a savings opportunity and analyzing it, wherein the current savings opportunity may be based on both the financial transaction data and past response data. The savings opportunity may relate to an aspect of the financial transaction data chosen from a merchant name, a merchant category, a merchant location, a store number, a transaction amount, a transaction frequency, a zip code, a store category, a transaction description, a total spending amount, and the like. Further, the financial transaction data may be anonymized. The step of presenting may be limited to savings opportunities near a user's identified location. The user's location may be identified manually by the user. The user's location may be identified automatically from a mobile device implementing the method. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction. The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program.

In embodiments, methods and systems may comprise presenting an opportunity to assess alternative offerings related to a financial transaction from a user's financial account, wherein the financial transaction is related to a presently selected offering, in response to the selection of the opportunity, gathering transaction data relating to the presented selected offering and analyzing the transaction data, wherein the step of analyzing involves normalizing the transaction data such that a comparison to other offers can be assessed, collecting offer data relating to an alternative offering and normalizing the offer data such that a comparison with the normalized transaction data can be assessed, comparing the normalized transaction data with the normalized offer data to assess if the alternative offering presents an improvement to the user in comparison to the presently selected offering, and presenting the alternative offering to the user if the alternative offering presents an improvement. Presenting may be done in a statement. The statement may be an online statement, an online graphical user interface associated with the user's financial account, an online bill pay area, a dialog box associated with the user's financial account, an ATM receipt, a teller receipt, a mobile statement, a paper statement, and the like. The financial transaction may be presented in a bill for payment in an online bill pay area. The improvement may be related to at least one of a cost, a coverage, a quality, and a rating. The user financial account is may be a credit card account, a bank account, a checking account, a savings account, a personal finance program account, a loan account, and the like. Analyzing the transaction data may involve extracting a merchant name, a merchant category, a merchant location, a transaction amount, a transaction frequency, a zip code, a store name, a store category, a store number a transaction description, a purchase frequency, a total spending amount, and the like. Further, the transaction data may be anonymized.

In embodiments, methods and systems may comprise presenting, in a user financial account graphical user interface, an opportunity to assess alternative offerings related to a transaction that is presented within the account graphical user interface, wherein the transaction is related to a presently selected offering, and in response to the selection of the opportunity, redirecting the user to an alternative offering graphical user interface adapted to present the user with alternative offerings. The bill's details may be analyzed and normalized for comparison with an alternative offering that has been normalized, and if the alternative offering presents an improvement in comparison to the presently selected offering, the alternative offering may be presented in the alternative offering graphical user interface. The bill details may include a merchant name, a merchant category, a merchant location, a transaction amount, a transaction frequency, a zip code, a store name, a store category, a store number a transaction description, a purchase frequency, a total spending amount, and the like. The improvement may be related to a cost, a coverage, a quality, a rating, and the like. The financial account may be a credit card account, a bank account, a checking account, a savings account, a personal finance program account, a loan account, and the like. Further, the transaction may be anonymized. The opportunity to assess alternative offerings may relate to a plurality of transactions.

In embodiments, methods and systems may comprise gathering transaction data relating to a user's bill wherein the bill is related to a presently selected offering, analyzing the transaction data, wherein the step of analyzing involves normalizing the transaction data such that a comparison to other offers can be assessed, collecting offer usage data relating to an alternative offering and normalizing the offer usage data such that a comparison with the transaction data can be assessed, comparing the normalized transaction data with the normalized offer usage data to assess if the alternative offering presents an advantage to the user in comparison to the presently selected offering, and in response to an assessment indicating that the alternative offering presents an improvement to the user, presenting, in a user financial account statement, an indication that an alternative offering related to the bill is available. The statement may be an online statement, an online graphical user interface associated with the user's financial account, an online bill pay area, a dialog box associated with the user's financial account, an ATM receipt, a teller receipt, a mobile statement, a paper statement, and the like. The improvement may be related to a cost, a coverage, a quality, a rating, and the like. The financial account may be a credit card account, a bank account, a checking account, a savings account, a personal finance program account, a loan account, and the like. Analyzing the transaction data may comprise anonymizing the transaction data.

In embodiments, methods and systems may comprise presenting a statement of a user's financial transaction data, where the financial transaction data were obtained from a financial institution that maintains a financial account on behalf of the user, and presenting a map of a geographic area and indicating where, within the geographic area, a savings opportunity is presented, wherein the savings opportunity relates to the financial transaction data. The map may be presented in proximity to the financial transaction data. The map may be presented in a separate window from the financial transaction data. The statement may be an online statement, an online graphical user interface associated with the user's financial account, an online bill pay area, a dialog box associated with the user's financial account, an ATM receipt, a teller receipt, a mobile statement, a paper statement, and the like. The financial account may be a credit card account, a bank account, a checking account, a savings account, a personal finance program account, a loan account, and the like. Further, the financial transaction data may be anonymized. The geographic area may relate to a user's identified location. The user's location may be identified manually by the user. The user's location may be identified automatically from a mobile device implementing the method. The savings opportunity may comprise an offer to perform a bill analysis. Further, generating and displaying a link may be provided in a graphical user interface to the user's financial account, to a transaction assessment user interface to compare the transaction to a plurality of alternative offers. The savings opportunity may be a coupon. The coupon may be a barcode presented on a mobile device. The coupon may be a printed coupon presented in a statement. The coupon may be an online redemption coupon code. The savings opportunity may be an automatic discount on a subsequent transaction.

The savings opportunity may be a credit on a subsequent transaction. When the user makes the subsequent transaction, the user may receive the credit. The savings opportunity may be a pre-paid offer. The pre-paid offer may be charged immediately to the user's financial account. The pre-paid offer may be redeemed via an online coupon code, an in-store coupon, a mobile phone coupon, and the like. The savings opportunity may be a merchant loyalty program.

In embodiments, methods and systems may comprise gathering transaction data from a user for a merchant from a user's financial account, where the user's financial account is a financial institution account that is maintained on behalf of the user; analyzing the transaction data to determine if an aspect of the transaction data meet a criteria set by the merchant; if the transaction data meet the criteria, matching a savings opportunity from the merchant to the user based on the analyzed transaction data; and enabling the user to redeem the savings opportunity during a subsequent transaction with the merchant. The criteria may comprise a total spending amount with the merchant, a number of transactions with the merchant, a number of transactions within a category, total spending during a period of time, a particular transaction, a particular set of transactions, a transaction at a particular merchant location, and the like. The financial account may be a bank account, a checking account, a savings account, a credit account, a personal finance program account, a loan account, and the like. Enabling may comprise automatic redemption upon presentation of a transaction card associated with the user's financial account. Enabling may comprise providing the user with a printed coupon, a bar code coupon presented on a mobile device, a credit on a merchant loyalty card, and the like. Analyzing may comprise anonymizing the financial transaction data. Analyzing may comprise extracting a merchant name, a merchant category, a merchant location, a transaction amount, a transaction frequency, a zip code, a store name, a store category, a store number, a transaction description, a purchase frequency, a total spending amount, and the like.

In embodiments, methods and systems may comprise gathering transaction data from a user for a merchant from a user's financial account, wherein the user's financial account is a financial institution account that is maintained on behalf of the user; analyzing the transaction data; matching a savings opportunity from the merchant to the user based on the analyzed transaction data; and enabling the user to redeem the savings opportunity during a subsequent transaction with the merchant. The financial account may be a bank account, a checking account, a savings account, a credit account, a personal finance program account, a loan account, and the like. Enabling may comprise automatic redemption upon presentation of a transaction card associated with the user's financial account. Enabling may comprise providing the user with at least one of a printed coupon, a bar code coupon presented on a mobile device, and a credit on a merchant loyalty card. Analyzing may comprise anonymizing the financial transaction data. Analyzing may comprise extracting a merchant name, a merchant category, a merchant location, a transaction amount, a transaction frequency, a zip code, a store name, a store category, a store number, a transaction description, a purchase frequency, a total spending amount, and the like.

In embodiments, methods and systems may comprise presenting a merchant bill assessment graphical user interface where an indication of a savings opportunity is presented, and in response to a placement of a savings opportunity in a graphical user interface associated with a user's financial account, wherein the savings opportunity was related to one or more transactions processed through the user's financial account, tracking interaction with the savings opportunity and reporting the tracking to a merchant through the merchant bill assessment graphical user interface. The reporting may comprise reporting on a total spending amount with the merchant, a number of transactions with the merchant, a number of transactions within a category, total spending during a period of time, a particular transaction, a particular set of transactions, a transaction at a particular merchant location, and the like.

In embodiments, methods and systems may comprise an executable script such that when embedded in a graphical user interface of a user's financial account will automatically provide the user, through the graphical user interface, a savings opportunity interface, wherein savings opportunities relating to user financial transactions will be presented. The executable program may be implemented in the JavaScript programming language.

In embodiments, methods and systems may comprise embedding an executable script in a graphical user interface of a user's financial account, executing the executable script when the user accesses the user financial account; and using the executable script to: (1) gather transaction data from the user financial account and anonymize the transaction data before transmitting the anonymized transaction data to a server for analysis; (2) instruct a decision engine in communication with the server to select a savings opportunity to match to the user based on the anonymized transaction data analyzed by the server; (3) receive an indication of the matched savings opportunity from the decision engine; and (4) display the savings opportunity in the user financial account graphical user interface. Analyzing may comprise extracting a merchant name, a merchant category, a merchant location, a transaction amount, a transaction frequency, a zip code, a store name, a store category, a store number, a transaction description, a purchase frequency, a total spending amount, and the like. Further, the executable script may be used to instruct the decision engine to consult a rules database in making the match. The rules database may comprise criteria that the transaction data should meet before a match is made. The criteria may comprise a total spending amount with the merchant, a number of transactions with the merchant, a number of transactions within a category, total spending during a period of time, a particular transaction, a particular set of transactions, a transaction at a particular merchant location, and the like. The financial account may be a bank account, a checking account, a savings account, a credit account, a personal finance program account, a loan account, and the like.

In embodiments, methods and systems may comprise: providing an executable script such that when embedded in a graphical user interface of a user's financial account will automatically provide a merchant with anonymized information relating to transactions made by the user from the user's financial account; and in response to receipt of the anonymized information, enabling the merchant to present a savings opportunity to the user, which will appear in the graphical user interface. The executable program may be implemented in the JavaScript programming language. The user may select to which merchants the executable program can transmit the anonymized information. A user financial account host may select to which merchants the executable program can transmit the anonymized information.

In embodiments, methods and systems may comprise embedding a first executable script in a graphical user interface of a user's financial account, executing the first executable script when the user accesses the user financial account, and using the first executable script to: (1) gather transaction data from the user financial account and anonymize the transaction data before transmitting the anonymized transaction data to a first server for analysis and (2) specify the address of a second executable script, wherein the second executable script accesses the analyzed transaction data and performs a function with the analyzed transaction data. The executable script may be implemented in the JavaScript programming language.

In embodiments, methods and systems may comprise embedding an executable script in a graphical user interface of a user's financial account, executing the executable script when the user accesses the user financial account, and using the executable script to: (1) gather transaction data from the user financial account and anonymize the transaction data before transmitting the anonymized transaction data to a server for analysis; and (2) transmit the transaction data to a third party application to be leveraged. The third party application may be a fraud detection application. The third party application may be a transaction analytics application. The third party application may be a marketing application. The third party application may be a social networking application. The executable script may be implemented in the JavaScript programming language.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

Detailed description of certain embodiments thereof may be understood by reference to the following figures:

FIG. 3 depicts an alternative service offering model.

FIG. 13 depicts a flow diagram of a method for comparing internet, television, and telephone service offerings.

FIG. 14 depicts a screenshot of a user account.

FIG. 15 depicts a wireless plan log in window.

FIG. 17 depicts an alternative service plan recommendation window.

FIG. 18 depicts a screenshot of a user account.

FIG. 19 depicts a data entry window for a gasoline savings application of the system.

FIG. 20 depicts a map showing results of the gasoline savings application.

FIG. 24 depicts a screenshot of a user account.

FIG. 25 depicts a deal purchase window.

FIG. 31 depicts an integrated bill analysis, with 'like/dislike' button.

FIG. 33 depicts a welcome and login for an embodiment bank dashboard.

FIG. 35 depicts rewards controls for an embodiment bank dashboard.

FIG. 38 depicts financial institution management for an embodiment bank dashboard.

FIG. 39 depicts an approve-deny window for financial institution management for an embodiment bank dashboard.

FIG. 43 depicts a campaign window for creating a reward in an embodiment merchant dashboard.

FIG. 44 depicts a campaign window for targeting a reward in an embodiment merchant dashboard.

DETAILED DESCRIPTION

Figure 1:
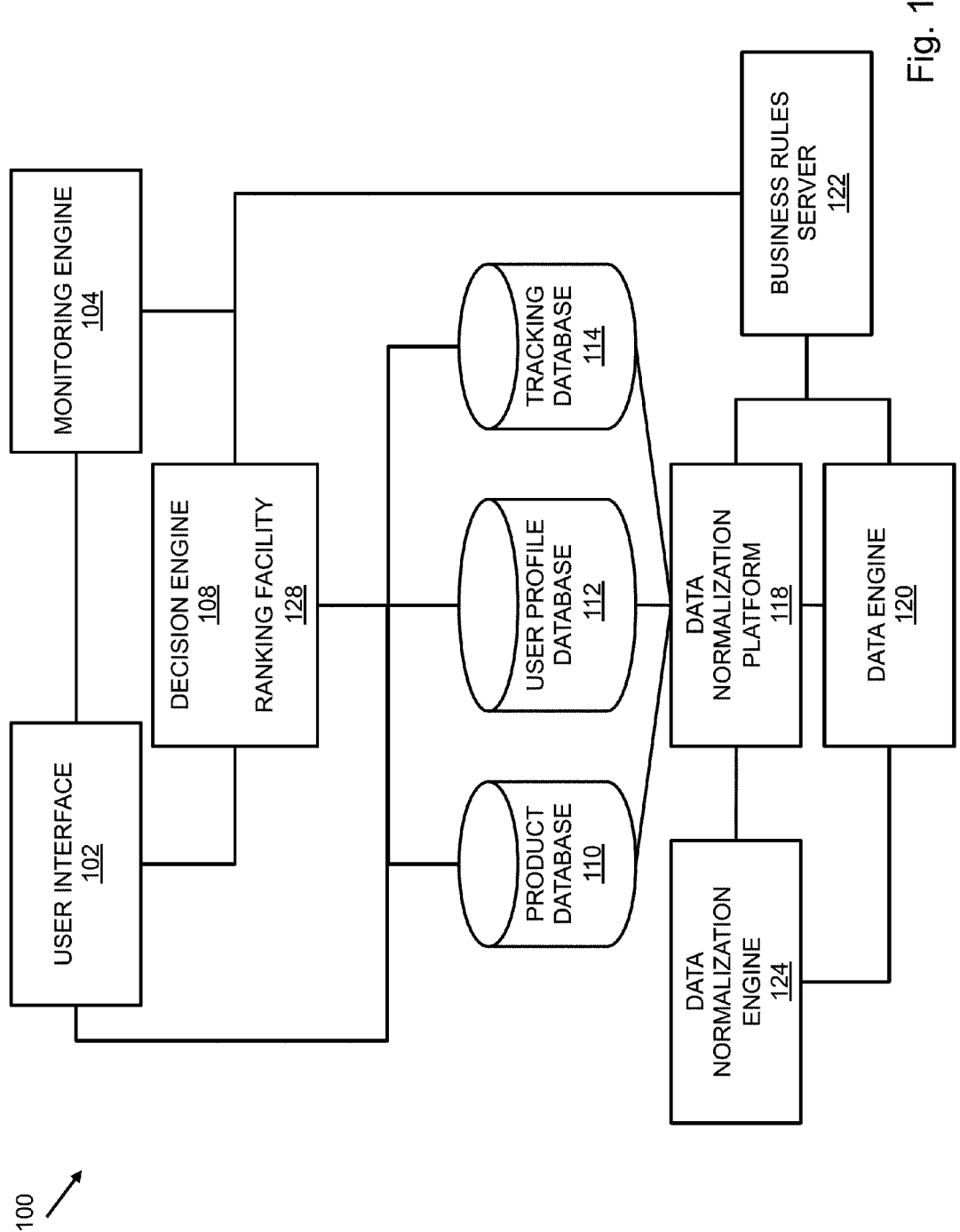
FIG. 1 depicts a block diagram of a consumer service comparison shopping system.

Referring to FIG. 1, an embodiment of a consumer service comparison shopping system 100 is depicted. Through the user interface 102, a user may access the decision engine 108 and monitoring engine 104. In an embodiment, the user interface 102 may be embodied in a website. The user may enter service usage data and preference data into a user profile database 112. For example, the data may include a geographical location, a current service provider, a current service cost, a current service usage, a predicted future service usage, preferences for future service, and other pertinent information. In an alternative embodiment, the data may be gathered automatically from the user's service provider by a data engine 120, such as by logging in to a user's service account after obtaining authorization from the user for release of such information. The data normalization platform 118 may normalize data obtained from the user and stored in the user profile database 112, data obtained about the user's service usage using the data engine 120, as well as alternative service offering data stored in a product database 110. A data normalization engine 124 may perform the normalization step. The decision engine 108 may utilize the usage and preference data from the consumer along with the business rules server 122 to determine how the user's needs, based on a previous or predicted future usage, and preferences match with alternate service offerings offered by various service providers. The decision engine 108 may organize the usage data based on the business rules server 122, and then determines how well each service offering fits the user based on one or more factors, such as total cost, per unit cost, service quality, and the like. The user may then be given the option to select an alternative service offering based on the recommendation by the decision engine 108. The user may be given the option to proceed to acceptance of terms and conditions as well as payment for services. In an embodiment, the monitoring engine 104 may repeat the process of obtaining and normalizing alternative service offering data and comparing it to the user's needs and preferences to determine on an updated basis which alternative service offering best fits the user's needs and preferences. The tracking criteria and output of the monitoring engine 104 may be stored in the tracking database 114. For example, the monitoring engine 104 may repeat the process when a new service offering becomes available, when a user's service usage changes, when a user moves to a new geographic location, when a user indicates a desire to do so, and the like. The user may be alerted when the process is repeated.

Figure 2:
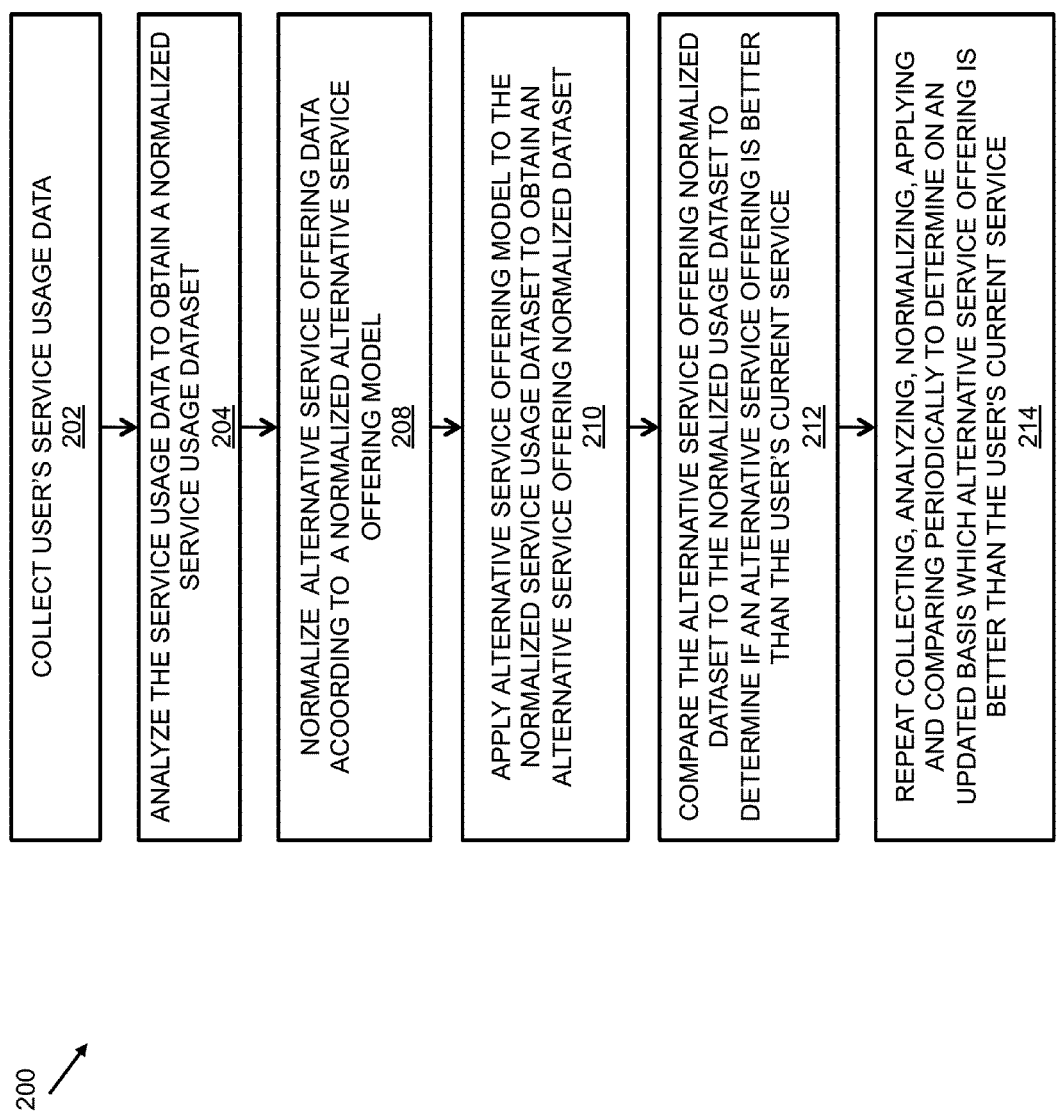
FIG. 2 depicts a flow diagram for comparing alternative service offerings.

Referring now to FIG. 2, a method of comparing service plans based on a user's service usage data may include the steps of collecting service usage data for a user's current service using a computer implemented facility 202, analyzing the service usage data to obtain a normalized service usage dataset 204, optionally, normalizing data related to a plurality of alternative service offerings according to a normalized alternative service offering model 208, applying the normalized alternative service offering model to the normalized service usage dataset to produce a plurality of alternative service offering normalized datasets, wherein the dataset comprises at least the cost for the alternative service offering 210, comparing the alternative service offering normalized datasets to the normalized usage dataset to determine if an alternative service offering is better than the user's current service 212, and optionally, repeating said collecting, analyzing, normalizing, applying and comparing periodically to determine on an updated basis which alternative service offering is better than the user's current service 214. It should be understood that the methods and systems described herein may be applicable to any service plan, policy, or offering engaged in by a user. For example, the service offering may relate to wireless telephony, wireless data, internet service, hotel services, restaurant services, rental car services, loans, insurance services, auto loans, home loans, student loans, life insurance, home insurance, casualty insurance, auto insurance, motorcycle insurance, disability insurance, financial services, a credit card, a checking account, a savings account, a brokerage account, an insurance policy, utility service, personal finance management, residential fuel, automotive fuel, a gym membership, a security service, television programming, VoIP, long distance calling, international calling, utilities, termite services, pest services, moving services, identity theft protection services, travel services, software applications, and the like. For example, in the case where the service offering is travel services, the system 100 may obtain information about a user's previous travel, such as what hotels they have stayed at and what level of service is offered by the hotel, what level of service the user purchases for flights, what type of car the user has rented, if the user pre-purchases tour packages, and the like. When the user requests that the system determine a new travel offering, the system may search for accommodations based on at least one aspect of the user's previous travel. The user's previous travel may be analyzed to obtain a normalized travel service usage dataset which may be compared to an alternative service offering normalized dataset to determine a travel service offering for the user.

In an embodiment, collecting service usage data for a user's current service using a computer implemented facility 202 may comprise the service usage data being input manually by the user to the computer implemented facility. For example, using the user interface 102, a wireless service user may indicate their service usage data, such as how much they spend a month, how many anytime minutes they use, how many wireless lines they have, if they send text, video, or MMS messages, how frequently they message, their geographic locations of use, and the like. The service usage data may be for a current use, past use, or a predicted future use. The service usage data may relate to more than one service plan. In an embodiment, the service usage data may relate to a single service usage parameter. In an alternative embodiment, the service usage data may be obtained automatically, such as with a secure retrieval application. For example, the user may give permission for the data engine 120 to log into the user's service account and obtain the service usage data. In an embodiment, the service usage data are obtained from usage records or billing records, either current or historical. In some embodiments, the data engine 120 obtains a copy of a bill and processes it to obtain the service usage data. The service usage data may relate to more than one service plan. In an alternative embodiment, the service usage data are obtained from an application. For example, the application may be an online banking application, personal financial management software, a bill payment application, a check writing application, a logging application, a mobile phone usage logging application, a computer usage logging application, a browsing application, a search application, and the like. The service usage data may consist of average usage data over a specified period of time in the past. The service usage data may be obtained independent of a user's billing data.

In an embodiment, analyzing the service usage data to obtain a normalized service usage dataset 204 may comprise processing historical usage data to obtain an average normalized usage dataset. Alternatively, processing a single time period's usage data may be done to obtain a normalized usage dataset for that time period. Normalizing usage data may be done by sorting the data according to service-related data types used to define a data model. In an embodiment, the data are sorted according the same data types used in the normalized alternative service offering model to facilitate applying the normalized alternative service offering model to the usage data In an embodiment, normalizing data related to a plurality of alternative service offerings may be done according to a normalized alternative service offering model. The data engine 120 is programmed to extract data related to alternative service offerings from multiple sources, some of which may be human-generated. For example, the data engine 120 may be programmed to know the location of rate plan data on a wireless carrier's website. The data related to the plurality of alternative service offerings may be obtained from a data vendor, a human-assisted normalization system, public information sources, direct connections to service providers, and the like. The data then are normalized according to an alternative service offering model. Normalizing data related to the plurality of alternative service offerings may include defining a plurality of service usage-related data types, such as number of peak minutes available, number of nights and weekend minutes available, and the like, collecting parameters related to a service usage using the computer implemented facility, such as how many minutes were used during a particular time period, and normalizing the service parameters according to the defined service usage-related data types to generate a normalized alternative service offering model. The data engine 120 may sort all of the data it collects for each plan and its potential add-on's according to the normalized alternative service offering model. As the data are collected from various sources, it is integrated according to the normalized alternative service offering model. Normalization occurs via at least one of two methods, semantic normalization, syntactic normalization, and the like. In semantic normalization, a string of characters or set of words, phrases, number, and the like may be determined to mean something specific in the data model. Semantic normalization may be done by human encoding, where humans decide the semantic meaning, or may be done in an automated fashion. For example, the normalized alternative service offering model may have only a field for afternoon rates, but a provider's rate plan segments the day according to chunks of hours, such as from 1 pm-4 pm, and the like. The data normalization platform 118 may examine the data from the service provider and determine that the 1 pm-4 pm time period rate should be described as an afternoon rate in the normalized alternative service offering model. The assignment of the provider's rate time period to a particular field of the normalized alternative service offering model may only need to be done once in order for the data normalization platform 118 to know how to interpret the data every time it pulls data automatically, such as for updating, from the service provider. In syntactic normalization, the data normalization platform 118 possesses certain information to convert certain patterns to others. For example, the data normalization platform 118 can extract the 1 pm to 2 pm time period and assign it to Hour A, extract the 2 pm to 3 pm time period and assign it to Hour B, extract the 3 pm to 4 pm time period and assign it to Hour C, and so on. In an embodiment, the data may be enhanced or validated prior to normalization.

In an embodiment, a canonical model for the user data may be defined manually. Then, an agent, or data engine, may be defined or taught so it knows how to map data from a given source into the canonical model. The data engine may be automated from then on. The data engine is taught by a human how to read the data, then convert that into a global concept, such as a model of a cell phone bill. Then the data engine may be instructed to run on a specific item, such as a bill from VERIZON, to pull data and map the data to a canonical model.

Figure 9:
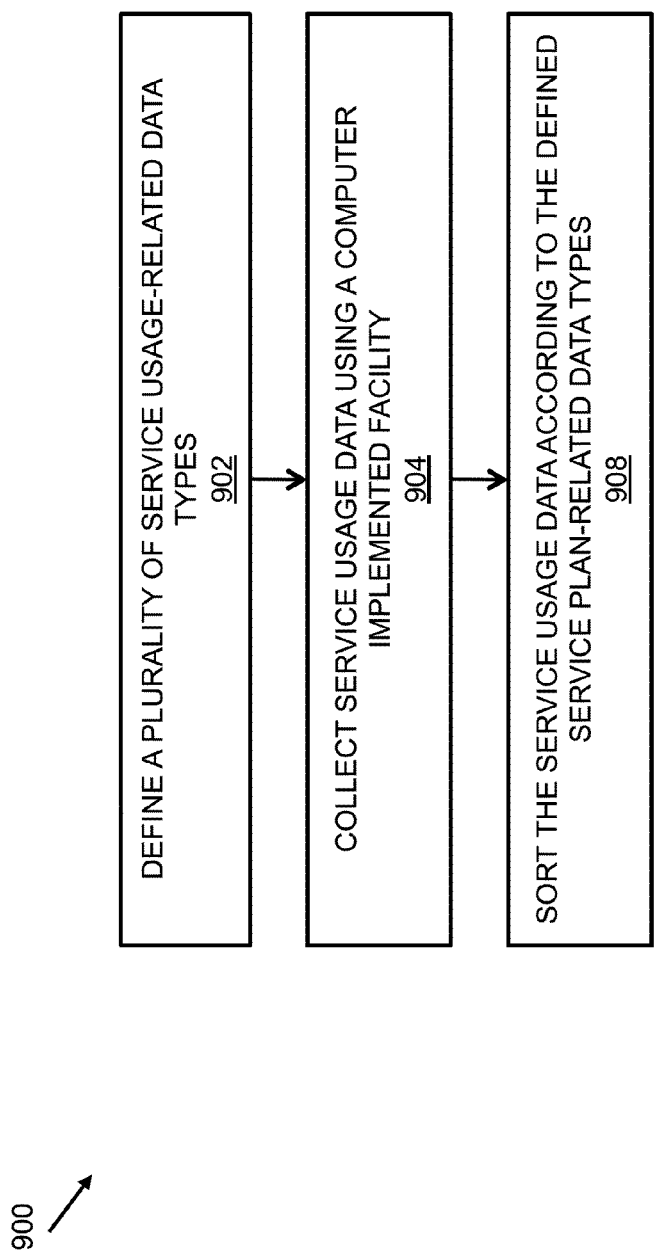
FIG. 9 depicts a flow diagram of a process for normalizing user data.

Referring to FIG. 9, a process for normalizing user data may include defining a plurality of service usage-related data types 902, collecting service usage data using a computer implemented facility 904, and sorting the service usage data according to the defined service plan-related data types 908.

In an embodiment, the business rules server 122 may enhance and/or validate the normalized data, either the normalized service usage dataset or the normalized alternative service offering dataset, and/or the normalized alternative service offering model. Rules may be applied to the datasets or model, such as rules regarding a given vertical, rules based on facts about a rate plan, add-on's, phones or devices, their relative importance in determining the best plan or an aggregate score, information about the user, information about similar users, and the like. The business rules server 122 may verify that the datasets and/or model fit known facts and heuristics stored in the business rules server 122.

In an embodiment, producing a plurality of alternative service offering normalized datasets may comprise applying the normalized alternative service offering model to the normalized service usage dataset. In some embodiments, the alternative service offering normalized datasets comprise at least the cost for the alternative service offering. The normalized alternative service offering model is applied to the normalized service usage dataset in order to determine what the cost of a particular alternative service offering would be given the user's service usage. For example, the normalized alternative service offering model may be envisioned as a matrix 300. For example, in FIG. 3, an embodiment of a model in the form of a matrix is shown. In this example and without limitation, the model is for wireless plans and comprises a Weekday, 7 am-8 am rate, a Weekday, 1 pm-2 pm, a Weekday, 11 pm-12 am rate, a Saturday 7 am-8 am rate, a messaging rate, a roaming rate, and a data rate. A person of skill in the art will understand that the model may include any defined data types, such as data by the hour, by ranges of time, by day, by weekend, and the like. Data may be acquired from each provider with regard to what their rates are during the defined time periods. For example, Provider A's Weekday, 7 am-8 am rate is $0.05/min while Provider D's is $0.07/min. The message rate for Provider A is $0.15/msg while Provider D's is $0.05/msg.

In an embodiment, determining if an alternative service offering is better than the user's current service may comprise comparing the alternative service offering normalized datasets to the normalized usage dataset. Applying the model to the usage data may comprise the decision engine 108 multiplying the number of minutes or messages used during the time period by the rate during the time period. If the data normalization platform 118 determined that 100 calls were made during the Weekday 7 am-8 am time period and the user sent and/or received 100 text messages, the cost for the Current Provider A, if only these two data types were considered, would be $20 while Provider D would be $12. The decision engine 108 may determine that given the user's service usage, the service offering from Provider D may be a better fit to the user given the lower cost. In an alternative embodiment, the data engine 120 may have pulled additional information, such as the opportunity to purchase an unlimited message plan, and placed it in the matrix 300. Therefore, when the model is applied to the service usage data, the decision engine 108 may perform an optimization with respect to messaging, calculating if it is cheaper to go with the pay-as-you-go plan or getting unlimited messaging. Continuing with the above example, if Current Provider A offered a flat rate for messaging of $5 per month while Provider D only offered the pay-per-message rate structure, the decision engine 108 optimization may result in Current Provider A offering the service offering with the better fit to the user given the lower cost of Current Provider A's service ($10) versus Provider D's service ($12). In this case, the user may be advised to not change their service provider but perhaps ask the provider to add on the flat message rate feature.

Cost may be only one component in determining if an alternative service offering is better than the user's current service. User preference, signal strength, terms and conditions, and the like may all be components of determining if an alternative service offering is better than the user's current service. In an embodiment, the decision engine 108 may perform a personalized impact analysis. The decision engine 108 may compute an aggregate score for each alternative service offering normalized dataset. For example, when the service offering is a wireless service, the aggregate score may include a normalization of the alternative service offering savings and signal strength. In an example, the data engine 120 may extract usage information then map the usage onto a wireless plan. In embodiments, the wireless plan may also have optional add-ons and Terms & Conditions added into the calculation for aggregate score. For any given service, the decision engine 108 may be able to select the best possible option from a range of service plans. Then, the decision engine 108 may be able to select optimal add-on's to achieve the lowest impact, or the best aggregate score. In embodiments, the user may be able to specify what criteria to include in the aggregate score calculation. In the case of wireless plans, wireless coverage or signal strength may also be a component of the aggregate score. Individual scores attributed to components of the service may be added together, often in a non-trivial formula, to weight them and come up with an aggregate score. For example, a score may be assigned to terms and conditions, a score may be assigned to signal strength, a score may be assigned to savings over a current service plan, and the like. Users may be able to set the weighting, such as with a slider or manually. Alternatively, certain assumptions may be made in providing an automatic weighting. Assumptions may be provided and stored on the business rules server 122.

The aggregate score may include cost and at least one other element. The other element may be selected from the group consisting of total cost, per unit cost, savings, and service quality. The instruction may further include collecting data points about the service offering and calculating the aggregate score based on those data points. The data points may be identified in the terms and conditions of the service offering. The data points may be in declarations related to the service offering.

In an embodiment, once an aggregate score is calculated, the alternative service plans may be ranked, such as according to aggregate score, according to savings, according to signal strength, according to a combination of the above, and the like, in order to compare the various alternative service plans. In some embodiments, the aggregate score may be plotted according to the overall cost of the service plan. In some embodiments, comparing service plans includes ranking the alternative service offerings according to total costs, per unit costs, and service quality or signal strength.

In an embodiment, after comparing service plans, the user may have the option to purchase a service plan or contact a current service provider in order to modify their current service.

In an embodiment, at any point during the process of collecting 202, analyzing 204, normalizing 208, applying 210 and comparing 212, an advertisement may be presented to the user, wherein the advertisement is selected based on an alternative service offering.

In an embodiment, the system 100 may repeat 214 the steps of collecting 202, analyzing 204, normalizing 208, applying 210 and comparing 212 periodically to determine on an updated basis which alternative service offering is better than the user's current service. The user may be alerted when an alternative service offering that is better than the user's current service is available, such as by email, phone, SMS, MMS, and the like. The repetition interval may be set by the user or may be a pre-determined system 100 interval. The user may also be alerted that the repetition 214 is occurring.

In an embodiment, the user may be a business entity.

In an embodiment, when the service offering is a wireless service offering, the service usage data and data related to the alternative service offering may relate to at least one of plan definitions, add-on's, carrier coverage networks, cost, included minutes, plan capacity, additional line cost, anytime minutes, mobile-to-mobile minutes, minutes overage, nights & weekends minutes, nights start, nights end, roaming minutes, peak/off-peak minutes, data/downloads/applications charges, data overages, data megabytes used/unused, most frequently called numbers, most frequently called locations, networks/carriers called, calls per day, time of day usage, day of week usage, day of month usage, overages, unused services, carrier charges, messaging, messaging overage, activation fees, early termination fees, payment preferences, carrier, current hardware, compatible hardware, hardware availability, coverage area, signal strength, included services, caller ID block, call waiting, call forwarding, caller ID, voicemail, visual voicemail, 3-way calling, insurance, at least one wireless service related item, and the like. Any of the aforementioned service usage data types may be used to calculate an aggregate score, in comparing service offerings, in ranking service offerings, and the like.

In an embodiment, when the service offering is a credit card service, the service usage data and data related to the alternative service offering may relate to at least one of monthly spending, spending categories, credit rating, current credit card, years of use of credit card, current balance, monthly pay-off amount, current APR, pay off every month, carry a balance, sign-up bonus, bonus rewards, base earning rate, maximum earning rate, earning limit, total value of rewards, earned program promotions, spend program promotions, net asset promotions, annual fee, late fee, balance transfer fee, cash advance fee, purchases APR, introductory APR, regular APR, penalty APR, balance transfer APR, cash advance APR, typical redemptions, redemption options, rewards type, credit card network, credit card issuer, features and benefits, at least one credit card related item and the like. For example, typical redemptions may include domestic airfare, international airfare, car rentals, cash rebates, charitable donations, consumer electronics, cruises, hotel stays, restaurants, shopping, and the like. The redemption may relate to an item of value, a service, and a class of services. The class of services may be one of first class, business class, coach class, and premium class.

A user may weight the availability of domestic airfare redemption options higher than the option of receiving a cash rebate, and the weighting may be used to rank credit card offerings accordingly. In another example, the rewards type may be at least one of cash, points, certificates, vouchers, discounts, and miles. In another example, the features and benefits may include at least one of instant approval, no annual fee, secured card, no fraud liability, 24 hr. customer service, airport lounge access, auto rental insurance, concierge service, emergency replacement, extended warranty, online account management, photo security, price protection, purchase protection, return protection, roadside assistance, travel insurance, and the like. Any of the aforementioned credit card data types may be used to calculate an aggregate score, in comparing credit card offerings, in ranking credit card offerings, and the like.

Figure 4:
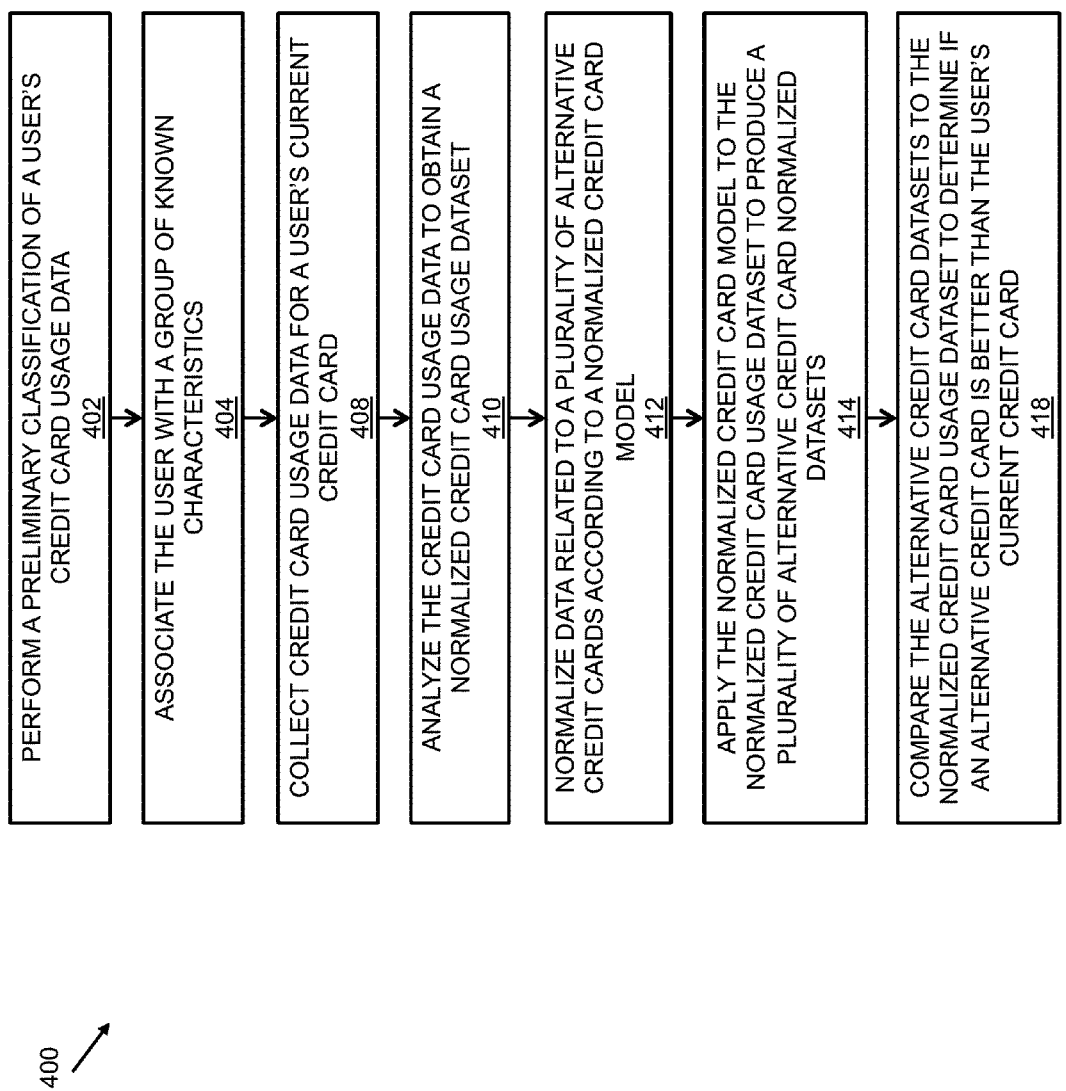
FIG. 4 depicts a flow diagram for comparing alternative credit card offerings.
Figure 5:
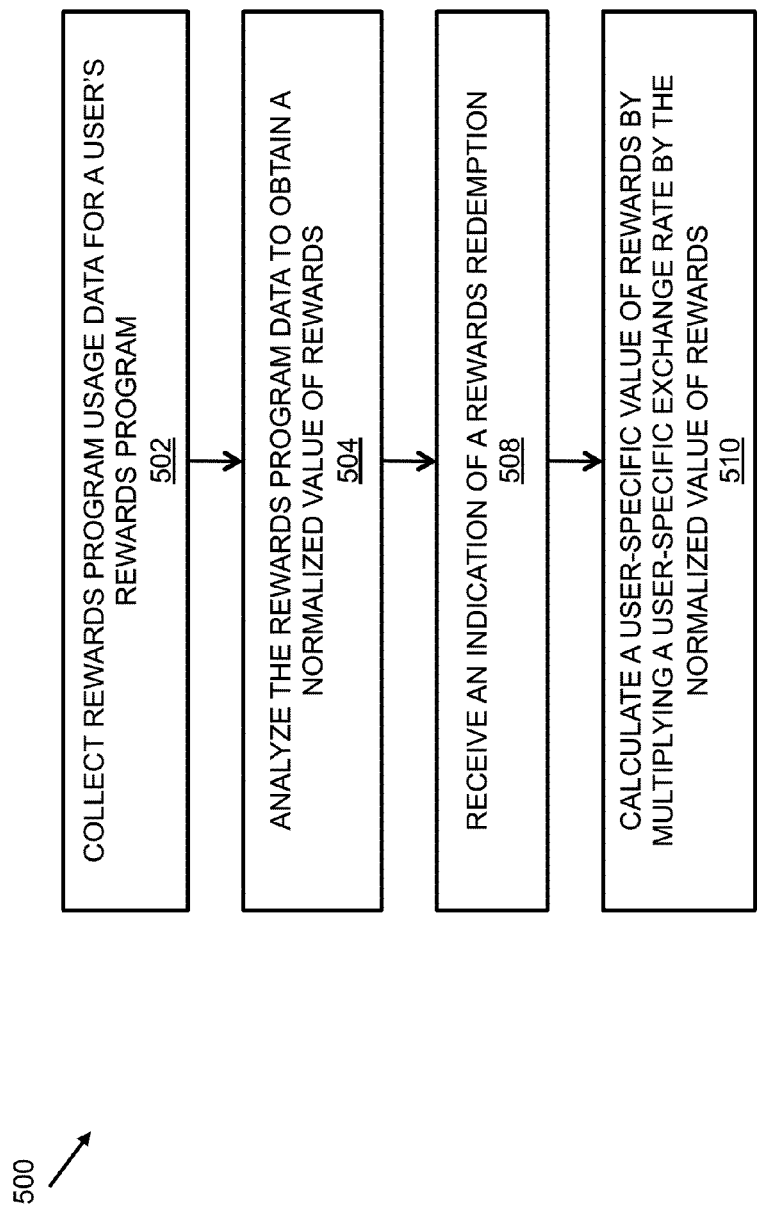
FIG. 5 depicts a flow diagram for comparing alternative credit card offerings according to a value of rewards.

Referring now to FIG. 4, in embodiments, the service offering may be a credit card offering. When the service offering is a credit card offering, a preliminary classification of a user's credit card usage data 402 may be performed to associate the user with a group of known characteristics 404. For example, the group may be those that pay their credit cards off every month, those that carry a balance, and the like. In an example, if the user pays off their balance every month, the credit card usage data collected in subsequent steps may include monthly spending, credit rating, categories of spending, current credit card, number of years holding current credit card, and the like. In another example, if the user does not pay off their balance every month, the credit card usage data collected may be monthly spending, credit rating, categories of spending, current credit card, number of years holding current credit card, existing balance, interest rate, late payments, monthly payment, and the like. After associating the user with a group of known characteristics 404, credit card usage data may be collected for a user's current credit card 408 using a computer implemented facility according to the preliminary classification. The credit card usage data may be analyzed to obtain a normalized credit card usage dataset 410. Analyzing may include processing historical usage data to obtain an average normalized usage dataset, processing a single time period's usage data to obtain a normalized usage dataset for that time period, and the like. Data related to a plurality of alternative credit cards may be normalized according to a normalized credit card model 412. Normalizing data related to the plurality of alternative credit cards may include defining a plurality of credit card usage-related data types, collecting parameters related to a credit card usage using the computer implemented facility, and normalizing the credit card parameters according to the defined credit card usage-related data types to generate a normalized alternative credit card model. Then, the normalized credit card model may be applied to the normalized credit card usage dataset to produce a plurality of alternative credit card normalized datasets 414. A comparison of the alternative credit card datasets with the normalized credit card usage dataset may reveal if an alternative credit card is better than the user's current credit card 418. Comparing may include ranking the alternative credit cards according to an aggregate score calculated for the alternative credit card normalized dataset, an aspect of the alternative credit card normalized dataset, and the like. In an embodiment of comparing, the aggregate score may be plotted against the cost for the alternative credit card. The aspect may be the total card cost, a value of rewards, an additional earnings over the user's current credit card, a savings over the user's current credit card, at least one of an introductory purchase APR, an introductory rate period, a purchase APR, an annual fee, a balance transfer fee, and a credit level required, at least one of a reward type, a rewards sign-up bonus, a base earning rate, a maximum earning rate, and an earning limit, and the like. As described previously, an aggregate score for each of the plurality of alternative credit card normalized datasets may be calculated, where the score may be used for ranking. As described previously, users may specify which components of the dataset or terms & conditions to include in the calculation for the aggregate score and with what weighting to include them. Credit card data, both usage and alternative credit cards, may be obtained from public information sources, direct connections to credit card providers, automatically, input manually by the user to a computer implemented facility for a current card usage or predicted future credit card usage, chosen by a user from among a sampling of standard credit card profiles, for multiple credit cards, and the like. In some embodiments, credit card usage data may be obtained by the data engine 120 in a computer readable format, such as in a billing record. The billing record may be for a current bill only, may be historical billing data, may be a paper bill, an electronic bill, and the like. Once the user may have compared various credit card offerings, they may be provided the option of applying for a selected credit card, contact a current credit card provider in order to modify their current credit card terms and conditions, and the like.

In an embodiment, at any point during the process of performing 402, associating 404, collecting 408, analyzing 410, normalizing 412, applying 414 and comparing 418, an advertisement may be presented to the user, wherein the advertisement is selected based on an alternative service offering.

In an embodiment, the system 100 may repeat the steps of performing 402, associating 404, collecting 408, analyzing 410, normalizing 412, applying 414 and comparing 418 periodically to determine on an updated basis which alternative service offering is better than the user's current service. The user may be alerted when an alternative service offering that is better than the user's current service is available, such as by email, phone, SMS, MMS, and the like. The repetition interval may be set by the user or may be a pre-determined system 100 interval. The user may also be alerted that the repetition is occurring.

In an embodiment, the user may be a business entity.

In an embodiment, the credit card usage data and data related to the alternative credit card may relate to at least one of monthly spending, spending categories, credit rating, current credit card, years of use of credit card, current balance, monthly pay-off amount, current APR, pay off every month, carry a balance, sign-up bonus, bonus rewards, base earning rate, maximum earning rate, earning limit, total value of rewards, earned program promotions, spend program promotions, net asset promotions, annual fee, late fee, balance transfer fee, cash advance fee, purchases APR, introductory APR, regular APR, penalty APR, balance transfer APR, cash advance APR, typical redemptions, redemption options, rewards type, credit card network, credit card issuer, features and benefits, and the like. For example, typical redemptions may be for domestic airfare, international airfare, car rentals, cash, charitable donations, consumer electronics, cruises, hotel stays, restaurants, and shopping. The rewards type may be one of cash, points, and/or miles. The features and benefits may include at least one of instant approval, no annual fee, secured card, no fraud liability, 24 hr. customer service, airport lounge access, auto rental insurance, concierge service, emergency replacement, extended warranty, online account management, photo security, price protection, purchase protection, return protection, roadside assistance, travel insurance, and the like.

In an alternative embodiment, credit card usage data may be analyzed to obtain a value of rewards. For example, credit card usage data for a user's current credit card may be collected 502, such as by using a computer implemented facility. Then the data may be analyzed to obtain a value of rewards 504. An indication of a rewards redemption may be received 508. A user-specific value of rewards may be calculated by multiplying a user-specific exchange rate by the normalized value of rewards 510. In addition to the rewards program data described herein, information related to calculating a value of rewards may also be collected 502. Analyzing 504 may include processing historical usage data to obtain an average value of rewards, processing a single time period's usage data to obtain a value of rewards for that time period, and the like. The exchange rate may relate to the currency system of the user's country or a different country. The system 100 may automatically compare the value of rewards in different currencies because the system 100 may be able to convert the value of a reward point to a dollar in a personalized way. The personalized exchange rate for you may depend on what the user wants to redeem the points for. For example, redemption outside the user's country might have much more value than redemption inside the user's country. In the example, a user might get as much as 4 cents per point as compared to 0.5 cents per point depending on what, and where, the user redeems the points. Certain currencies, for example, may be more valuable to one user when compared to another user.

In an embodiment, the system 100 may repeat the steps of collecting 502, analyzing 504, receiving 508, and calculating 510 periodically to determine on an updated basis a user-specific value of rewards. The user may be alerted when a reward of a different or particular value is available, such as by email, phone, SMS, MMS, and the like. The repetition interval may be set by the user or may be a pre-determined system 100 interval. The user may also be alerted that the repetition is occurring.

Figure 6:
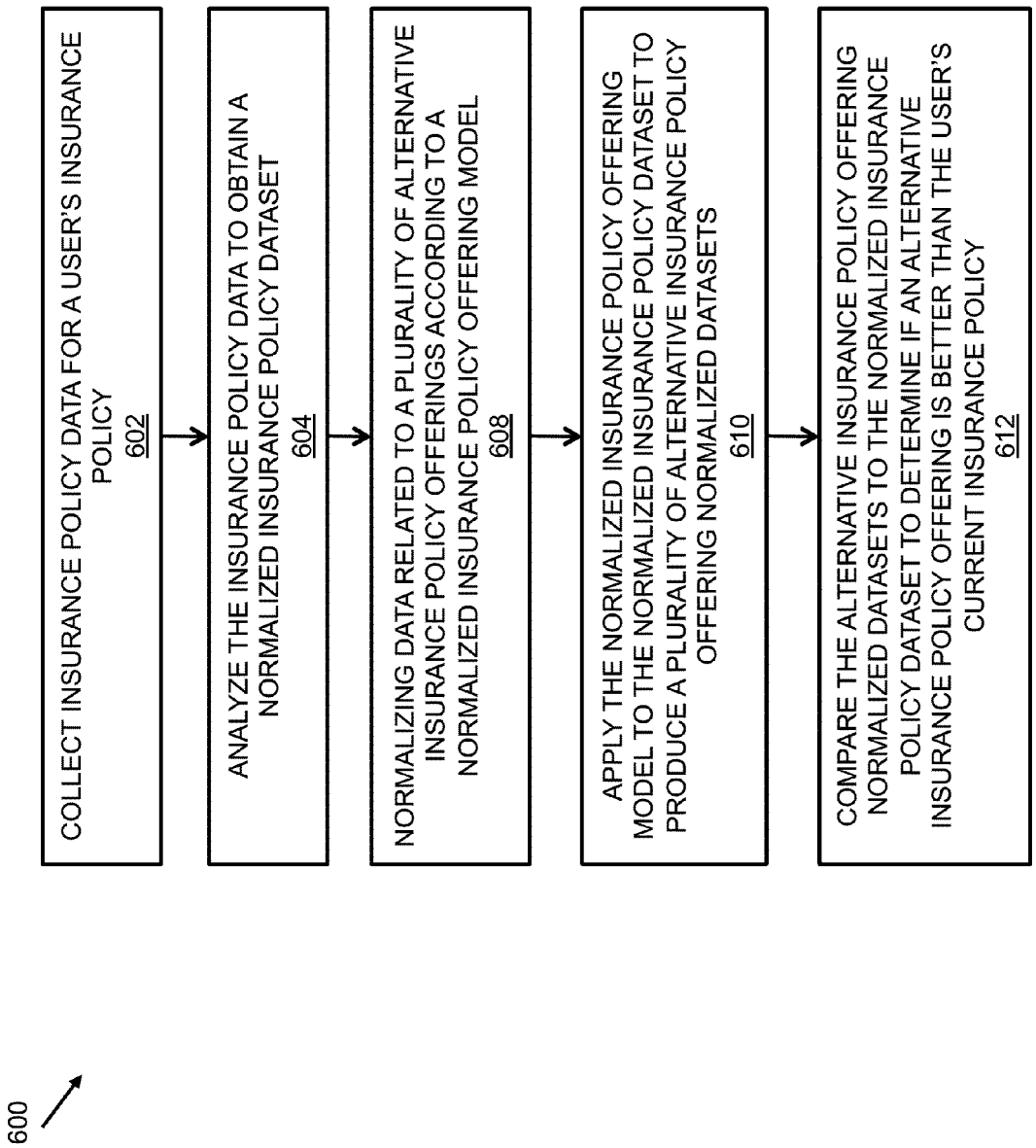
FIG. 6 depicts a flow diagram for comparing insurance policies.

Referring to FIG. 6, when the service offering relates to an insurance policy, data for a user's current insurance policy may be collected using a computer implemented facility 602. The insurance policy may be at least one of life insurance, auto insurance, health insurance, disability insurance, home insurance, and renter's insurance. Then, the insurance policy data may be analyzed to obtain a normalized insurance policy dataset 604. Analyzing may include processing historical insurance policy data to obtain a normalized insurance policy dataset that represents an average dataset, or processing a single time period's insurance policy data to obtain a normalized insurance policy dataset for that time period. Data related to a plurality of alternative insurance policy offerings may be normalized according to a normalized insurance policy offering model 608. Normalizing data related to the plurality of insurance policy offerings may include defining a plurality of insurance policy-related data types, collecting parameters related to an insurance policy using the computer implemented facility, and normalizing the insurance policy parameters according to the defined insurance policy-related data types to generate a normalized alternative insurance policy offering model. The normalized insurance policy offering model may be applied to the normalized insurance policy dataset to produce a plurality of alternative insurance policy offering normalized datasets 610. Then, the alternative insurance policy offering normalized datasets may be compared with the normalized insurance policy dataset to determine if an alternative insurance policy offering is better than the user's current insurance policy 612. Comparing may include ranking the alternative insurance policy offerings according to cost, plotting the cost versus an aggregate score calculated for the alternative insurance policy, ranking the alternative insurance policy offerings according to an aspect of the alternative insurance policy offering normalized dataset, ranking the alternative insurance policy offerings according to cost and an aspect of the alternative insurance policy offering normalized dataset, and the like. Insurance policy data may include at least one of policy terms and conditions, policy cost, policy benefits, claims made against existing or recent policies, location of residence, make, model, and age of automobiles, driving records of insured parties, length of stay at current residence and employment or school, desired automobile, preference for future residence, policy features such as towing services property tax information, property value information, a driving record, property tax information, and the like. Insurance policy data may be input manually by the user to the computer implemented facility, may be a predicted future usage, may be automatically collected by the computer implemented facility, may include comprise billing records, may be automatically collected by the computer implemented facility from at least one of an insurer and a government agency, and the like. The billing records may be for a current bill only, historical billing data, a paper bill, and the like. In an embodiment, the program instructions further include analyzing the terms and conditions, calculating an aggregate score for the terms and conditions, and adding the aggregate score to the aggregate score for the normalized usage dataset or alternative insurance policy offering normalized dataset. In an embodiment, the program instructions further include calculating an aggregate score for each of the plurality of alternative insurance policy offering normalized datasets. In an embodiment, the program instructions further include ranking the plurality of alternative insurance policy offering normalized datasets based on the aggregate score. The user may specify which aspects of the alternative insurance policy offering normalized dataset to include in the aggregate score. In an embodiment, the system 100 may repeat the steps of collecting 602, analyzing 604, normalizing 608, applying 610 and comparing 612 periodically to determine on an updated basis which alternative insurance policy is better than the user's current insurance policy. The user may be alerted when an alternative insurance policy that is better than the user's current insurance policy is available, such as by email, phone, SMS, MMS, and the like. The repetition interval may be set by the user or may be a pre-determined system 100 interval. The user may also be alerted that the repetition is occurring. In an embodiment, the user may be a business entity. After the program instructions have been completed, the user may have the option to purchase a selected insurance policy offering, contact a current insurance policy provider in order to modify their current insurance policy, and the like. In an embodiment, an advertisement may be presented to the user, wherein the advertisement is selected based on an alternative insurance policy offering.

Figure 10:
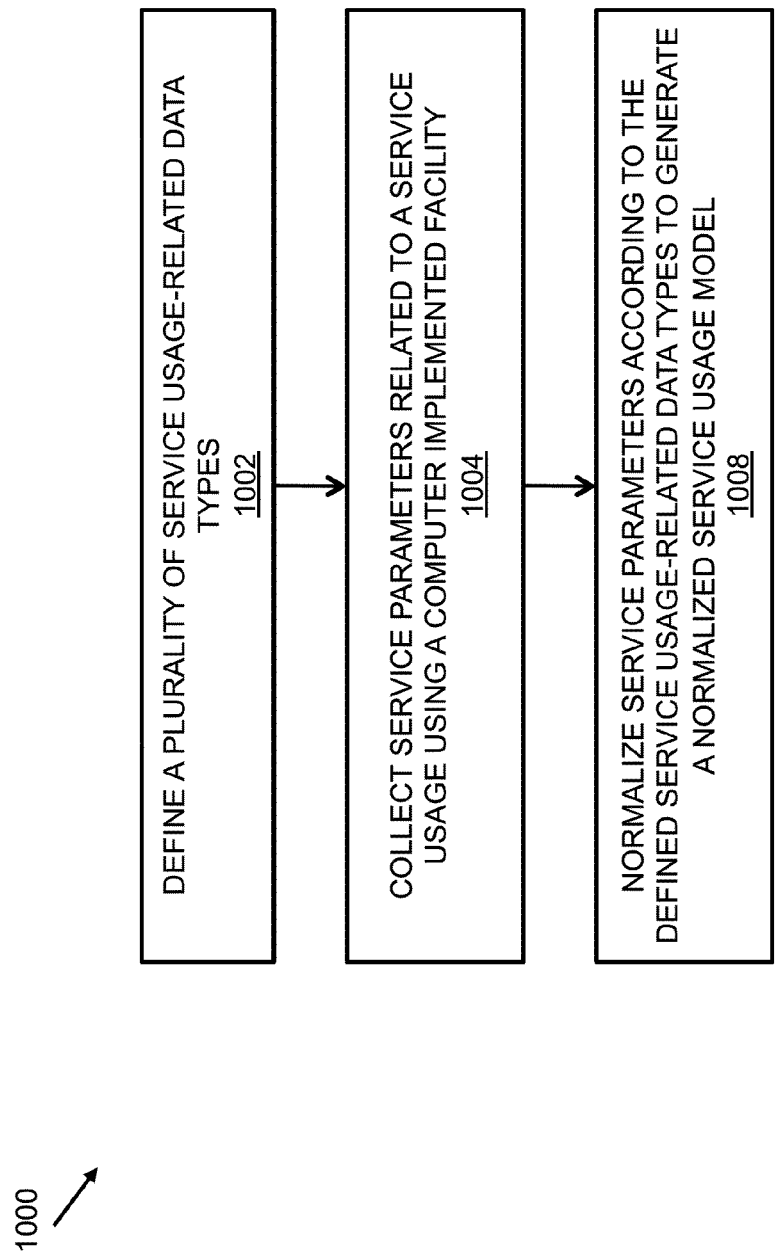
FIG. 10 depicts a flow diagram of a process for generating a normalized service usage model.

In an embodiment, a data normalization platform 118 for generating a normalized service usage model may include a business rules server 122 for storing the definitions of a plurality of service usage-related data types, a data engine 120 for collecting service parameters related to a service usage using a computer implemented facility, and a data normalization engine 124 for normalizing the service parameters according to the defined service usage-related data types to generate a normalized service usage model. In FIG. 10, a flow diagram of a process for generating the normalized service usage model is shown. In the process, a plurality of service usage-related data types are defined 1002. Then, service parameters related to a service usage are collected using a computer implemented facility 1004. The service parameters are then normalized according to the defined service usage-related data types to generate a normalized service usage model 1008. The entire process may be repeated periodically to update the normalized service usage model. The data engine 120 and the data normalization engine 124 may repeat said collecting and normalizing periodically to determine the normalized service usage model on an updated basis. The parameters related to a service usage may be obtained from public information sources. The public information source may be a data feed file. The public information source may be a web crawl. The parameters related to a service usage may be obtained through direct connections to utility service providers, may be supplied, may be extracted, may be input manually by the user to the computer implemented facility, and the like. The business rules server 122 may prioritize the service usage-related data types prior to normalizing. The service parameter may be a user review. The service parameter may be an adoption rate.

In an embodiment, estimating the cost of an alternative service may include a decision engine 108 for applying a normalized alternative service offering model to a normalized service usage dataset to produce a plurality of alternative service offering normalized datasets, and a ranking facility 128 for comparing the alternative service offering normalized datasets to the normalized usage dataset to determine if an alternative service offering is better than the user's current service. In embodiments, the ranking facility 128 may be an integral part of the decision engine 108. The ranking facility 128 may optionally consider weights of certain dataset factors in comparing datasets. The ranking facility 128 may compare datasets based on cost. The cost may be the cost of the service offering. The cost may be a monthly savings over an existing service. The cost may be an annual savings over an existing service. The ranking facility 128 may compare datasets based on cost plus another factor. The factors may be weighted by a user. The factors may be assigned a score. The score may be based on relevance to personal usage. The ranking facility 128 may compare datasets based on a calculated score. The score may be based on relevance to personal usage. The ranking facility 128 may compare datasets based on rewards associated with a credit card offering.

In an embodiment, the system may include a user-interface 102 for performing a comparison of services, receiving input from a user regarding a user's current service usage, wherein the service usage data may be analyzed to obtain a normalized usage dataset, and enabling the user to review a plurality of alternative service offering normalized datasets generated by application of a normalized alternative service offering model to a normalized service usage dataset. The input may be a usage history provided by a user manually. The input may be login information required to automatically acquire a billing record from a service provider or third-party billing agent.

In an embodiment, comparing service offerings may include a business rules server 122 for storing the definitions of a plurality of service usage-related data types, a data engine 120 for collecting service parameters related to a service usage using a computer implemented facility, a data normalization engine 124 for normalizing the service parameters according to the defined service usage-related data types to generate a normalized service usage model for alternative service offerings and a normalized service usage dataset for a user's current service, a decision engine 108 for applying a normalized service usage model to the normalized service usage dataset to produce a plurality of alternative service offering normalized datasets, and a ranking facility 128 for comparing the alternative service offering normalized datasets to the normalized usage dataset to determine if an alternative service offering is better than the user's current service. A monitoring engine 104 may cause the system 100 to periodically compare service offerings to determine on an updated basis which alternative service offering is better than the user's current service. The normalized service usage model may be stored in a product database 110. The normalized service usage dataset may be stored in a user profile database 112. The results from comparing may be stored in a tracking database 114.

Figure 7:
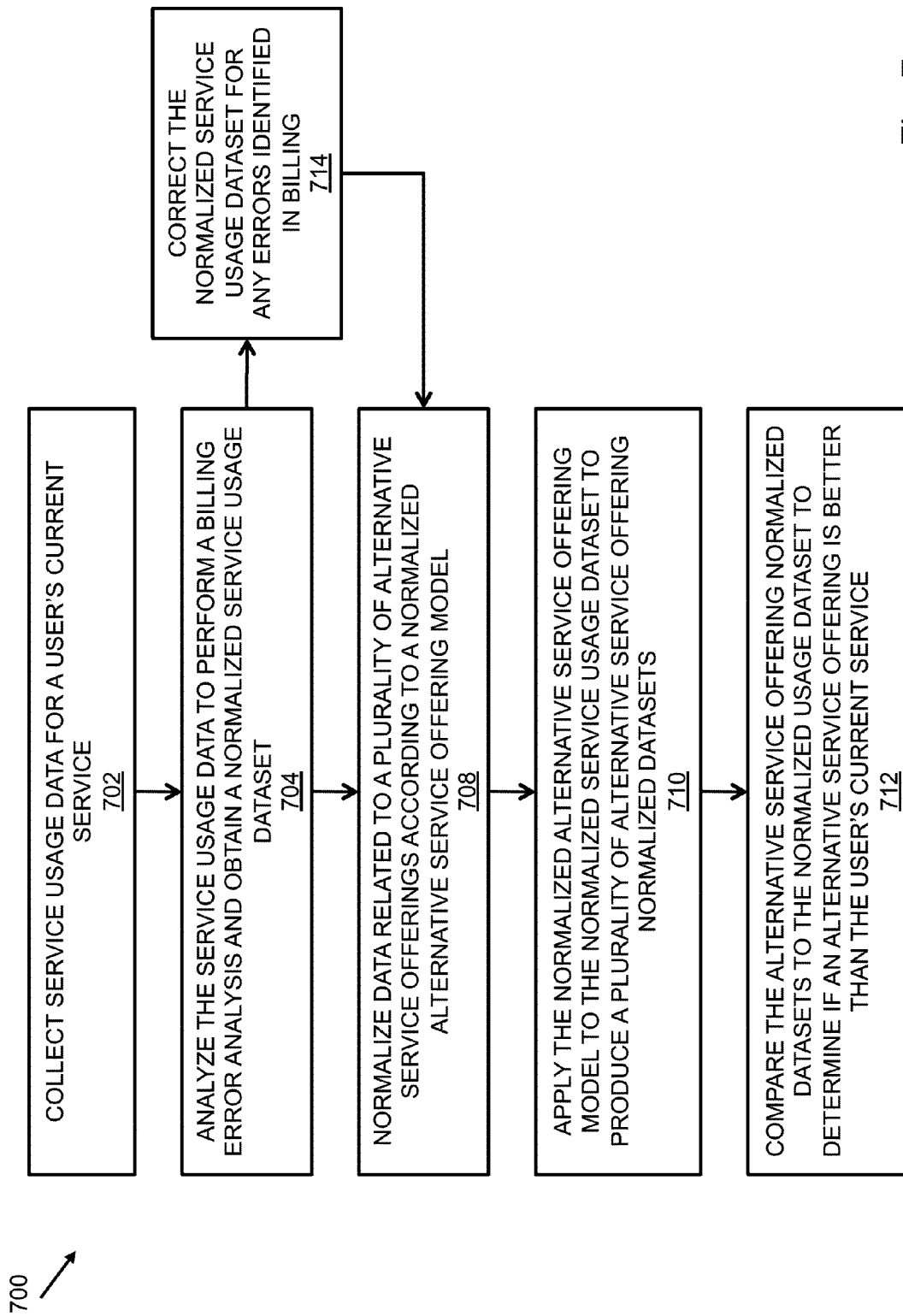
FIG. 7 depicts a flow diagram for comparing alternative service offerings and performing a billing error analysis.

In an embodiment, referring to FIG. 7, the system 100 may collect service usage data for a user's current service using a computer implemented facility 702, analyze the service usage data to perform a billing error analysis and obtain a normalized service usage dataset 704, wherein the normalized service usage dataset may be optionally corrected for any errors identified in billing 714, normalize data related to a plurality of alternative service offerings according to a normalized alternative service offering model 708, apply the normalized alternative service offering model to the normalized service usage dataset to produce a plurality of alternative service offering normalized datasets 710, and compare the alternative service offering normalized datasets to the normalized usage dataset to determine if an alternative service offering is better than the user's current service 712. A service provider may be notified of an error in billing if an error is identified in analyzing the service usage data.

Figure 8:
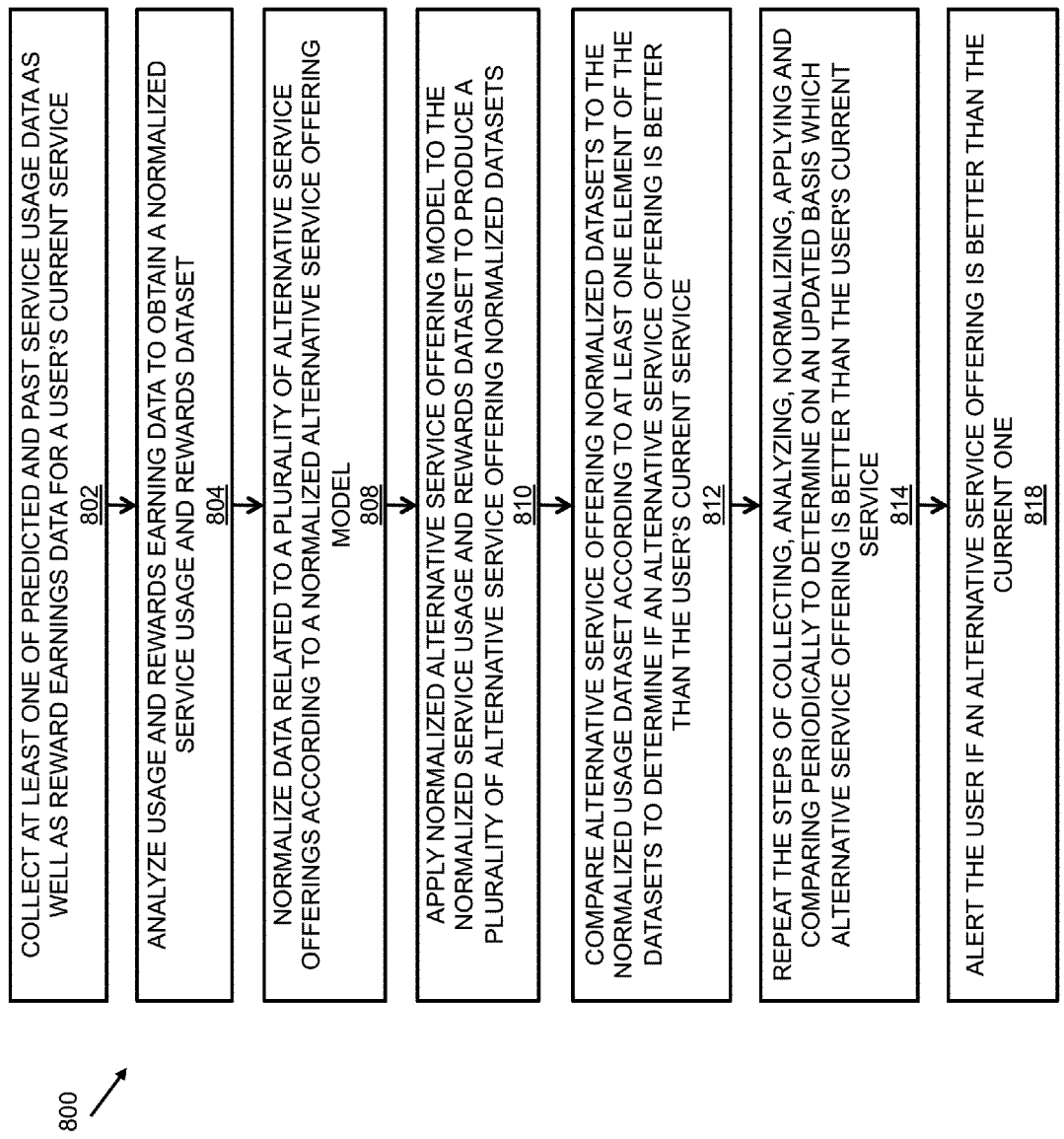
FIG. 8 depicts a flow diagram for determining a personalized true cost of service offerings.

Referring to FIG. 8, the system 100 may provide a system, method, and medium of determining a personalized true cost of service offerings. A personalized cost of a service offering may be calculated for an individual based on your past and/or predicted usage data. The true cost, or impact, of ownership, such as the net cost including rewards and the like, may be quantifiable and unique to each offering. The system 100 may repeat the quantification periodically to alert users of a changed cost/impact when a new offer becomes available or when usage data changes. The system 100 may collect at least one of predicted and past service usage data as well as reward earnings data for a user's current service 802. The usage and rewards earning data may be analyzed to obtain a normalized service usage and rewards dataset 804. Optionally, data related to a plurality of alternative service offerings may be normalized according to a normalized alternative service offering model 808. Alternatively, the data normalized according to a normalized alternative service offering model may be purchased from a third party data provider. The normalized alternative service offering model may be applied to the normalized service usage and rewards dataset to produce a plurality of alternative service offering normalized datasets 810. Finally, the alternative service offering normalized datasets may be compared to the normalized usage dataset according to at least one element of the datasets to determine if an alternative service offering is better than the user's current service 812. The system 100 may repeat the steps of collecting, analyzing, normalizing, applying and comparing periodically to determine on an updated basis which alternative service offering is better than the user's current service 814. Additionally, if the system 100 determines that an alternative service offering is better than the current one, the user may be alerted 818.

Figure 11:
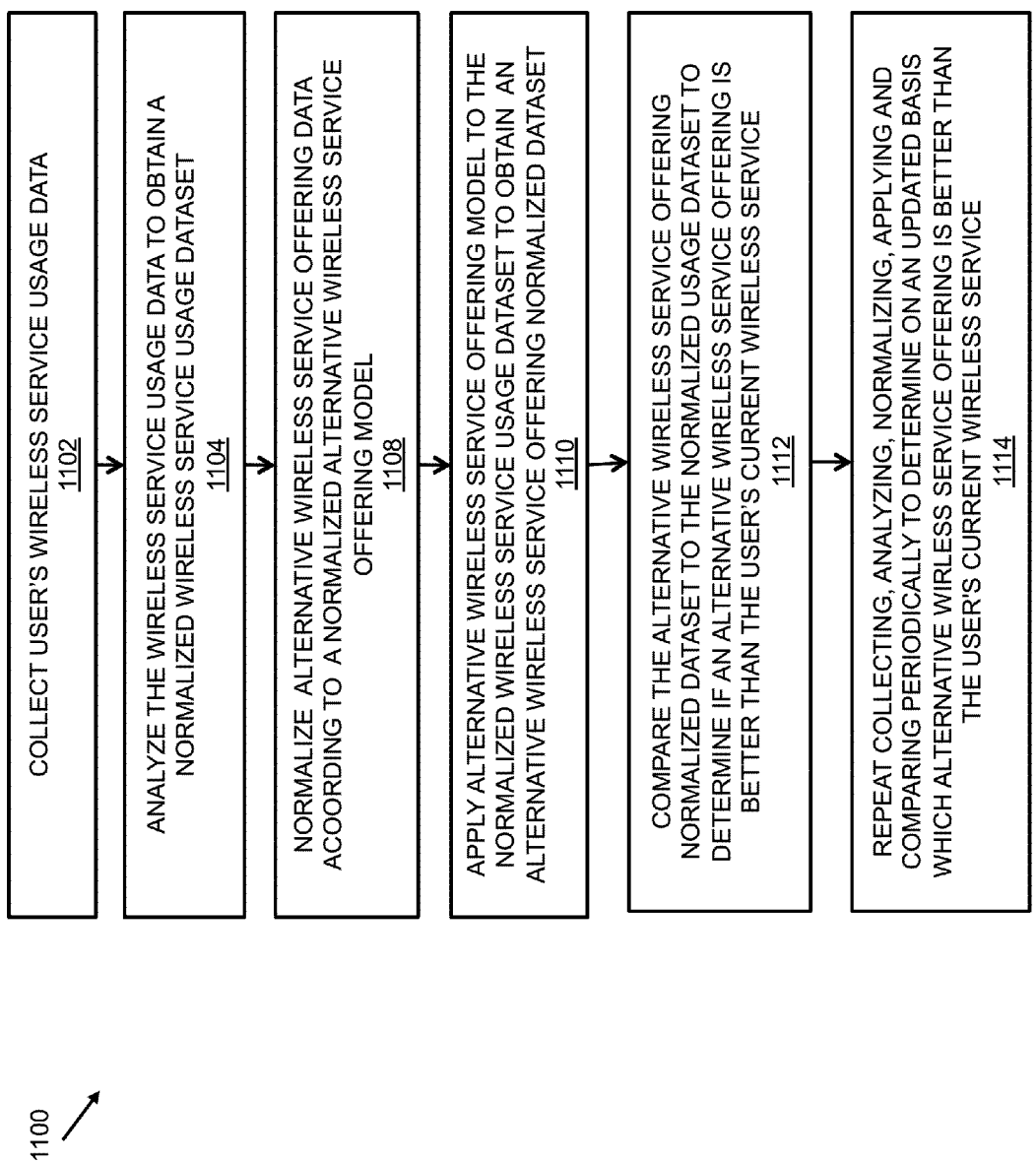
FIG. 11 depicts a flow diagram of a method for comparing alternative wireless service offerings.

Referring now to FIG. 11, a method of comparing wireless service plans based on a user's wireless service usage data may include the steps of collecting wireless service usage data for a user's current wireless service using a computer implemented facility 1102, analyzing the wireless service usage data to obtain a normalized wireless service usage dataset 1104, optionally, normalizing data related to a plurality of alternative wireless service offerings according to a normalized alternative wireless service offering model 1108, applying the normalized alternative wireless service offering model to the normalized wireless service usage dataset to produce a plurality of alternative wireless service offering normalized datasets, wherein the dataset comprises at least the cost for the alternative service offering 1110, comparing the alternative wireless service offering normalized datasets to the normalized usage dataset to determine if an alternative wireless service offering is better than the user's current wireless service 1112, and optionally, repeating said collecting, analyzing, normalizing, applying and comparing periodically to determine on an updated basis which alternative wireless service offering is better than the user's current wireless service 1114.

Figure 12:
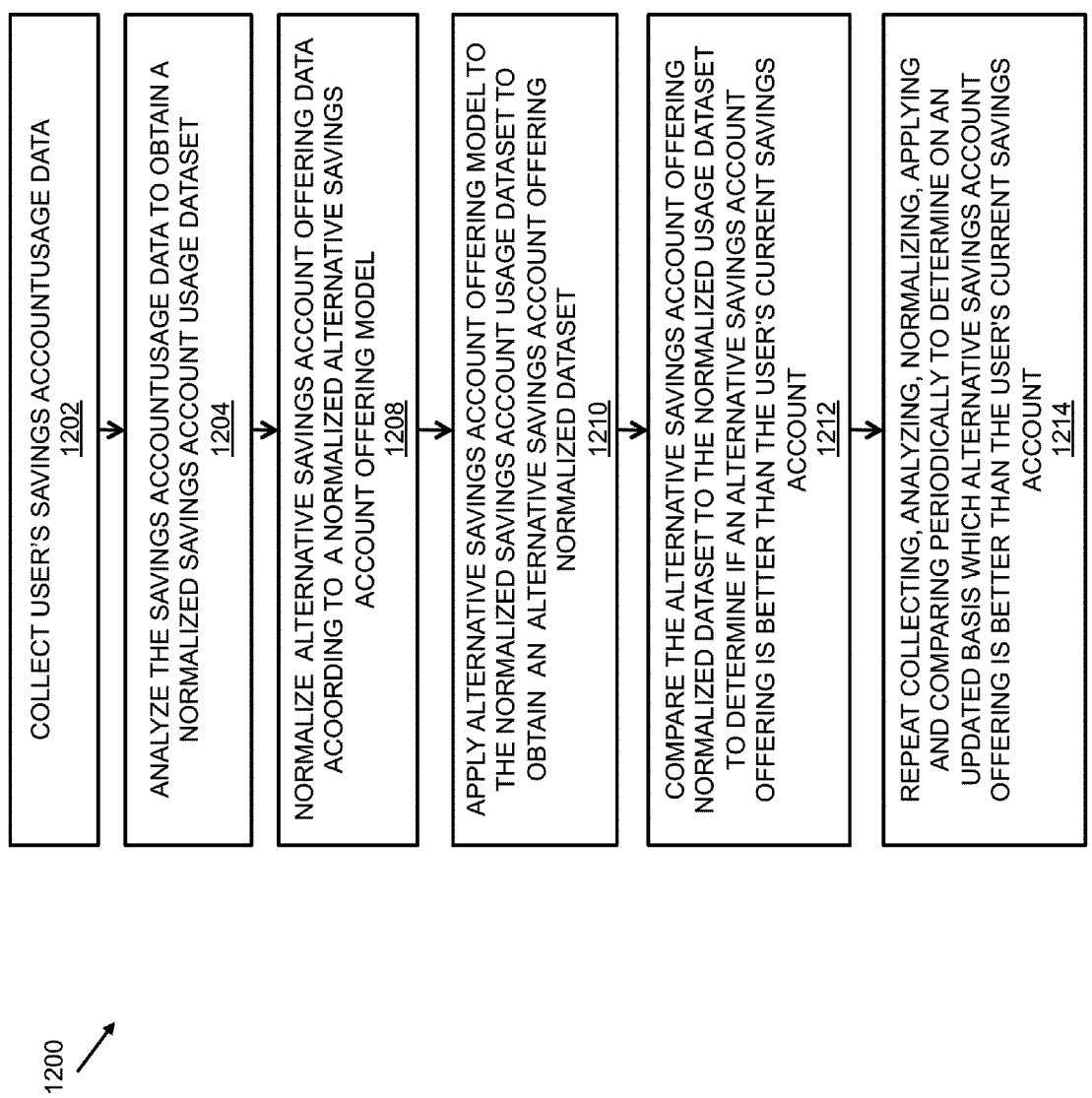
FIG. 12 depicts a flow diagram of a method for comparing savings account offerings.

Referring now to FIG. 12, a method of comparing savings account offerings based on a user's savings account usage data may include the steps of collecting savings account usage data for a user's current savings account using a computer implemented facility 1202, analyzing the savings account usage data to obtain a normalized savings account usage dataset 1204, optionally, normalizing data related to a plurality of alternative savings account offerings according to a normalized alternative savings account offering model

1208, applying the normalized alternative savings account offering model to the normalized savings account usage dataset to produce a plurality of alternative savings account offering normalized datasets, wherein the dataset comprises at least the cost for the alternative savings account offering 1210, comparing the alternative savings account offering normalized datasets to the normalized usage dataset to determine if an alternative savings account offering is better than the user's current savings account 1212, and optionally, repeating said collecting, analyzing, normalizing, applying and comparing periodically to determine on an updated basis which alternative savings account offering is better than the user's current savings account 1214.

Referring now to FIG. 13, a method of comparing internet, television, and telephone ("triple play") service plans based on a user's triple play service usage data may include the steps of collecting service usage data for a user's current triple play service using a computer implemented facility 1302, analyzing the triple play service usage data to obtain a normalized triple play service usage dataset 1304, optionally, normalizing data related to a plurality of alternative triple play service offerings according to a normalized alternative triple play service offering model 1308, applying the normalized alternative triple play service offering model to the normalized triple play service usage dataset to produce a plurality of alternative triple play service offering normalized datasets, wherein the dataset comprises at least the cost for the alternative triple play service offering 1310, comparing the alternative triple play service offering normalized datasets to the normalized usage dataset to determine if an alternative triple play service offering is better than the user's current triple play service 1312, and optionally, repeating said collecting, analyzing, normalizing, applying and comparing periodically to determine on an updated basis which alternative triple play service offering is better than the user's current triple play service 1314.

In an embodiment, the system may be a search engine that may compare a plurality of product and service options according to the needs of the users. On the basis of past and predicted service usage of the user, the system may suggest a service plan to the user that may be appropriate for the user's requirements. In an example, the system may suggest a service plan by comparing the costs of the service plans. The costs may be the cost of the service offering. The costs may be a monthly savings over an existing service. The costs may be an annual savings over an existing service. Also, the system may periodically compare service offerings to determine on an updated basis which alternative service offering is better than the user's current service.

A user reviewing their online financial account presents an opportunity for delivery of offers, sales opportunities, and various other opportunities based on the platform 100 of this disclosure or third party applications. An executable script running on a client used to view a user financial account may enable analysis of transaction data, including bill pay entries, from the user financial account in order to provide offers or sales opportunities based on the transaction data. The executable program may be called via a single line of JavaScript embedded in the user financial account webpage. The single line of JavaScript may also be used to call, or integrate, $3^{rd}$ party or other related applications. For example, a mapping interface may leverage the capability of the executable program to analyze transaction data, match offers from an offer database, and present the locations of the offers on a map. Analyzing the transaction data may include automatically extracting merchant data, such as merchant name, merchant category, transaction category, store name, zip code, spending amounts, purchase frequency, product category, or the like. Transaction entries may be analyzed and matched against a database of offers and sales opportunities to interweave a related offer or sales opportunity. For example, in the case of a transaction description, matching to an offer may be done using natural language processing (NLP). If the transaction entry relates to a service, the analysis may indicate that an alternative offering may be available upon a more detailed analysis. A link to an alternative offering assessment interface may be provided. Alternatively, the executable program may integrate the functionality of the alternative offering assessment interface and provide an indication of an improved offering interweaved with the transaction. Analysis of the transaction data may be limited to individual transactions or may encompass all transactions on a statement, transactions from a particular period of time, transactions from a particular merchant or merchant(s), transactions of a particular nature, and the like. By analyzing transactions from a particular merchant, for example, that merchant may be able to provide offers to the user during a subsequent transaction based on past transactions. In effect, merchants can provide a merchant loyalty program implemented through the use of a transaction card associated with the financial account. Merchants may be able to track various indicia associated with this new kind of loyalty program, as well as make, update track or fulfill offers and sales opportunities through use of a merchant dashboard.

In embodiments, the platform 100 may be enabled to specifically target current customers or competitor customers as they review their recent transactions via an online or paper account statement. The account statement may be a bank statement, a credit card statement, a debit card statement, a stored value card statement, a bill payment system, and any other system for managing transactions on an account like a personal financial management system. Referring to FIG. 14, an account statement of the user is illustrated in accordance with an embodiment. The account statement may include details and information about various transactions done by the user. In examples, the transactions may be provided for a specific period such as one month, three months, and the like. The transactions may relate to purchases done by a user at different locations such as at a departmental store, electronic store, gas station, and the like. The system of the present invention may assign and categorize transactions done by the users. For example, the system may categorize the stores which the user visits frequently, the minimum amount spent by the user, and the like. Further, the system may analyze the transactions done by the user.

In an embodiment, the account statements may facilitate the system to identify various merchants listed in the account statements. Thereafter, the identified merchants may be matched with their appropriate business type or category. For example, the merchant may be automatically categorized as a telephone service provider, gas station owner, a coffeehouse owner, and the like. In an embodiment, the system may notify the user of a potential savings with an alternative service plan or item. For example, the system may recommend alternative services such as wireless plans, oil and gas services, and the like to the users as per their past and predicted usage. In the statement, the user may be invited to interact with the consumer service comparison shopping system 100 to investigate whether there are indeed savings to be had with an alternative service plan or item.

Figure 16:
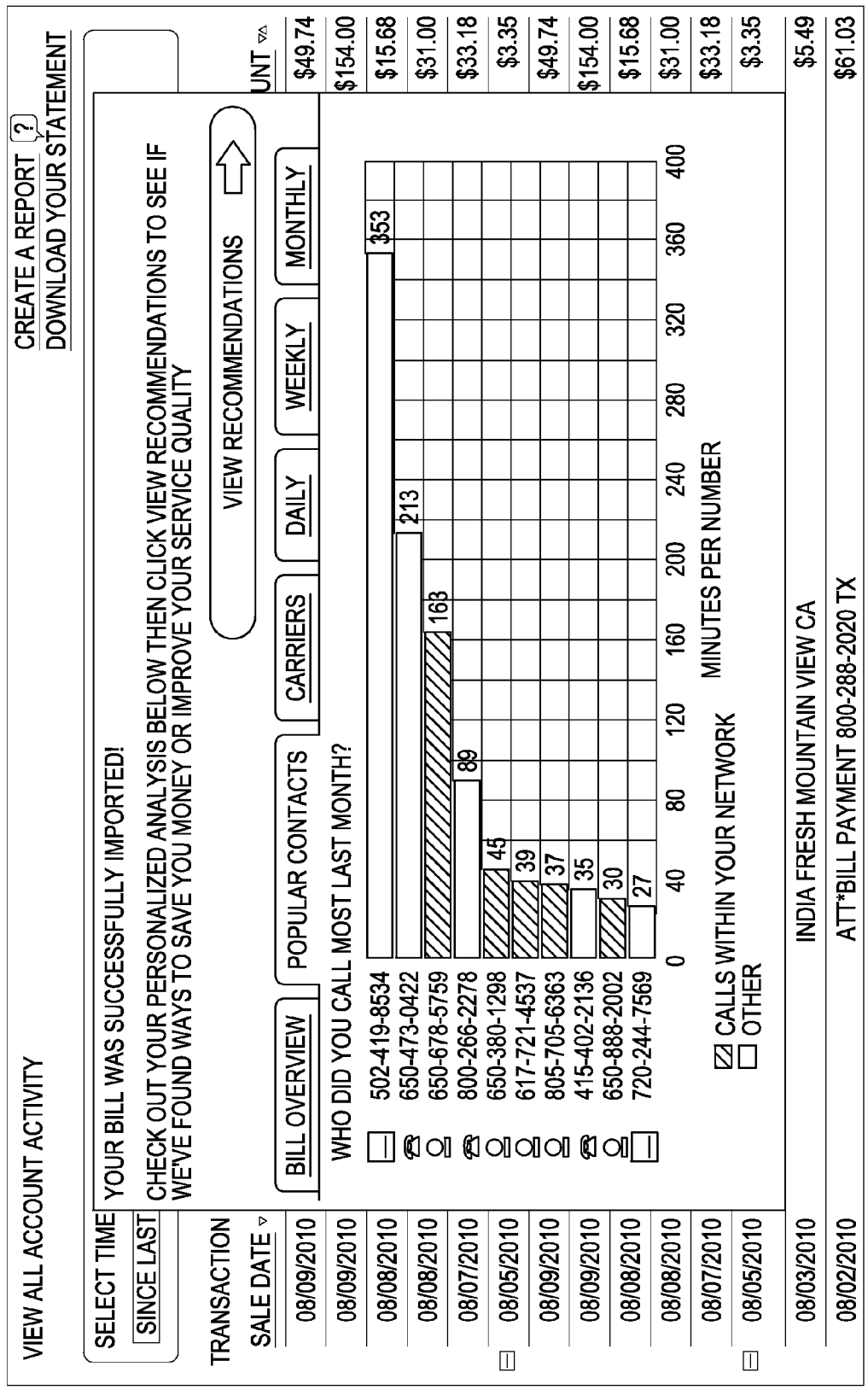
FIG. 16 depicts a data import report window.
Figure 17:
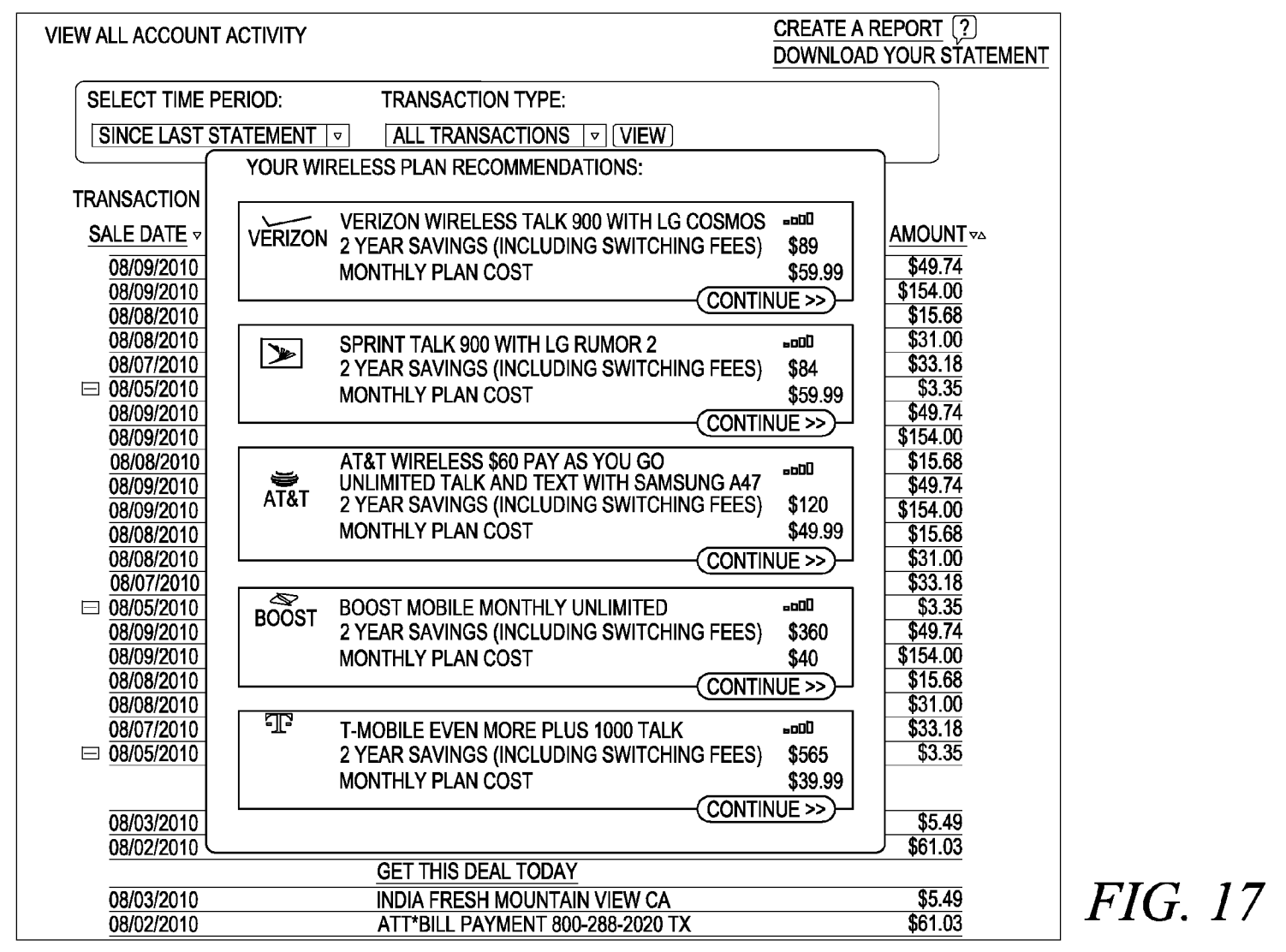

FIGS. 15-17 provide an overview of the recommendations provided by the system, in accordance with an embodiment of the present invention. In the example shown here, the user is attempting to determine if there are better cell phone plans available in terms of coverage, cost, quality, and any other desired factors. It should be understood that the system may be enable the user to log into any number of service plans to determine if there are better service plans available. Continuing with this example, the system may request some information such as a mobile phone number, password of the cell phone account of the user, and the like, from the user. This information may be used for analyzing the account summary of the user. In an example, the user may provide the required information after logging into the system. Thereafter, the system may import the account summary of the user. Further, the system may analyze the cell phone bill of the user based on various aspects such as service plan currently in use by the user, calls made by the user, roaming charges paid, text messages charges, MMS charges, and the like. The system may also generate reports based on the analysis. Accordingly, in other examples, the system may collect internet, television, and telephone service usage data from the user for suggesting alternative service plans for optimizing usage by the user.

In an embodiment, the system may provide offers/recommendations based on analysis and identification of transactions made in a single account. Again referring to FIG. 16, the system may analyze a telephone bill of a user. The analysis may include a list of contacts that may be frequently contacted by the user, number of calls made, number of international calls made, number of text messages sent, and the like. In an embodiment, the system may provide recommendations to the user after analyzing the transaction details of the user. The recommendations may include different ways that may be suggested to the users for saving money. Further, FIG. 17 illustrates various recommendations suggested by the system, in accordance with an embodiment of the present invention. The recommendations may include the various monthly costs of the service plans suggested by the system along with the annual savings that the user may receive. In an embodiment, the recommendations may be directed to reduce the expenses incurred by the user, improve the coverage, improve the signal strength, and the like. The account statement may include an entry for a cell phone bill. The system may recommend a cheaper cell phone plan that may be provided by another service provider. The offers may include discounts that may be offered by the service providers. The discount may include unlimited talk time, some minutes of free talk time, and the like. The system may also provide an estimate of average wireless savings that may be done by the user over a period of time.

FIG. 18 illustrates an account statement of a user, in accordance with an embodiment of the present invention. The account statement of the user may include an entry for a gasoline refill. The system may analyze the costs incurred by the user for gasoline refilling and may provide an offer for recommending a cheaper gasoline refilling station to the user along with the total savings that may done by the user. The offer may be integrated in the account statement of the user.

Figure 20:
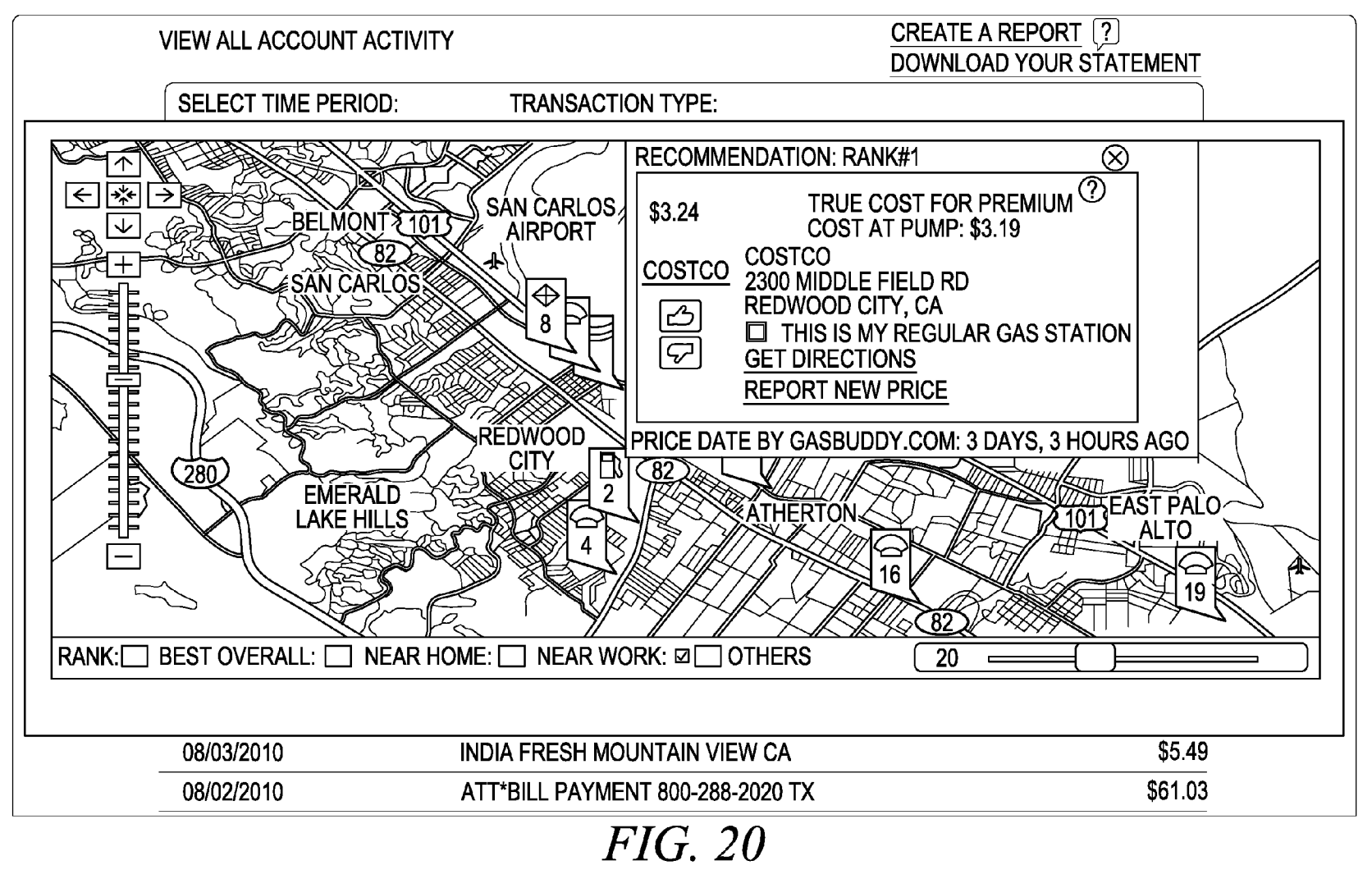

FIGS. 19 and 20 illustrate a recommendation option that may be selected by the user, in accordance with an embodiment of the present invention. The user may click on the suggested recommendation to activate them. The system may require some information such as home address, frequent destinations, and the like, from the user. When the user enters the required information, a list of recommendations may be provided to the user. Further, the recommendations may include various gas stations that come on the way to the frequent destinations of the users. The user may also view details of the recommendations by clicking on them. The details may include the address of the gas station, cost of gasoline per gallon, directions to the gas station, and the like.

Figure 21:
FIG. 21 depicts a screenshot of a user BillPay window.
Figure 22:
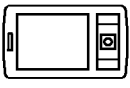
FIG. 22 depicts a wireless plan log in window.
Figure 23:
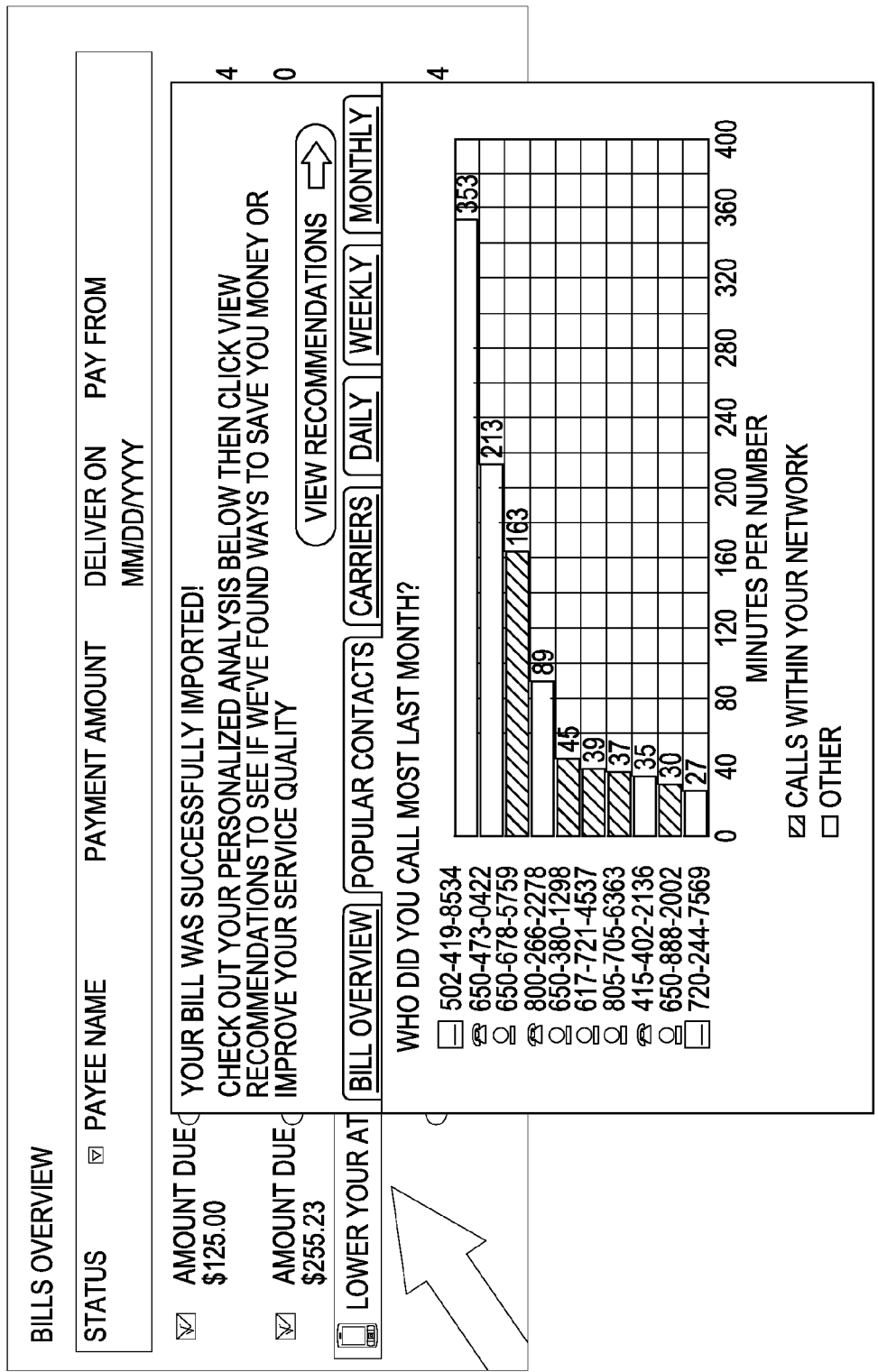
FIG. 23 depicts a data import report window.

Further, FIGS. 21-23 illustrate saving recommendations provided by the system, in accordance with an embodiment of the present invention. In this example, the system is integrated with a Bill Pay screen, such as in FIG. 21. The system may provide saving options to the users such as how much the user may save, which bank may offer reward points to the users, and the like along side the Bill Pay options. In FIG. 22, the user has activated the option to 'Shrink this bill'. This may launch a dialog box for logging into their wireless account to obtain the usage data needed for analysis by the platform 100. FIG. 23 depicts a screen indicating successful import of the usage data to the platform 100 and a graph showing analysis of the bill for most popular contacts.

FIG. 24 illustrates a reward being offered to the user, in accordance with an embodiment of the present invention. The system may offer rewards to the users based on the loyalty of the users. As shown in FIG. 24, an account statement of the user may reveal that the user have done multiple purchases from a particular store. In such cases, the store may make a loyalty-based offer to the user. For example, if a user shops frequently from a store such as Starbucks, the system may automatically enroll the user in a loyalty program. Thus, every time the users use their regular transaction card such as a credit card, a debit card, and the like, at Starbucks, the user may automatically earn loyalty points. The user may redeem the loyalty points for free products or services from that store. For example, the store may offer some discount to the user on a next purchase of the user. The system may not require loyalty cards to redeem the loyalty offers.

Figure 25:
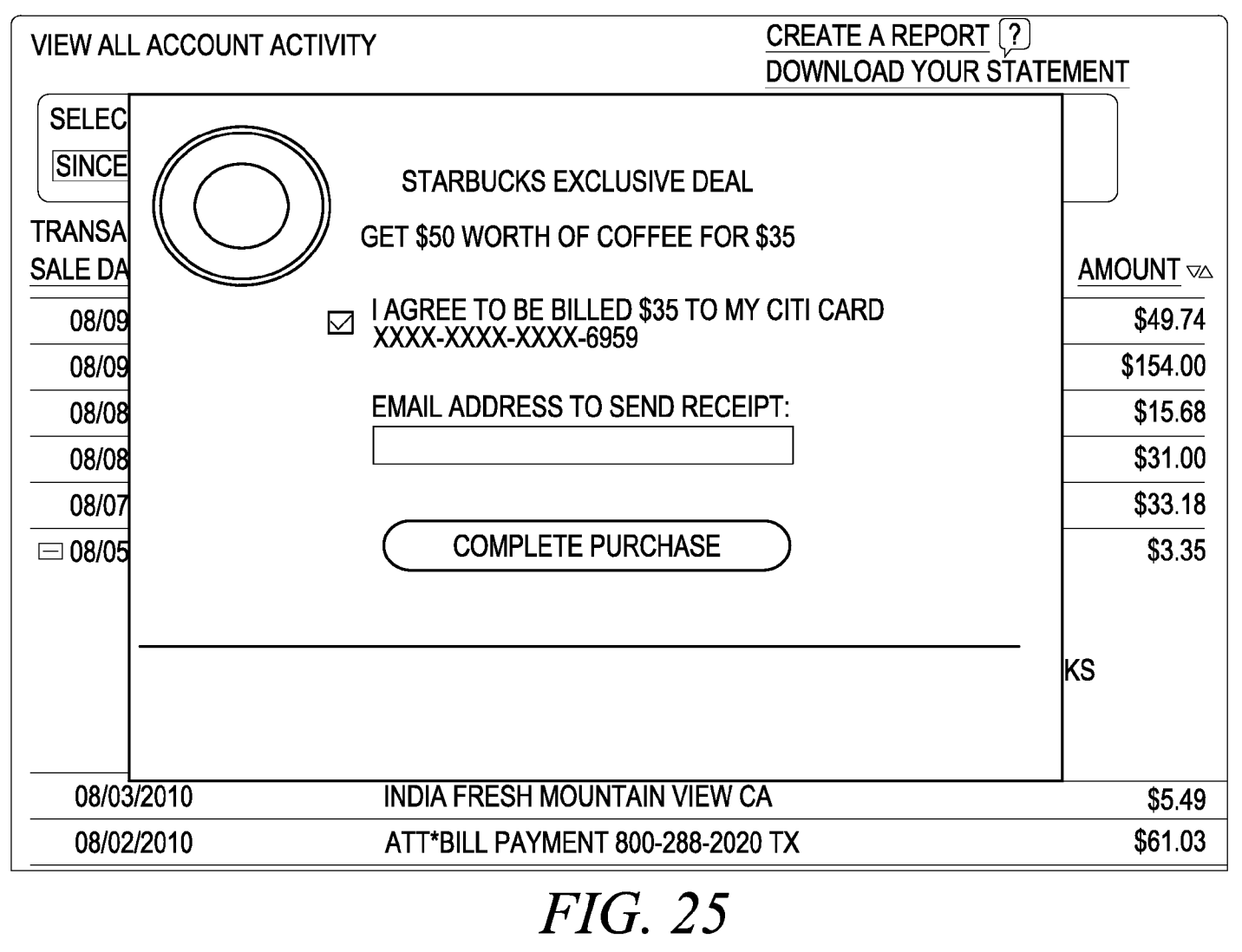
Figure 26:
FIG. 26 depicts a receipt for deal purchase.

FIG. 25 illustrates a loyalty based offer made to the user, in accordance with an embodiment of the present invention. The loyalty based offer may include a coupon with validity for a limited time period such as one month, three months, six months and the like. The user may receive a confirmation receipt on accepting the offer. The offer may be available on a stored value or loyalty card, the items of the offer may be delivered or may be available for pickup at a location, such as upon presenting a receipt, and the like. FIG. 26 illustrates a confirmation receipt that may be provided to the user, in accordance with an embodiment of the present invention. The user may receive the coupon through mail and a corresponding receipt may be sent to the e-mail address of the user.

The system may match an offer based on identification and analysis of the transactions made across multiple accounts. The offer shown to the customer may be driven by a combination of three different rules: what the merchant wants to show the customer, what the financial institutions want to show the customer, and what the customer chooses to see. These rules may be stored in a rules database of the system.

Further, the system may provide an account aggregation and other online financial services. Account aggregation may include compilation of information from different accounts, which may include bank accounts, credit card accounts, investment accounts, and other user or business accounts, into a single place. The account aggregation may be provided by online banking solution providers. The account aggregators may analyze the transaction summary of a user and may categorize merchants from it. The merchants may be categorized such as Oil & Gas, Grocery, Retail, and the like. In few cases, the merchants may not fall under any of the pre-defined categories. In such cases, the account aggregators may assign codes to such merchants.

Further, the account statements of the different accounts may be analyzed by the system. The account aggregators may analyze the transactions across all the accounts. For example, a user may charge their Starbucks purchases to a plurality of banks such as Citibank, Bank of America, and the like. The activity at Starbucks across all accounts held by the user may be identified by the account aggregator. Therefore, if a user makes a payment through any of the banks associated with the account aggregator, the user may get loyalty-based offers from Starbucks through the system. In an embodiment, the system may include a natural language processing (NLP) technology. The NLP technology is a form of human-to-computer interaction where the elements of human language, spoken or written, may be formalized so that a computer may perform value-adding tasks based on that interaction. The NLP technology may match offers with relevant and targeted transactions. For example, if a transaction statement is not clear, the system may get details about the purchases using the NLP technology. The details may include, but are not limited to, merchant, location of the store, and amount spent.

In an embodiment, the system may provide anonymity of the users. The identity of the user may not be provided to the system and the merchant. The bank may be the only one that may know the identity, however, the bank may not be provided with the information of the various offers that may be provided/redeemed to the users.

Figure 27:
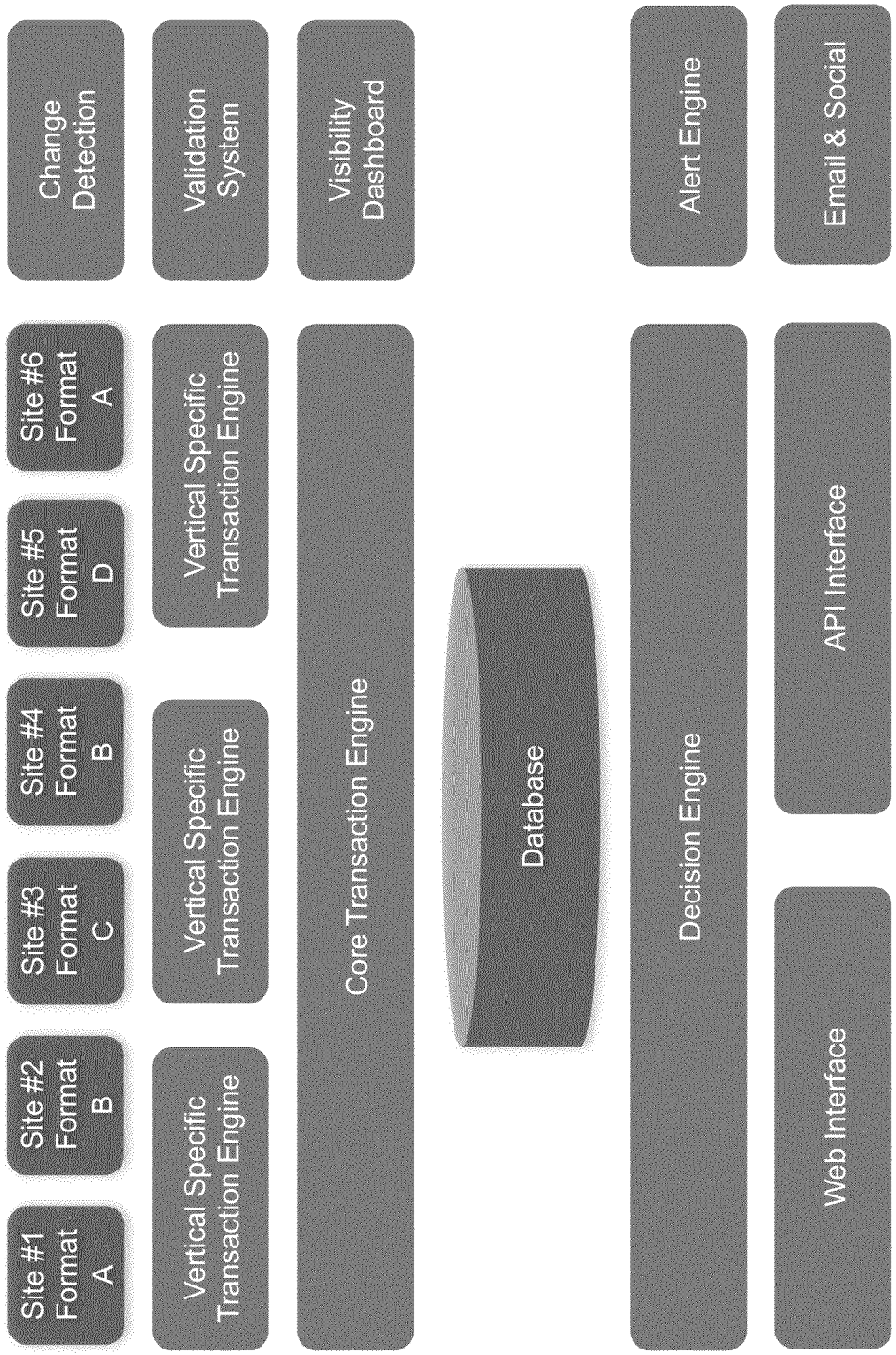
FIG. 27 depicts a block diagram of the system.

FIG. 27 illustrates a block diagram of the system, in accordance with an embodiment of the present invention. The system may include a user interface that may enable the users to access the system. The user interface may be embodied in a website. For example, the system may be associated with a bank having a user account. The bank may provide transaction cards such as a debit card, a credit card, a pre-paid card, and the like. In such a scenario, the user interface may be a web interface that may enable the users to access the system through the bank's website. In another scenario, the system may be a standalone program that may be used for enhancing an existing rewards system. In this scenario, the users may access the system through the user interface.

Once the users access the system, the users may enter their service usage data and preference data through the user interface. The data may include a current service provider, a current service cost, a current service usage, and the like. In an alternative embodiment, the data may be gathered automatically from the user's service provider by a transaction engine when the user logs into the user's service account. Either a core transaction engine or one of a plurality of transaction engines, such as one per merchant, may be used to gather a user's data. The service usage data provided by the user may be compared with other service usage plans that may be stored in a database of the system. Thereafter, a decision engine may suggest the service usage plan to the user that may fit as per the preferences of the user.

The service usage plan may be suggested to the user by an alert engine by sending an e-mail, a text message, an alert, and the like. Further, a dashboard of the system may also include information about the present and suggested service plans of the user. In an embodiment, if the user changes his/her preferences about the service usage plan, the system may reflect those changes and may suggest other plans as per the new preferences of the user. The system may analyze the transactions carried out by a user and may verify the details of the transactions.

The system may include an API interface. This API interface may enable users to interact with the raw and analyzed data stored in the system through any number of applications.

Figure 28:
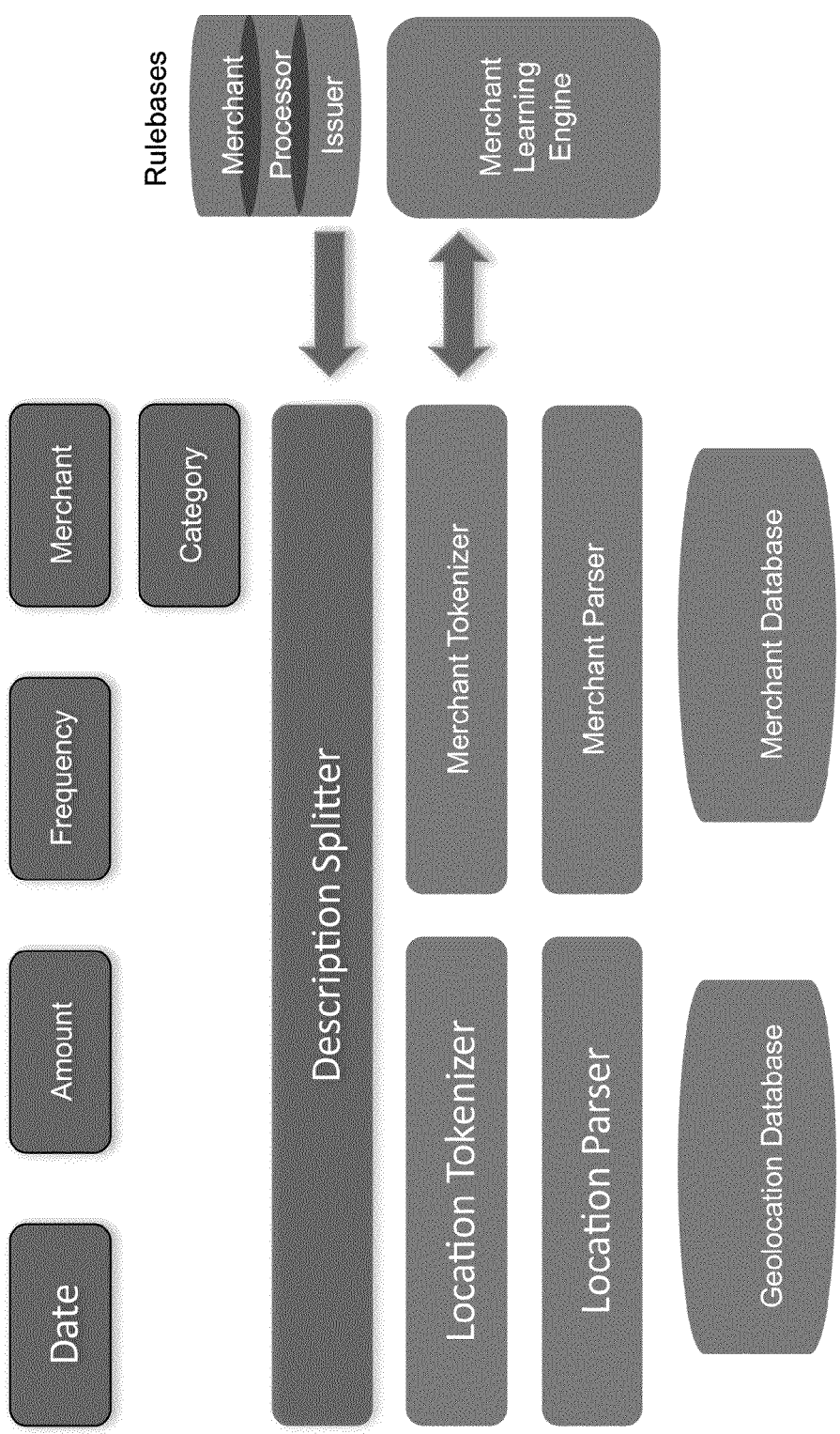
FIG. 28 depicts a block diagram of a merchant categorization system.

FIG. 28 illustrates a block diagram for matching the transactions carried out by a user, in accordance with an embodiment of the present invention. The system may match the transactions that may be carried out by the users. The system may include a description splitter that may segregate the information about the transactions carried out. The information may include the date of purchase, amount spent, merchant from which a product has been bought, and the like. The description splitter may include a location tokenizer that may generate a sequence of tokens that may relate to a location of the merchant. The sequence of tokens may be generated by a merchant learning engine that may suggest similar locations. The location of the merchant may be searched in a geolocation database of the system. Thereafter, a location parser of the system may parse through the geolocation database. If the location of the merchant is stored in the geolocation database, the system may match the location in the transaction. However, if the location of the merchant is new, the geolocation database may store that location for future reference.

Further, the description splitter may include a merchant tokenizer that may generate a sequence of tokens that may relate to a merchant. The sequence of tokens may be generated by a merchant learning engine that may suggest similar merchant names. The merchant may be searched in a merchant database of the system. Thereafter, a merchant parser of the system may parse through the merchant database. If the merchant is already stored in the merchant database, the system may match the merchant in the transaction. However, if the merchant is new, the merchant database may store that merchant for future reference. Further, the system may include architecture for offering rewards to the users.

Figure 29:
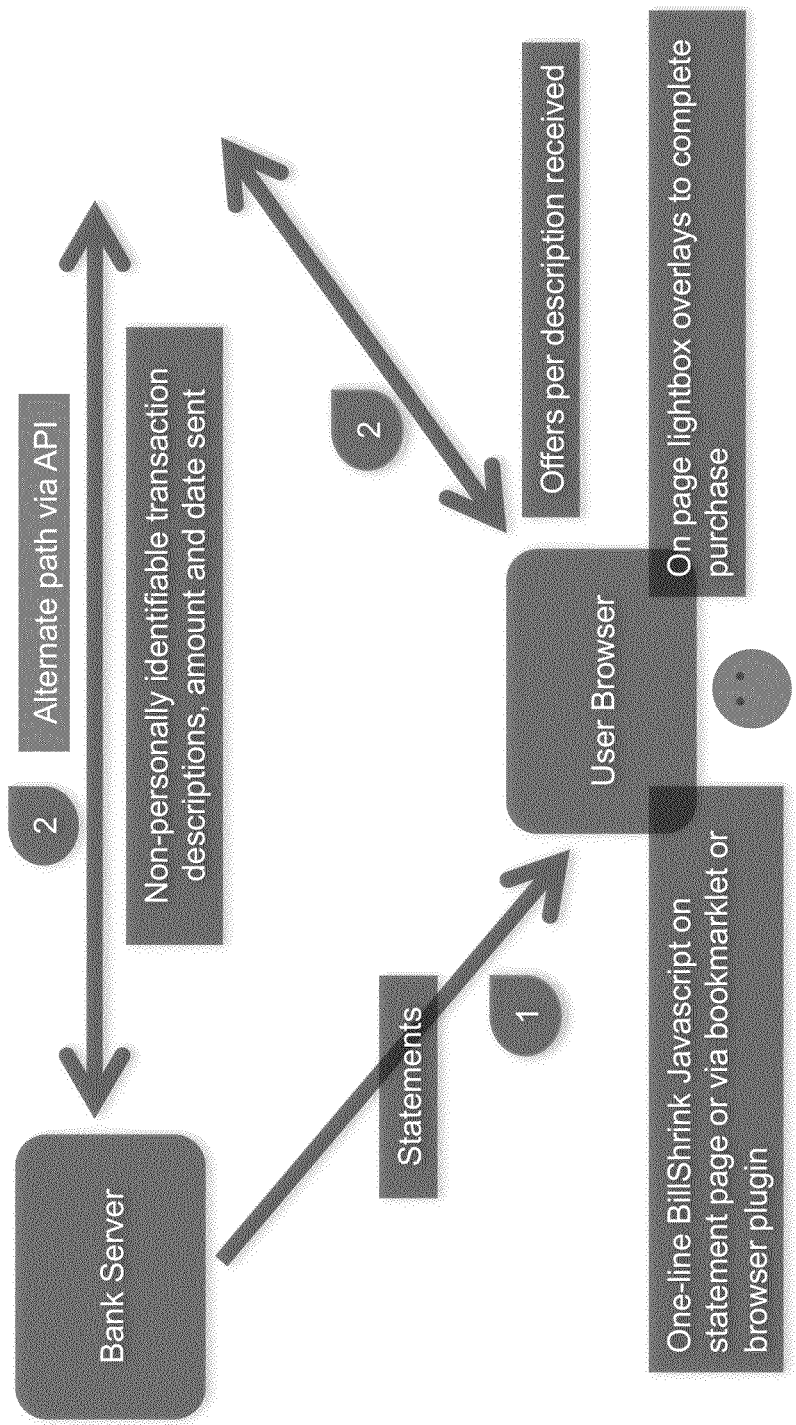
FIG. 29 depicts a method of the system.

FIG. 29 illustrates a block diagram for delivering rewards to users, in accordance with an embodiment of the present invention. As mentioned herein, the system may be accessed directly through an Application Programming Interface (API) or may be accessed through a financial institution's website. For example, a consumer may receive online account statement that may include some offers suggested to the user. These offers may be integrated in the account statement, such as through a JavaScript™ code. Alternatively, the offers may be linked to the account statement of the user by using a bookmarklet, a browser plug-in, and the like. The user may click on the offers to activate them. In another embodiment, the user may access the system through a user interface. The user may enter information about service plans being used by the user. The system may, in turn, provide offers based on the information entered by the user.

Further, an account server of the financial institution where the user may have an account may be unable to determine some transaction details. The account server may send such information to the system such as the amount spent during that transaction, date on which the transaction was done, and the like. The NLP technology of the system may enable the system to get details of the transaction carried out by the user and may be sent back to the account server.

The system of the present invention may provide automatic offer redemption to the users. The users may be informed about the various offers that may be applicable as per their account statements. Once the users have subscribed to the services offered by the system, the system may automatically provide various saving offers to the users. Further, the system may provide various offers to the users through multiple channels such as through short message service (SMS), e-mails, and the like. The banks may offer some rewards for the users for using their transaction cards while shopping. Therefore, when a user purchases some items using a transaction card, rewards may be automatically applied to the account associated with the transaction card.

In an embodiment, an offer may be redeemed by clicking on a link that takes the user to a special page that includes a discount for an online purchase. In another embodiment of redemption, a user may use a coupon code, either one-time or multiple use, at an online or offline location to gain discount.

In another embodiment of redemption, a user may receive a prepaid instrument of some kind, such as a prepaid debit card, prepaid credit card, gift card, and the like, that can be used to redeem the discount. In another embodiment of redemption, the user may receive a credit on the statement automatically post purchase. In this embodiment, the user may receive an automated discount when a purchase is made or a discount that is applied off of a prior pre-purchased amount.

In an exemplary embodiment, the offers may be included in the account statements of the users. For example, if a user receives the account summary of a bank as a paper statement, the paper statement may include offers that may be printed below the expenses mentioned in the bank statement. In this example, if a user has spent some amount for paying internet bills, the system may provide information about other internet plans as per the requirement of the user.

Further, the system may provide offers/suggestions integrated in an electronic account statement of the user. The system may include a bookmarklet that enables displaying offers/rewards in-line with the transaction history of the user. The bookmarklet may be an applet that may be integrated with the browser to show in-line offers when a bank website, that may have the user's account, may be accessed. The applet may be a uniform resource locator (URL) of a bookmark in a web browser or the applet may be a hyperlink on a web page. The bookmarklet may enable the system to provide real-time analysis of the expenses incurred by the user. In an example, a user may wish to compare other product and service options against the analysis of the user's expenses. The real-time analysis may enable the user to find whether the user is over spending on various expenses or not.

In an embodiment, the services offered by the system of the present invention may be accessed through a JavaScript code. The financial institutions that may be associated with the system may include a single line of the JavaScript that may be added as per their requirement into the account statement page of the user's account. For example, the system may allow advertiser's to create targeted offers that may be delivered through the user's online account statements. The advertiser's may target the users based on many criteria such as zip code, store name, store category, transaction description, purchase frequency, spending amount, and the like.

In embodiments, there may be categories based on which the advertisers target the users, in accordance with an embodiment of the present invention. In an example, the advertiser's may send selected offers that may target users who may spend around $500 on internet and cell phone bills. The advertiser's may send offers that may provide more features within the limited budget. In another example, the system may enable the advertiser's to track the users based on the category of stores frequently visited by the users. The stores may be categorized as grocery, retail, oil & gas, and the like. The advertiser's may give offers to existing users of a store to increase loyalty and spending of the user. The users may click on the offers made by the advertisers to activate the offers. In an embodiment, the system may enable the advertiser's to track both online and in-store purchases for measuring the results and optimizing the offers. The system tracks online and offline redemptions and may report them to advertisers. In an embodiment, in addition to the online account statement, the system may include mobile abilities and may facilitate SMS notifications to the users. The system may also send offers through e-mails to various users.

Further, the system may offer a "deal-of-the-day", such as a discount on a single type of product for 24 hours, wherein the product is chosen based on a user's past transactions. In an embodiment, the various offers/suggestions provided by the system may be available in the form of printed coupons that may be used at a retail point of sale (POS) terminal. The offers may be delivered to the users through mails, e-mails, gift vouchers, and the like. The users may take a print of the offers sent through e-mails and may show at the POS terminal for redeeming the offer.

The system of the present invention may include dashboards, such as a merchant dashboard, financial institution dashboard, user dashboard, and the like. Each dashboard may show the appropriate audience how users are doing with all the offers being shown to them, such as opens, clicks, and purchases, as well as enable them to edit and manage the rules governing offer presentation by interfacing to the rules database.

In an embodiment, a user dashboard that may be used for hosting various mini-applications. Users may click on a dashboard icon to activate the dashboard. The dashboard may enable the users to edit the various mini-applications of the dashboard. For example, the users may move the mini-application icons, rearrange the icons on the dashboard, delete some of the mini-applications, recreate the mini-applications so that more than one of the same mini-application is open at the same time, and the like.

In an embodiment, the system may include a merchant dashboard, a financial institution dashboard, and a user dashboard. The merchant dashboard may be used by the various merchants and advertisers for displaying various offers that are being made by them. The various offers may be listed under a tab on the dashboard. The users may click on the tab to view all the offers provided to them. Further, the merchant dashboard may enable a merchant to display the offers in different categories. For example, few offers may be in the form of discount coupons that may be redeemed if a user spends a pre-defined amount. The system may track the activities of the users and may inform the merchants about the user activities. For example, the dashboard may provide information about the number of users who have viewed the offers listed by the merchants. The merchants may also get information about the offers that may be redeemed by the users, and the like. Further, the merchant dashboard may include a merchant re-categorization tool that may facilitate the merchants to categorize themselves as per their business. For example, some merchants may categorize themselves as a retail merchant, oil and gas merchants, and the like.

In an embodiment, the financial institution dashboard may allow the financial institution to connect with the system for providing various offers to the users. The financial institution dashboard may facilitate the financial institutions that may be associated with the system to track the users. The financial institution dashboard may allow the financial institutions to track the opted-in accounts by the users. The opted-in accounts may be the accounts that may be majorly used by a user and the account on which the user may wish to receive offers. Further, the financial institution dashboard may accumulate preferences of the user for receiving the offers. For example, the financial institutions may get information about the offers which the user may wish to receive as a part of their account statement, and the like. Further, the financial institution dashboard may enable the associated financial institutions to re-categorize the merchants as per their convenience. The financial institutions may change the categories in which the merchants may have classified themselves; the financial institution dashboard may enable the financial institutions in doing so.

In an embodiment, the user dashboard may include information about all the offers that were redeemed by the users. The user dashboard may also enable the users to view various transactions done by the users over a specific period such as over a week, over a month, and the like. Further, the user dashboard may include information about the various rewards that may be received by the user. For example, the information may include the minimum amount that the user may need to spend in a day for being eligible for a reward, the number of the times the user may need to shop in a specific category of stores for being eligible for the reward, and the like. Further the user dashboard may also include a merchant re-categorization tool that may enable the users to categorize the merchants as per their convenience.

As mentioned earlier, the users may be provided offers through their account statements and may also get rewarded on using the transaction cards such as a credit card, a debit card, and a pre-paid card. In an embodiment of the present invention, the financial institutions associated with the system may get paid when a user redeems an offer provided by the financial institution. For example, if the account statement of the user suggests a cheaper cell phone plan, the user may compare his/her present plan and the suggested plan. If the user activates the suggested plan, the financial institution may get revenues from the redemption. However, if the user decides to continue with the earlier plan, the financial institution may not get any revenue. In a similar scenario, the system may also generate revenues if a user redeems an offer suggested by the system. The offer suggested by the system may be sent to the user in the form of a text message, an e-mail, and the like.

Figure 30:
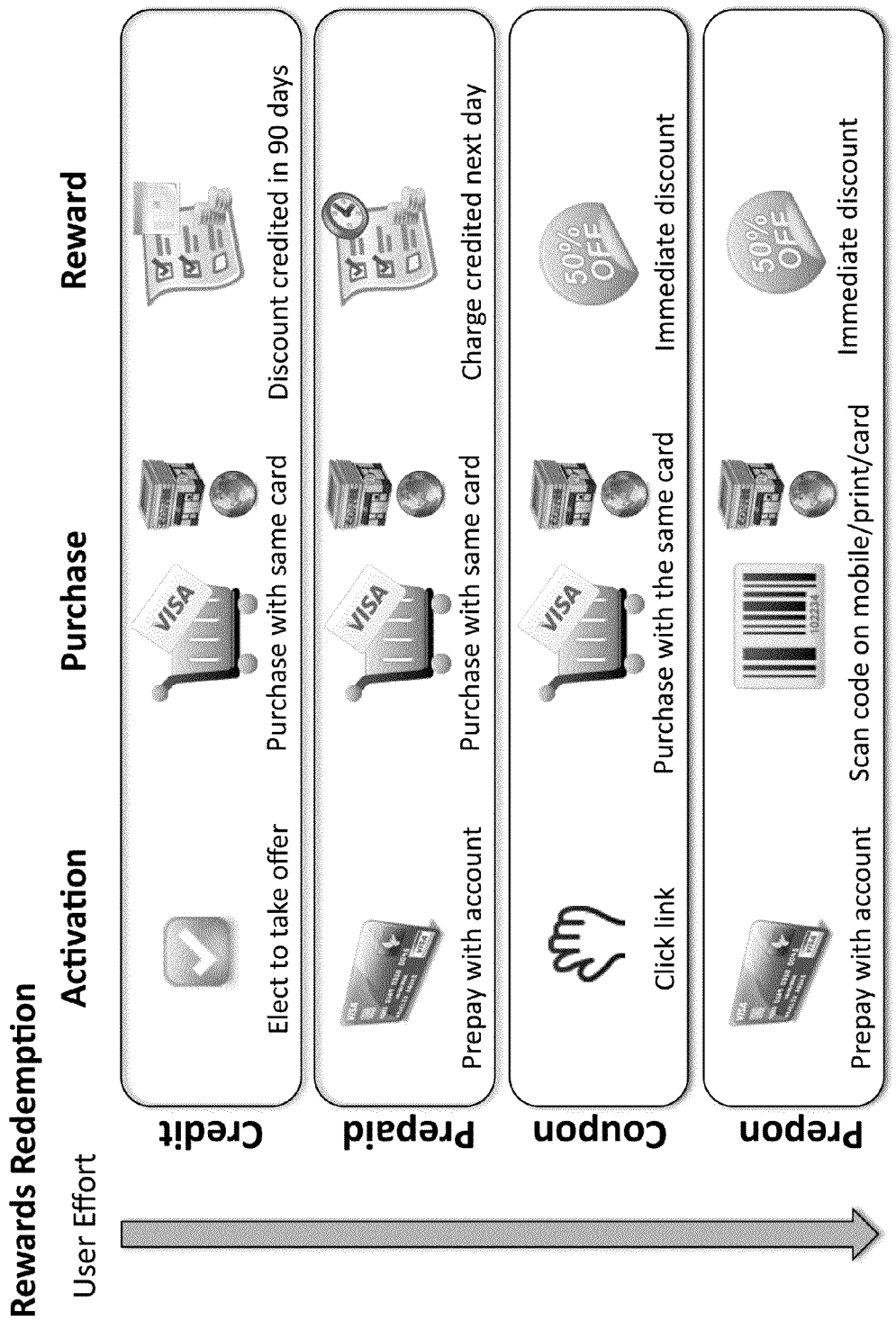
FIG. 30 depicts example rewards redemptions.

FIG. 30 illustrates an example of rewards redemption, including the steps of activation, purchase, reward, and the like. In embodiments, some rewards may be provided to the user after some period of time (e.g. credited in 90 days), the next day, immediately, and the like. For example, a user may elect to take a credit offer, make a purchase with the same card, and have a discount credited in 90 days. In another example, a user may prepay with an account, purchase with the same card, and have the charge credited the next day. In another example, the user may click on coupon, and receive an immediate discount. In another example, the user may prepay with an account for a 'prepon', scan code on a mobile, print, card, and the like, and receive an immediate discount.

FIG. 31 illustrates an example of an integrated bill analysis, such as with a 'like-dislike button' 3202. In embodiments, the like-dislike button may provide the user with the option to select an offer or not, that is, to accept as liking the offer, or to decline as disliking the offer. In embodiments, a selection of dislike may remove the offer, change some physical attribute of the offer (e.g. changing color, hiding, minimizing, deleting). In embodiments, a selection of liking the offer may send the user to a website managed by the present invention, performed automatically, sent to a third-party site, and the like, where automatically performed may be implemented through an embedded block of code (e.g. Java code), and the like. In embodiments, the user may be able to share offers, information about offers, and the like, with other individuals, such as through a social network, and as a result improve the value of their offer. Although the like-dislike button has been depicted in an illustrated bill analysis, the like-dislike button may be applied to any user interface disclosed herein where the user has an option to select a service, product, offer, and the like.

Figure 32:
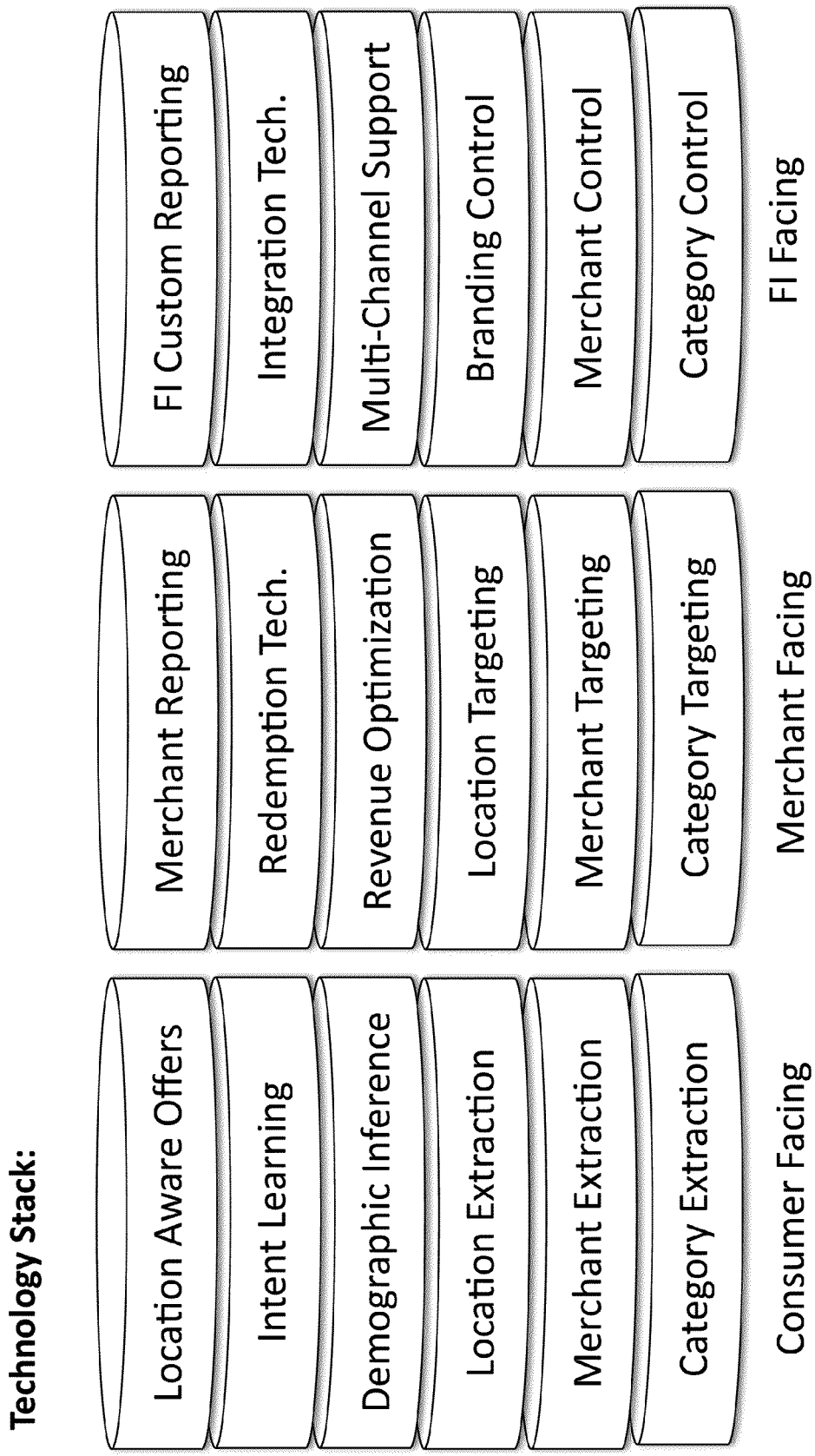
FIG. 32 depicts an embodiment technology stack.
Figure 34:
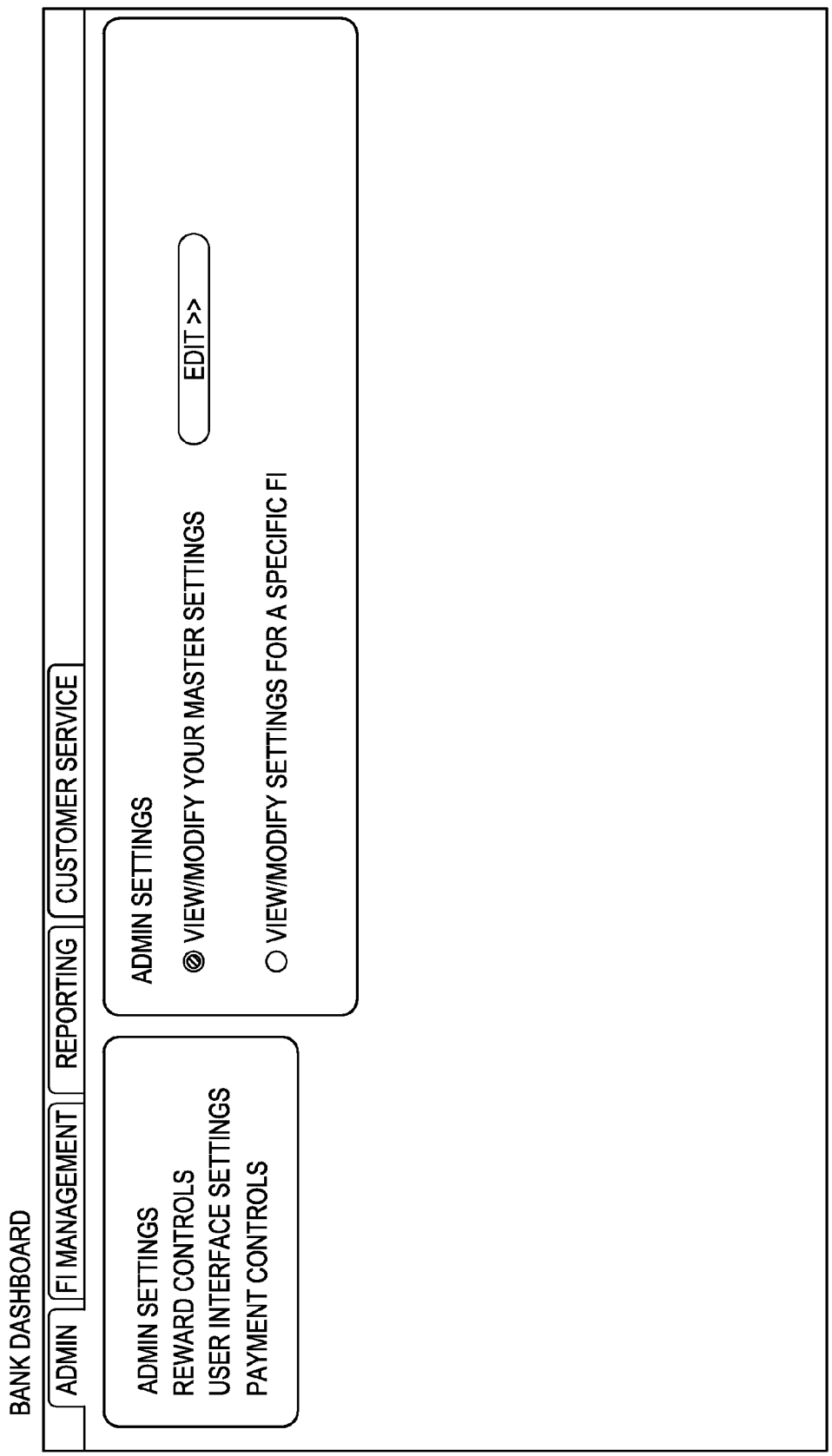
FIG. 34 depicts administration settings for an embodiment bank dashboard.
Figure 36:
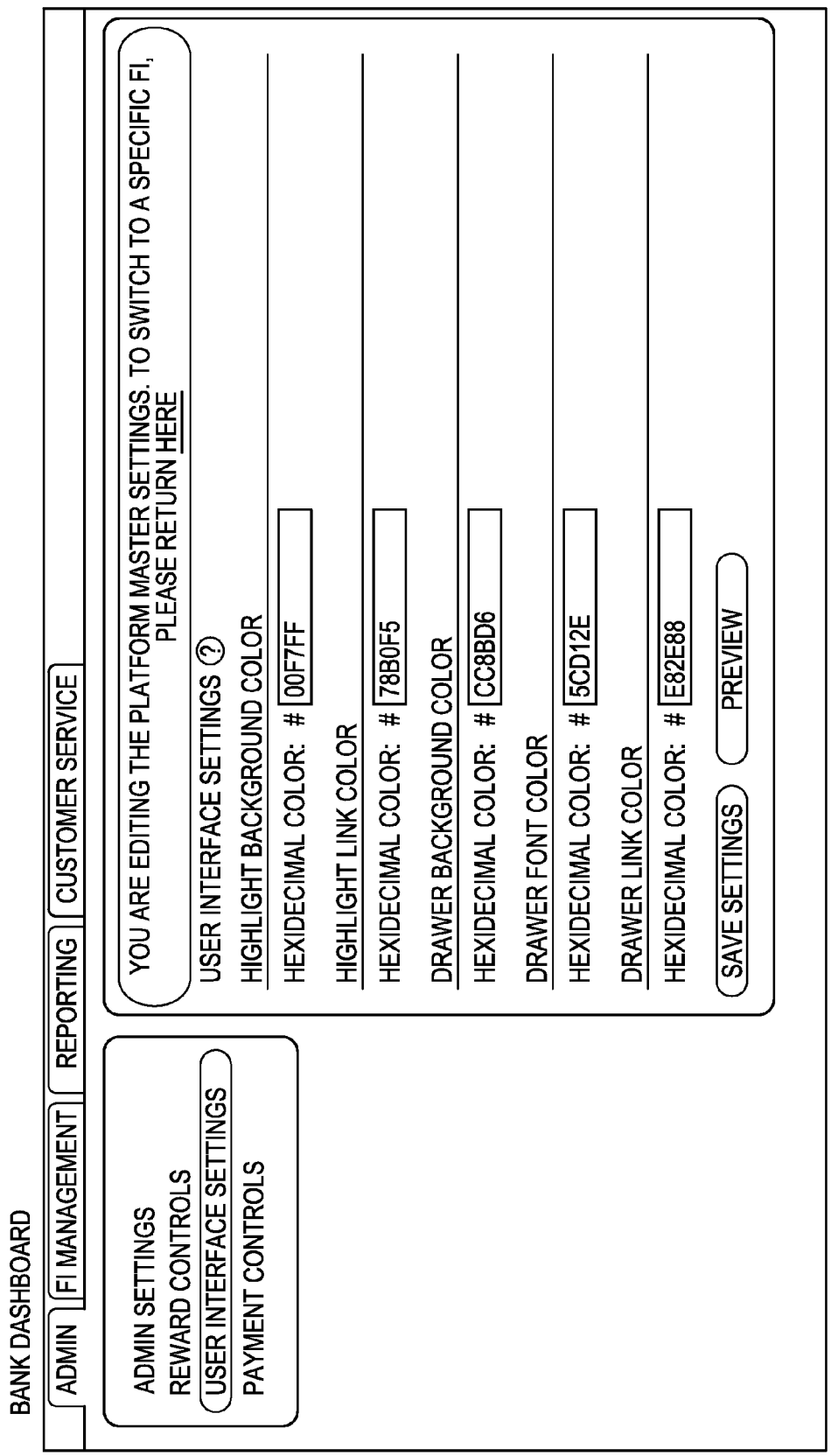
FIG. 36 depicts user interface settings for an embodiment bank dashboard.
Figure 37:
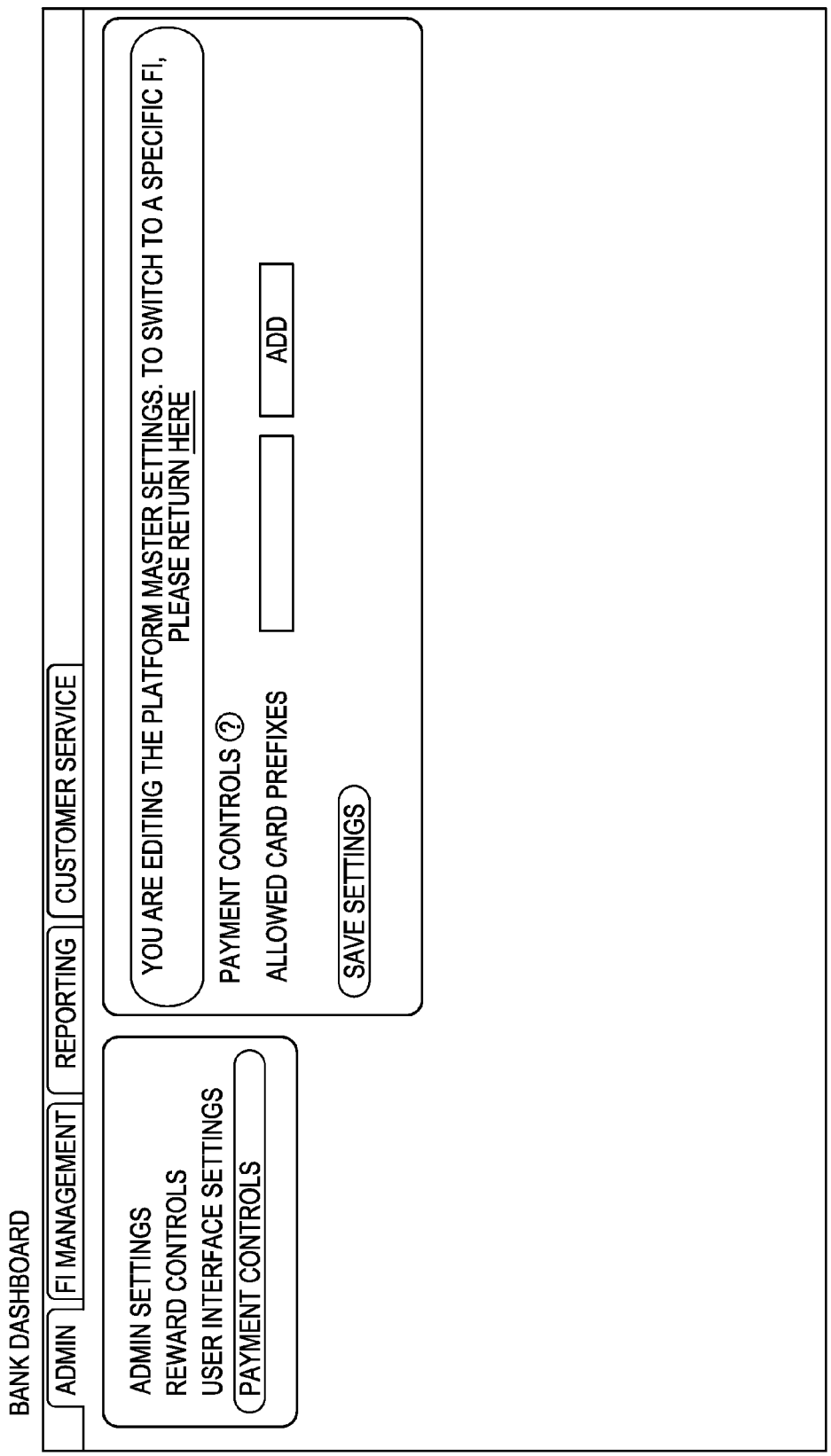
FIG. 37 depicts payment controls for an embodiment bank dashboard.
Figure 40:
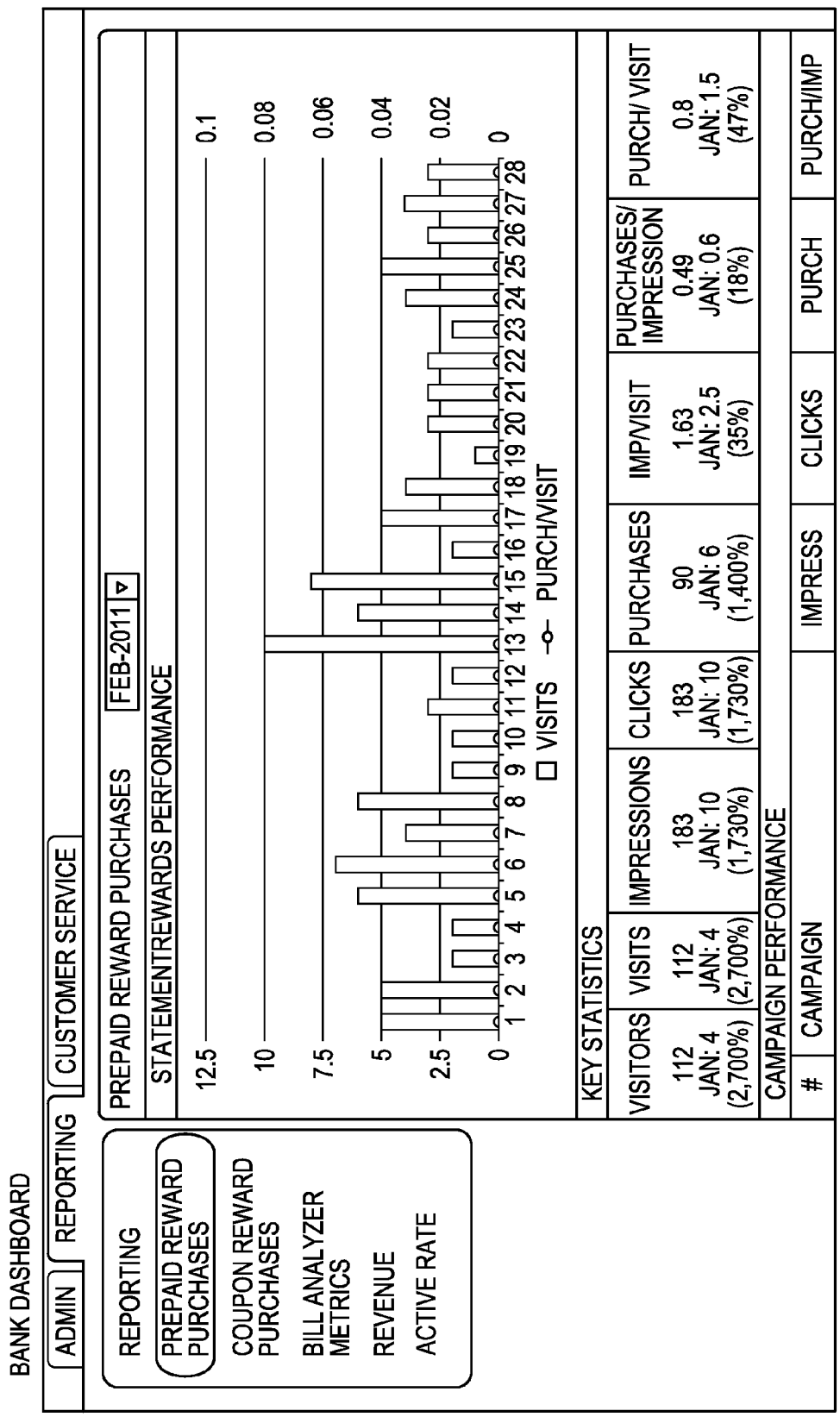
FIG. 40 depicts a reporting window in an embodiment bank dashboard.
Figure 41:
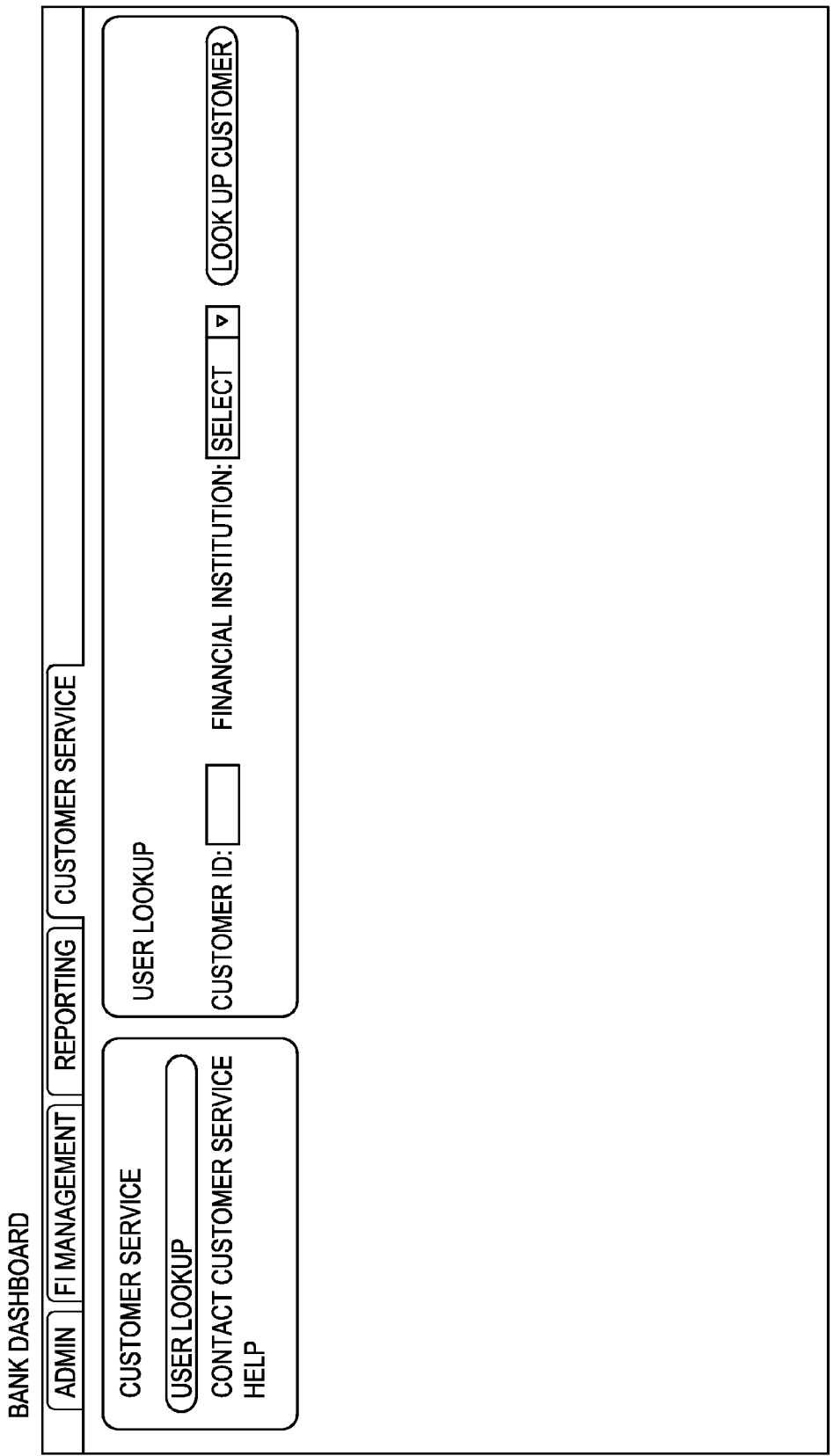
FIG. 41 depicts a customer service user lookup in an embodiment bank dashboard.
Figure 42:
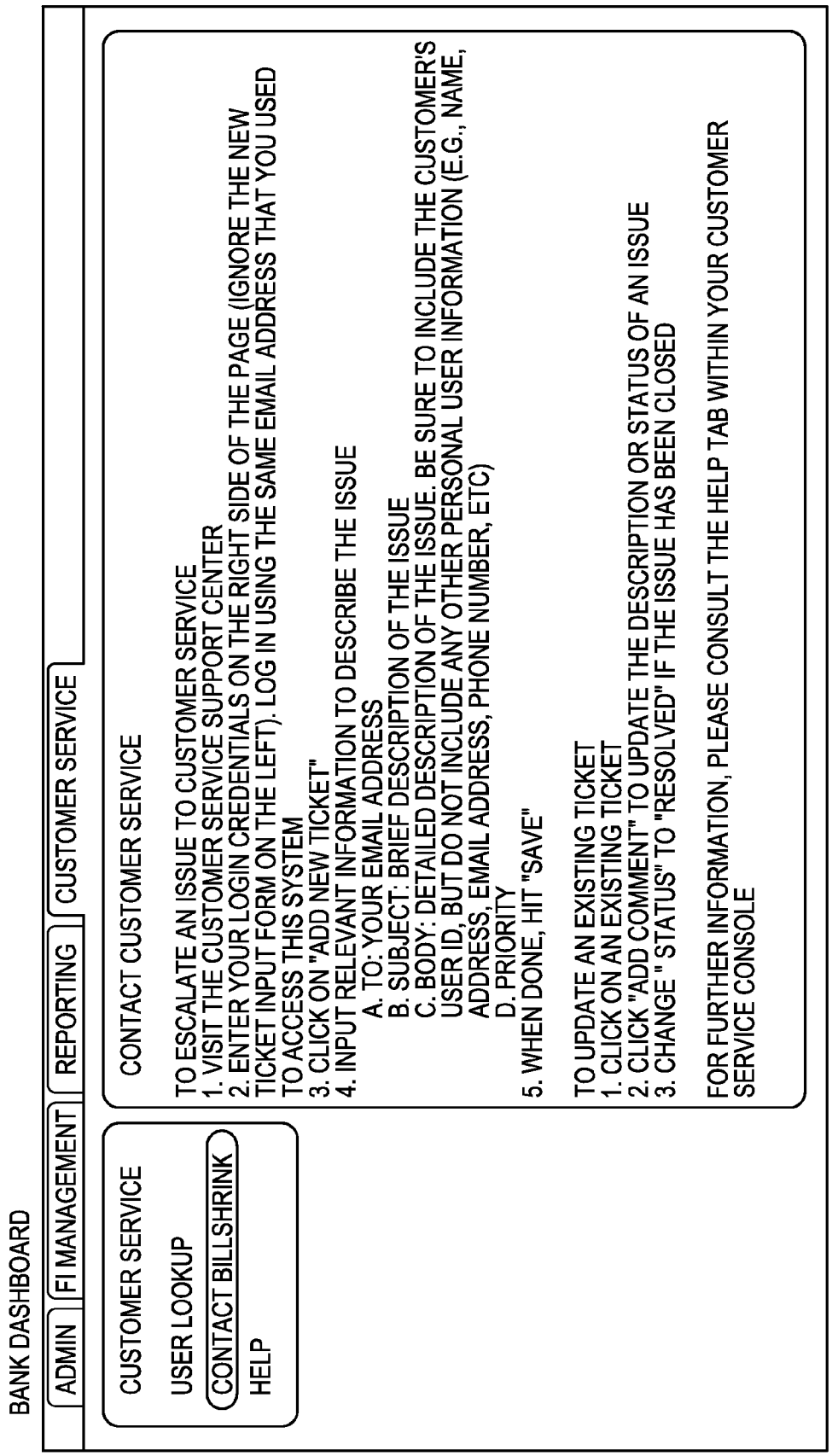
FIG. 42 depicts customer service contact for an embodiment bank dashboard.
Figure 45:
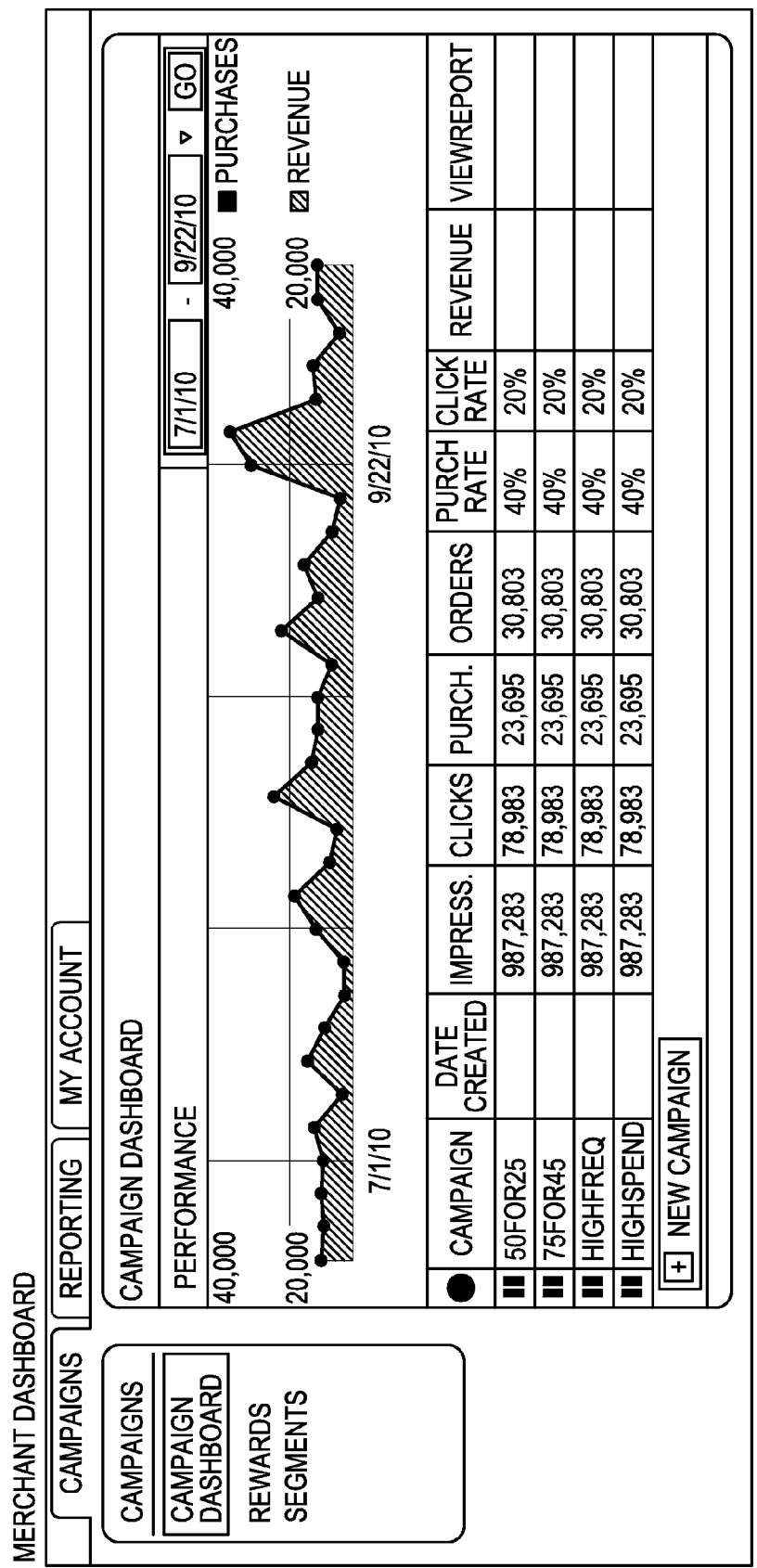
FIG. 45 depicts campaign performance in an embodiment merchant dashboard.
Figure 46:
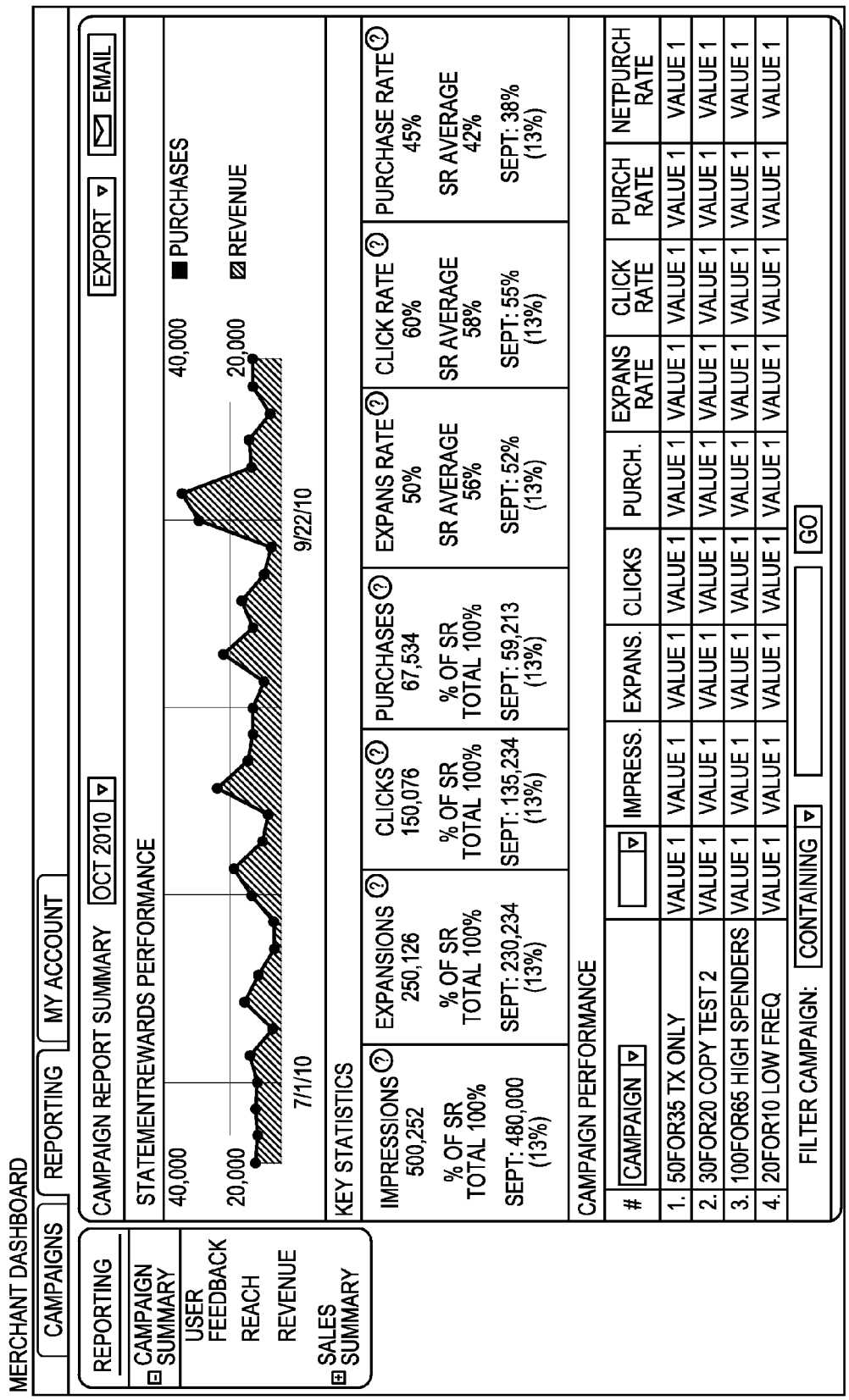
FIG. 46 depicts a reporting window in an embodiment merchant dashboard.
Figure 47:
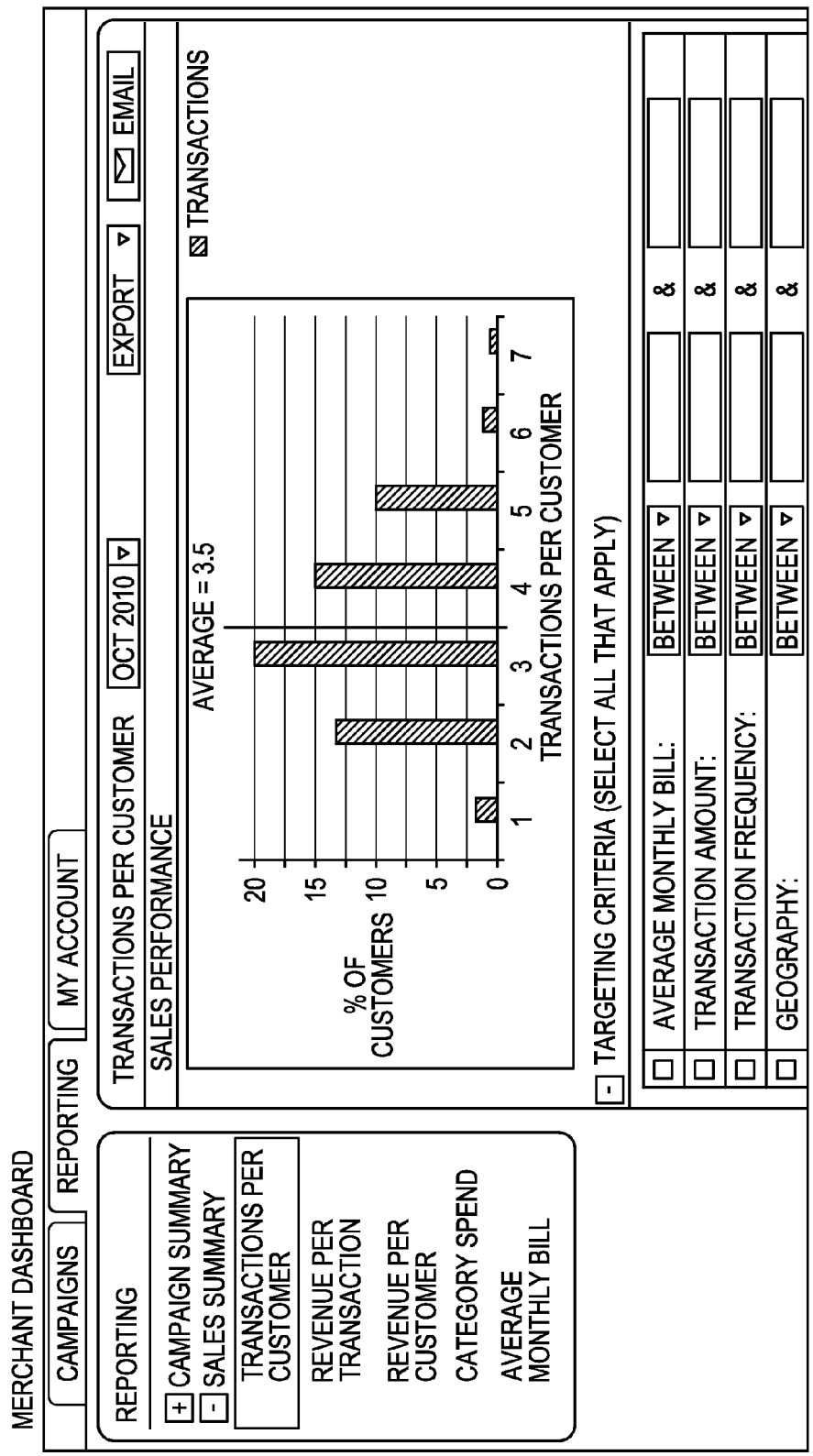
FIG. 47 depicts a reporting window with sales performance in an embodiment merchant dashboard.

FIG. 32 illustrates embodiment technology stacks, such as for consumer facing, merchant facing and financial institution (FI) facing applications. For instance, a consumer facing stack may include location aware offers, intent learning, demographic interface, location extraction, merchant extraction, category extraction, and the like. Merchant facing may include merchant reporting, redemption techniques, revenue optimization, location targeting merchant targeting, category targeting, and the like. Financial institution facing may include financial institution custom reporting, integration techniques, multi-channel support, branding control, merchant control, category control, and the like.

FIGS. 33-42 illustrate embodiment windows for a bank dashboard, including a welcome-login window, an administration tab (e.g. with administration settings, reward controls, user interface settings, payment controls), a financial institution tab (e.g. with pending registrations, active registrations, denied registrations), a reporting tab (e.g. with prepaid reward purchases, coupon reward purchases, bill analyzer metrics, revenue, active rates, performance graphics, key statistics, campaign performance), a customer service tab (e.g. with user lookup, contacting customer service), and the like.

FIGS. 43-47 illustrate embodiment windows for a merchant dashboard, including a campaign tab (e.g. with choosing a saved reward, creating a reward, purchase limits, targeting merchants or categories, targeting rewards by merchant, targeting geographies, date range, campaign performance graphics), reporting tab (with performance graphics, key statistics, campaign summary, user feedback, campaign performance, sale performance, transactions per customer, revenue per transaction, revenue per customer, category spend, average monthly bill), 'My Account' tab, and the like.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for finding a savings opportunity, comprising:
   importing transaction data from a user's financial account by at least one computer;
   analyzing the transaction data from the user's financial account by the at least one computer for a savings opportunity indication;
   matching a savings opportunity from a database of savings opportunities to the user based on the savings opportunity indication by the at least one computer; and
   displaying the savings opportunity in association with a statement of the user's financial account, wherein the savings opportunity comprises an offer to perform a bill analysis for at least one item among the transaction data from the user's financial account, wherein the offer to perform the bill analysis comprises an indication of a specific savings amount.

2. The method of claim 1, further comprising gathering a past response to a savings opportunity indication and analyzing it, wherein the savings opportunity is based on both the analyzed transaction data and past response data.

3. The method of claim 1, wherein the statement is at least one of an online statement, an online graphical user interface associated with the user's financial account, an online bill pay area, a dialog box associated with the user's financial account, an ATM receipt, a teller receipt, a mobile statement, and a paper statement.

4. The method of claim 1, wherein the step of analyzing comprises extracting by the at least one computer at least one of a merchant name, a merchant category, a merchant location, a store number, a transaction amount, a transaction frequency, a zip code, a store category, a transaction description, and a total spending amount.

5. The method of claim 1, wherein the step of analyzing comprises analyzing the transaction data for a savings opportunity indication relating to a merchant.

6. The method of claim 1, wherein the step of analyzing comprises analyzing the transaction data for a savings opportunity indication relating to a market segment.

7. The method of claim 1, wherein the step of displaying the savings opportunity comprises displaying the savings opportunity within a field of the statement where prior transaction data is presented.

8. The method of claim 1, wherein the savings opportunity is from a provider other than a provider among the user's transaction data.

9. The method of claim 1, wherein the user's financial account is at least one of a credit card account, a bank account, a checking account, a savings account, a personal finance program account, and a loan account.

10. The method of claim 1, wherein the step of analyzing comprises anonymizing the transaction data.

11. The method of claim 1, wherein the offer to perform the bill analysis is presented in association with a specific transaction among the transaction data of the user.

12. The method of claim 1, further comprising generating and displaying a link, in a graphical user interface to the user's financial account, to a transaction assessment user interface to compare at least one transaction among the transaction data from the user's financial account to a plurality of alternative offers.

13. The method of claim 1, wherein analyzing the transaction data comprises analyzing market segment information.

14. The method of claim 1, wherein the step of matching is limited to savings opportunities near a user's identified location.

15. The method of claim 14, wherein the user's location is identified manually by the user.

16. The method of claim 14, wherein the user's location is identified automatically from a mobile device implementing the method.

* * * * *